(12) United States Patent
Montero et al.

(10) Patent No.: US 10,915,912 B2
(45) Date of Patent: Feb. 9, 2021

(54) SYSTEMS AND METHODS FOR PRICE TESTING AND OPTIMIZATION IN BRICK AND MORTAR RETAILERS

(71) Applicant: Eversight, Inc., Palo Alto, CA (US)

(72) Inventors: Michael Montero, Palo Alto, CA (US); Jamie Eldredge, Palo Alto, CA (US); Daniel Gibson, Palo Alto, CA (US); David Moran, Palo Alto, CA (US); Jamie Rapperport, Palo Alto, CA (US)

(73) Assignee: EVERSIGHT, INC., Palo Alto, CA (US)

( * ) Notice: Subject to any disclaimer, the term of this patent is extended or adjusted under 35 U.S.C. 154(b) by 0 days.

(21) Appl. No.: 16/157,018

(22) Filed: Oct. 10, 2018

(65) Prior Publication Data

US 2019/0108538 A1 Apr. 11, 2019

Related U.S. Application Data

(63) Continuation-in-part of application No. 16/120,178, filed on Aug. 31, 2018, which is a continuation of application No. 15/990,005, filed on May 25, 2018, which is a continuation-in-part of application No. 14/209,851, filed on Mar. 13, 2014, now Pat. No. 9,984,387.

(60) Provisional application No. 61/780,630, filed on Mar. 13, 2013, provisional application No. 62/576,742, filed on Oct. 25, 2017, provisional application No. 62/553,133, filed on Sep. 1, 2017.

(51) Int. Cl.
*G06Q 30/00* (2012.01)
*G06Q 30/02* (2012.01)

(52) U.S. Cl.
CPC ..... *G06Q 30/0206* (2013.01); *G06Q 30/0211* (2013.01); *G06Q 30/0255* (2013.01); *G06Q 30/0271* (2013.01)

(58) Field of Classification Search
CPC . G06Q 30/0277; G06Q 30/0269; G06Q 30/02
See application file for complete search history.

(56) References Cited

U.S. PATENT DOCUMENTS 6,084,583 A 7/2000 Gerszberg et al.
6,577,982 B1 6/2003 Erb (Continued)

OTHER PUBLICATIONS

Nafari; Data Mining Approach for Optimal Discount; DMAI 08; pp. 20-27; 2008.*

(Continued)

*Primary Examiner* — Radu Andrei
(74) *Attorney, Agent, or Firm* — Kang S. Lim

(57) ABSTRACT

Systems and methods for optimizing base pricing of products within a physical retailer are provided. Such systems and methods include first collecting transaction logs for products in a set of physical retail spaces. These logs are validated, adjusted and elasticities between the products are computed. The adjustment may be responsive to the day, by retailer and by a host of external factors (e.g., weather). The adjustment may also include a normalization and filtering out of inaccurate log data. Elasticity is calculated by generalized linear models. A set of constraints are then received and used, along with the elasticities.

16 Claims, 32 Drawing Sheets

(56) References Cited

U.S. PATENT DOCUMENTS

| | | | |
|---|---|---|---|
| 7,092,436 B2 * | 8/2006 | Ma | H04L 25/0204 375/229 |
| 7,158,959 B1 | 1/2007 | Chickering et al. | |
| 7,200,527 B1 | 4/2007 | Davidov et al. | |
| 7,376,603 B1 | 5/2008 | Mayr et al. | |
| 7,639,727 B1 | 12/2009 | Brisebois et al. | |
| 8,140,402 B1 | 3/2012 | Mesaros | |
| 8,606,626 B1 | 12/2013 | DeSoto et al. | |
| 8,676,632 B1 * | 3/2014 | Watson | G06Q 30/0206 705/7.35 |
| 8,972,391 B1 | 3/2015 | McDonnell et al. | |
| 2001/0014868 A1 | 8/2001 | Herz et al. | |
| 2001/0018665 A1 | 8/2001 | Sullivan et al. | |
| 2002/0023117 A1 | 2/2002 | Bernardin et al. | |
| 2002/0026351 A1 | 2/2002 | Coleman | |
| 2002/0087453 A1 | 7/2002 | Nicolaisen et al. | |
| 2002/0161641 A1 | 10/2002 | Quinlan et al. | |
| 2002/0165834 A1 * | 11/2002 | Delurgio | G06Q 10/04 705/400 |
| 2002/0169700 A1 | 11/2002 | Huffman et al. | |
| 2002/0184086 A1 | 12/2002 | Linde | |
| 2003/0130580 A1 | 7/2003 | Kenyon | |
| 2003/0149938 A1 | 8/2003 | McElfresh et al. | |
| 2003/0204437 A1 | 10/2003 | Flender et al. | |
| 2003/0233246 A1 | 12/2003 | Snapp et al. | |
| 2004/0093542 A1 | 5/2004 | Isodono et al. | |
| 2004/0123247 A1 | 6/2004 | Wachen et al. | |
| 2004/0133457 A1 | 7/2004 | Sadiq et al. | |
| 2004/0148211 A1 | 7/2004 | Honarvar et al. | |
| 2004/0223648 A1 | 11/2004 | Hoene et al. | |
| 2005/0096963 A1 | 5/2005 | Myr et al. | |
| 2005/0189415 A1 | 9/2005 | Fano et al. | |
| 2005/0246206 A1 | 11/2005 | Obora et al. | |
| 2005/0256778 A1 | 11/2005 | Boyd et al. | |
| 2005/0273376 A1 | 12/2005 | Ouimet et al. | |
| 2005/0273380 A1 | 12/2005 | Schroeder et al. | |
| 2006/0167917 A1 | 7/2006 | Solomon | |
| 2006/0259835 A1 | 11/2006 | Marinissen et al. | |
| 2006/0271671 A1 | 11/2006 | Hansen | |
| 2007/0022003 A1 | 1/2007 | Chao et al. | |
| 2007/0094077 A1 * | 4/2007 | Hallbauer | G06Q 10/10 705/14.46 |
| 2007/0094093 A1 * | 4/2007 | Hallbauer | G06Q 30/0247 705/26.1 |
| 2007/0143186 A1 | 6/2007 | Apple et al. | |
| 2007/0174030 A1 * | 7/2007 | Yun | G01R 31/31835 703/11 |
| 2007/0282668 A1 * | 12/2007 | Cereghini | G06Q 30/06 705/7.35 |
| 2008/0021909 A1 | 1/2008 | Black et al. | |
| 2008/0033784 A1 | 2/2008 | Chalimadugu et al. | |
| 2008/0033808 A1 | 2/2008 | Black et al. | |
| 2008/0140502 A1 | 6/2008 | Birnholz et al. | |
| 2008/0189156 A1 | 8/2008 | Voda et al. | |
| 2008/0306830 A1 | 12/2008 | Lasa et al. | |
| 2009/0017913 A1 | 1/2009 | Bell et al. | |
| 2009/0030785 A1 | 1/2009 | Goyal et al. | |
| 2009/0204472 A1 | 8/2009 | Einhorn | |
| 2009/0254413 A1 | 10/2009 | Chang et al. | |
| 2009/0282343 A1 | 11/2009 | Catlin et al. | |
| 2009/0292588 A1 | 11/2009 | Duzevik et al. | |
| 2009/0292771 A1 | 11/2009 | Bertoni et al. | |
| 2009/0307073 A1 | 12/2009 | Mirroknibanadaki et al. | |
| 2009/0313109 A1 | 12/2009 | Bous | |
| 2010/0153332 A1 | 6/2010 | Rollins et al. | |
| 2010/0175084 A1 | 7/2010 | Ellis et al. | |
| 2010/0179855 A1 | 7/2010 | Chen et al. | |
| 2010/0250714 A1 | 9/2010 | Wehmann et al. | |
| 2010/0274661 A1 | 10/2010 | Aaltonen et al. | |
| 2010/0306031 A1 * | 12/2010 | McCauley | G06Q 30/02 705/7.29 |
| 2011/0035379 A1 | 2/2011 | Chen et al. | |
| 2011/0040756 A1 | 2/2011 | Jones et al. | |
| 2011/0045831 A1 | 2/2011 | Chiu et al. | |
| 2011/0119100 A1 | 5/2011 | Ruhl et al. | |
| 2011/0119155 A1 | 5/2011 | Hammad et al. | |
| 2011/0161113 A1 | 6/2011 | Rumak et al. | |
| 2011/0173055 A1 | 7/2011 | Ross et al. | |
| 2011/0246994 A1 | 10/2011 | Kimbrel et al. | |
| 2011/0258049 A1 | 10/2011 | Ramer et al. | |
| 2011/0295722 A1 | 12/2011 | Reisman | |
| 2011/0313835 A1 | 12/2011 | Falkenborg et al. | |
| 2012/0158099 A1 | 6/2012 | Lee | |
| 2012/0221372 A1 | 8/2012 | Vasko | |
| 2012/0239537 A1 * | 9/2012 | Baker | G06Q 30/02 705/27.1 |
| 2012/0264089 A1 | 10/2012 | Hoang et al. | |
| 2012/0290399 A1 | 11/2012 | England et al. | |
| 2013/0006949 A1 * | 1/2013 | Essawi | G06F 11/0751 707/703 |
| 2013/0030868 A1 | 1/2013 | Lyon et al. | |
| 2013/0073388 A1 | 3/2013 | Heath | |
| 2013/0085838 A1 | 4/2013 | Tennenholtz et al. | |
| 2013/0085844 A1 | 4/2013 | Neystadt et al. | |
| 2013/0091019 A1 | 4/2013 | Mallon et al. | |
| 2013/0097006 A1 | 4/2013 | Evans et al. | |
| 2013/0110641 A1 | 5/2013 | Ormont et al. | |
| 2013/0110880 A1 | 5/2013 | Farchi et al. | |
| 2013/0124257 A1 | 5/2013 | Schubert | |
| 2013/0138812 A1 | 5/2013 | Assuncao et al. | |
| 2013/0148813 A1 | 6/2013 | Sengupta et al. | |
| 2013/0151332 A1 | 6/2013 | Yan et al. | |
| 2013/0185147 A1 | 7/2013 | Letca et al. | |
| 2013/0238416 A1 | 9/2013 | Richard | |
| 2013/0238617 A1 | 9/2013 | Postrel | |
| 2013/0254151 A1 | 9/2013 | Mohagheghi et al. | |
| 2013/0297543 A1 | 11/2013 | Treiser | |
| 2013/0331999 A1 | 12/2013 | Vaughn et al. | |
| 2013/0346302 A1 | 12/2013 | Purves et al. | |
| 2014/0006129 A1 | 1/2014 | Heath | |
| 2014/0025391 A1 | 1/2014 | Knowles et al. | |
| 2014/0040007 A1 | 2/2014 | Relyea, Jr. et al. | |
| 2014/0046757 A1 | 2/2014 | Kahn et al. | |
| 2014/0046872 A1 | 2/2014 | Arnott et al. | |
| 2014/0081636 A1 | 3/2014 | Erhart et al. | |
| 2014/0081741 A1 | 3/2014 | Katsur | |
| 2014/0095611 A1 | 4/2014 | Weinstein et al. | |
| 2014/0122200 A1 | 5/2014 | Granville | |
| 2014/0136537 A1 | 5/2014 | Nelson et al. | |
| 2014/0143405 A1 | 5/2014 | Pavlidis et al. | |
| 2014/0180790 A1 | 6/2014 | Boal | |
| 2014/0180809 A1 * | 6/2014 | Boal | G06Q 30/0251 705/14.53 |
| 2014/0278786 A1 | 9/2014 | Liu-Qiu-Yan | |
| 2014/0278798 A1 | 9/2014 | Goyal et al. | |
| 2014/0337120 A1 | 11/2014 | Ercanbrack | |
| 2015/0019325 A1 | 1/2015 | Li et al. | |
| 2015/0049924 A1 | 2/2015 | Tang et al. | |
| 2015/0050970 A1 | 2/2015 | Racho | |
| 2015/0117631 A1 | 4/2015 | Tuchman et al. | |
| 2015/0150023 A1 | 5/2015 | Johnson et al. | |
| 2015/0310188 A1 | 10/2015 | Ford et al. | |
| 2016/0155193 A1 | 6/2016 | Merrill et al. | |
| 2016/0162931 A1 | 6/2016 | Harik et al. | |
| 2017/0161791 A1 * | 6/2017 | Zaheer | G06Q 30/0244 |
| 2017/0249664 A1 | 8/2017 | Harik et al. | |

OTHER PUBLICATIONS

Goebel; The Information Value of Item-Level RFID in Retail Supply Chain Operations; ICSS 2011; pp. 1-10; 2011.*

USPTO, ISA/US, "Notification of Transmittal of the ISR and The Written Opinion of the International Searching Authority, or the Declaration," in PCT Application No. PCT/US2018/049284, dated Nov. 30, 2018, 8 pages.

ISA/US, "Notification of Transmittal of the ISR and The Written Opinion of the International Searching Authority, or the Declaration," in PCT Application No. PCT/US2019/055259, dated Dec. 26, 2019, 15 pages.

* cited by examiner

Legend:
- Current price
- Lower test price
- Higher test price

| Retail Family Group Name | Test stores 1 - 22 (22 stores) | Test stores 23 - 44 (22 stores) | Test stores 45 - 66 (22 stores) |
|---|---|---|---|
| BRAND A BUTTER QUARTERS | $3.19 | $3.09 | $3.29 |
| BRAND B BUTTER | $6.09 | $6.29 | $6.39 |
| BRAND C | $3.49 | $3.59 | $3.39 |
| BRAND B SPREADS | $4.29 | $4.19 | $4.09 |
| BRAND D 2 8OZ | $3.19 | $3.09 | $3.29 |
| BRAND B BUTTER 24OZ | $5.79 | $6.09 | $5.99 |
| BRAND B 8OZ TUBS | $2.39 | $2.19 | $2.29 |
| BRAND E QUARTERS | $0.89 | $1.00 | $1.09 |
| BRAND C SPREADS ONE POUND | $2.29 | $2.39 | $2.19 |
| BRAND F ORGANIC BUTTER | $6.59 | $6.49 | $6.39 |
| BRAND G BUTTER QUARTERS | $4.59 | $4.49 | $4.69 |
| BRAND D HIGH TIER | $3.69 | $3.89 | $3.79 |
| BRAND G SPREADS | $3.69 | $3.49 | $3.59 |

*Prices rotating weekly among stores*

| | | 9 stores | 17 stores | 17 stores | 17 stores |
|---|---|---|---|---|---|
| | | Control stores | Test stores | Test stores | Test stores |
| Retail Family Group Name | | 1 – 9 | 10 – 28 | 29 – 47 | 48 – 66 |
| BRAND A BUTTER QUARTERS | | $3.19 | $3.24 | $3.14 | $3.29 |
| BRAND B BUTTER | | $6.29 | $6.34 | $6.39 | $6.44 |
| BRAND C | | $3.49 | $3.44 | $3.49 | $3.39 |
| BRAND B SPREADS | | $4.19 | $4.29 | $4.14 | $4.09 |
| BRAND D 2 8OZ | | $3.19 | $3.29 | $3.09 | $2.99 |
| BRAND B BUTTER 24OZ | | $5.99 | $5.79 | $5.94 | $5.74 |
| BRAND B 8OZ TUBS | | $2.29 | $2.49 | $2.34 | $2.39 |
| BRAND E QUARTERS | | $1.00 | $0.89 | $0.89 | $1.09 |
| BRAND C SPREADS ONE POUND | | $2.29 | $2.19 | $2.24 | $2.09 |
| BRAND F ORGANIC BUTTER | | $6.49 | $6.49 | $6.44 | $6.39 |
| BRAND G BUTTER QUARTERS | | $4.59 | $4.49 | $4.44 | $4.64 |
| BRAND D HIGH TIER | | $3.79 | $3.59 | $3.74 | $3.69 |
| BRAND G SPREADS | | $3.59 | $3.69 | $3.49 | $3.64 |

Legend: Original price; Estimated optimal price; Lower than optimal test price; Higher than optimal test price

*Prices rotating weekly among stores, including control stores*

Fig. 23

SYSTEMS AND METHODS FOR PRICE TESTING AND OPTIMIZATION IN BRICK AND MORTAR RETAILERS

CROSS REFERENCE TO RELATED APPLICATIONS

This continuation-in-part application claims the benefit of U.S. application entitled "Systems and Methods for Intelligent Promotion Design in Bric and Mortar Retailers with Promotion Scoring," U.S. application Ser. No. 16/120,178, filed Aug. 31, 2018, by Rapperport et al., which is a continuation application and claims the benefit of U.S. application Ser. No. 15/990,005, filed May 25, 2018, of the same title, which is a continuation-in-part application and claims the benefit of U.S. application Ser. No. 14/209,851, filed Mar. 13, 2014, entitled "Architecture and Methods for Promotion Optimization," by Moran, now U.S. Pat. No. 9,984,387 issued May 29, 2018, which claims priority under 35 U.S.C. 119(e) to a commonly owned U.S. Provisional Application No. 61/780,630, filed Mar. 13, 2013, entitled "Architecture and Methods for Promotion Optimization," by Moran. Application Ser. No. 15/990,005 also claims the benefit of U.S. Provisional Application No. 62/576,742, filed Oct. 25, 2017, entitled "Architecture and Methods for Generating Intelligent Offers with Dynamic Base Prices" by Rapperport et al. Additionally, U.S. application Ser. No. 16/120,178 claims priority to U.S. Provisional Application No. 62/553,133, filed Sep. 1, 2017, entitled "Systems and Methods for Promotion Optimization" by Rapperport et al.

The present invention is additionally related to the following applications, all of which are incorporated herein by reference:

Commonly owned U.S. application Ser. No. 14/231,426, filed on Mar. 31, 2014, entitled "Adaptive Experimentation and Optimization in Automated Promotional Testing," by Moran et al.

Commonly owned U.S. application Ser. No. 14/231,432, filed on Mar. 31, 2014, entitled "Automated and Optimal Promotional Experimental Test Designs Incorporating Constraints," by Moran et al., now U.S. Pat. No. 9,940,639 issued Apr. 10, 2018.

Commonly owned U.S. application Ser. No. 14/231,440, filed on Mar. 31, 2014, entitled "Automatic Offer Generation Using Concept Generator Apparatus and Methods Therefor," by Moran et al.

Commonly owned U.S. application Ser. No. 14/231,442, filed on Mar. 31, 2014, entitled "Automated Event Correlation to Improve Promotional Testing," by Moran et al., now U.S. Pat. No. 9,940,640 issued Apr. 10, 2018.

Commonly owned U.S. application Ser. No. 14/231,460, filed on Mar. 31, 2014, entitled "Automated Promotion Forecasting and Methods Therefor," by Moran et al.

Commonly owned U.S. application Ser. No. 14/231,555, filed on Mar. 31, 2014, entitled "Automated Behavioral Economics Patterns in Promotion Testing and Methods Therefor," by Moran et al., recently allowed.

All the applications/patents listed above are incorporated herein in their entirety by this reference.

BACKGROUND

The present invention relates generally to price optimization methods and apparatus therefor. More particularly, the present invention relates to computer-implemented methods and computer-implemented apparatus for the generation of and testing of promotions and base pricing within brick and mortar retailers to determine an optimal price for goods.

Promotion refers to various practices designed to increase sales of a particular product or services and/or the profit associated with such sales. Generally speaking, the public often associates promotion with the sale of consumer goods and services, including consumer packaged goods (e.g., food, home and personal care), consumer durables (e.g., consumer appliances, consumer electronics, automotive leasing), consumer services (e.g., retail financial services, health care, insurance, home repair, beauty and personal care), and travel and hospitality (e.g., hotels, airline flights, and restaurants). Promotion is particularly heavily involved in the sale of consumer packaged goods (e.g., consumer goods packaged for sale to an end consumer). However, promotion occurs in almost any industry that offers goods or services to a buyer (whether the buyer is an end consumer or an intermediate entity between the producer and the end consumer).

The term promotion may refer to, for example, providing discounts (using for example a physical or electronic coupon or code) designed to, for example, promote the sales volume of a particular product or service. One aspect of promotion may also refer to the bundling of goods or services to create a more desirable selling unit such that sales volume may be improved. Another aspect of promotion may also refer to the merchandising design (with respect to looks, weight, design, color, etc.) or displaying of a particular product with a view to increasing its sales volume. It includes calls to action or marketing claims used in-store, on marketing collaterals, or on the package to drive demand. Promotions may be composed of all or some of the following: price based claims, secondary displays or aisle end-caps in a retail store, shelf signage, temporary packaging, placement in a retailer circular/flyer/coupon book, a colored price tag, advertising claims, or other special incentives intended to drive consideration and purchase behavior. These examples are meant to be illustrative and not limiting.

In addition to promotional activities, it is also desirable to perform optimizations of base pricing (e.g. non-promotional prices). Often retailers rely upon manufacturer's suggested retail pricing (MSRP) for setting of base prices. In other circumstances, base prices are set based upon competitive analysis—a retailer may monitor competitor's and match or beat the competitor's price on some or all the goods in a store. Alternatively, some retailers may set a desired margin, or sales volume, for a good, and set prices accordingly. Generally however, the base prices of goods in a brick-and-mortar store do not vary significantly due to logistical concerns of updating signage and point of sales (POS) databases, consumer expectation of generally consistent base prices, and the tendency that a retailer will continue patterns of behavior (e.g., "this is what we have always done").

In discussing various embodiments of the present invention, the sale of consumer packaged goods (hereinafter "CPG") is employed to facilitate discussion and ease of understanding. It should be kept in mind, however, that the promotion and base pricing optimization methods and apparatuses discussed herein may apply to any industry in which there is any pricing flexibility in the past or may be employed in the future.

Further, price discount is employed as an example to explain the promotion methods and apparatuses herein. It should be understood, however, that promotion optimization may be employed to manipulate factors other than price discount in order to influence the sales volume. An example of such other factors may include the call to action on a display or on the packaging, the size of the CPG item, the manner in which the item is displayed or promoted or advertised either in the store or in media, etc.

Generally speaking, it has been estimated that, on average, 17% of the revenue in the consumer packaged goods (CPG) industry is spent to fund various types of promotions, including discounts, designed to entice consumers to try and/or to purchase the packaged goods. In a typical example, the retailer (such as a grocery store) may offer a discount online or via a print circular to consumers. The promotion may be specifically targeted to an individual consumer (based on, for example, that consumer's demographics or past buying behavior). The discount may alternatively be broadly offered to the general public. Examples of promotions offered to general public include for example, a printed or electronic redeemable discount (e.g., coupon or code) for a specific CPG item. Another promotion example may include, for example, general advertising of the reduced price of a CPG item in a particular geographic area. Another promotion example may include in-store marking down of a particular CPG item only for a loyalty card user base.

In an example, if the consumer redeems the coupon or electronic code, the consumer is entitled to a reduced price for the CPG item. The revenue loss to the retailer due to the redeemed discount may be reimbursed, wholly or partly, by the manufacturer of the CPG item in a separate transaction.

Because promotion and base price testing is expensive (in terms of, for example, the effort to conduct a promotion campaign, modify display prices and/or the per-unit revenue loss to the retailer/manufacturer when the consumer decides to take advantage of the discount), efforts are continually made to minimize promotion cost while maximizing the return on promotion dollars investment. This effort is known in the industry as promotion optimization.

For example, a typical promotion optimization method may involve examining the sales volume of a particular CPG item over time (e.g., weeks). The sales volume may be represented by a demand curve as a function of time, for example. A demand curve lift (excess over baseline) or dip (below baseline) for a particular time period would be examined to understand why the sales volume for that CPG item increases or decreases during such time period.

FIG. 1 shows an example demand curve 102 for Brand X cookies over some period of time. Two lifts 110 and 114 and one dip 112 in demand curve 102 are shown in the example of FIG. 1. Lift 110 shows that the demand for Brand X cookies exceeds the baseline at least during week 2. By examining the promotion effort that was undertaken at that time (e.g., in the vicinity of weeks 1-4 or week 2) for Brand X cookies, marketers have in the past attempted to judge the effectiveness of the promotion effort on the sales volume. If the sales volume is deemed to have been caused by the promotion effort and delivers certain financial performance metrics, that promotion effort is deemed to have been successful and may be replicated in the future in an attempt to increase the sales volume. On the other hand, dip 112 is examined in an attempt to understand why the demand falls off during that time (e.g., weeks 3 and 4 in FIG. 1). If the decrease in demand was due to the promotion in week 2 (also known as consumer pantry loading or retailer forward-buying, depending on whether the sales volume shown reflects the sales to consumers or the sales to retailers), this decrease in weeks 3 and 4 should be counted against the effectiveness of week 2.

One problem with the approach employed in the prior art has been the fact that the prior art approach is a backward-looking approach based on aggregate historical data. In other words, the prior art approach attempts to ascertain the nature and extent of the relationship between the promotion and the sales volume by examining aggregate data collected in the past. The use of historical data, while having some disadvantages (which are discussed later herein below), is not necessarily a problem. However, when such data is in the form of aggregate data (such as in simple terms of sales volume of Brand X cookies versus time for a particular store or geographic area), it is impossible to extract from such aggregate historical data all of the other factors that may more logically explain a particular lift or dip in the demand curve.

To elaborate, current promotion and base price optimization approaches tend to evaluate sales lifts or dips as a function of four main factors: discount depth (e.g., how much was the discount on the CPG item), discount duration (e.g., how long did the promotion campaign last), timing (e.g., whether there was any special holidays or event or weather involved), and promotion type when analyzing for promotions (e.g., whether the promotion was a price discount only, whether Brand X cookies were displayed/not displayed prominently, whether Brand X cookies were features/not featured in the promotion literature).

However, there may exist other factors that contribute to the sales lift or dip, and such factors are often not discoverable by examining, in a backward-looking manner, the historical aggregate sales volume data for Brand X cookies. This is because there is not enough information in the aggregate sales volume data to enable the extraction of information pertaining to unanticipated or seemingly unrelated events that may have happened during the sales lifts and dips and may have actually contributed to the sales lifts and dips.

Suppose, for example, that there was a discount promotion for Brand X cookies during the time when lift 110 in the demand curve 102 happens. However, during the same time, there was a breakdown in the distribution chain of Brand Y cookies, a competitor's cookies brand which many consumers view to be an equivalent substitute for Brand X cookies. With Brand Y cookies being in short supply in the store, many consumers bought Brand X instead for convenience sake. Aggregate historical sales volume data for Brand X cookies, when examined after the fact in isolation by Brand X marketing department thousands of miles away, would not uncover that fact. As a result, Brand X marketers may make the mistaken assumption that the costly promotion effort of Brand X cookies was solely responsible for the sales lift and should be continued, despite the fact that it was an unrelated event that contributed to most of the lift in the sales volume of Brand X cookies.

As another example, suppose, for example, that milk produced by a particular unrelated vendor was heavily promoted in the same grocery store or in a different grocery store nearby during the week that Brand X cookies experienced the sales lift 110. The milk may have been highlighted in the weekly circular, placed in a highly visible location in the store and/or a milk industry expert may have been present in the store to push buyers to purchase milk, for example. Many consumers ended up buying milk because of this effort whereas some of most of those consumers who bought during the milk promotion may have waited another week or so until they finished consuming the milk they bought in the previous weeks. Further, many of those milk-buying consumers during this period also purchased cookies out of an ingrained milk-and-cookies habit. Aggregate historical sales volume data for Brand X cookies would not uncover that fact unless the person analyzing the historical aggregate sales volume data for Brand X cookies happened to be present in the store during that week and had the insight to note that milk was heavily promoted that week and also the insight that increased milk buying may have an influence on the sales volume of Brand X cookies.

Software may try to take some of these unanticipated events into account but unless every SKU (stock keeping unit) in that store and in stores within commuting distance and all events, whether seemingly related or unrelated to the sales of Brand X cookies, are modeled, it is impossible to eliminate data noise from the backward-looking analysis based on aggregate historical sales data.

Even without the presence of unanticipated factors, a marketing person working for Brand X may be interested in knowing whether the relatively modest sales lift 114 comes from purchases made by regular Brand X cookies buyers or by new buyers being enticed by some aspect of the promotion campaign to buy Brand X cookies for the first time. If Brand X marketer can ascertain that most of the lift in sales during the promotion period that spans lift 114 comes from new consumers of Brand X cookies, such marketer may be willing to spend more money on the same type of sales promotion, even to the point of tolerating a negative ROI (return on investment) on his promotion dollars for this particular type of promotion since the recruitment of new buyers to a brand is deemed more much valuable to the company in the long run than the temporary increase in sales to existing Brand X buyers. Again, aggregate historical sales volume data for Brand X cookies, when examined in a backward-looking manner, would not provide such information.

Furthermore, even if all unrelated and related events and factors can be modeled, the fact that the approach is backward-looking means that there is no way to validate the hypothesis about the effect an event has on the sales volume since the event has already occurred in the past. With respect to the example involving the effect of milk promotion on Brand X cookies sales, there is no way to test the theory short of duplicating the milk shortage problem again. Even if the milk shortage problem could be duplicated again for testing purposes, other conditions have changed, including the fact that most consumers who bought milk during that period would not need to or be in a position to buy milk again in a long time. Some factors, such as weather, cannot be duplicated, making theory verification challenging.

Attempts have been made to employ non-aggregate sales data in promoting products. For example, some companies may employ a loyalty card program (such as the type commonly used in grocery stores or drug stores) to keep track of purchases by individual consumers. If an individual consumer has been buying sugar-free cereal, for example, the manufacturer of a new type of whole grain cereal may wish to offer a discount to that particular consumer to entice that consumer to try out the new whole grain cereal based on the theory that people who bought sugar-free cereal tend to be more health conscious and thus more likely to purchase whole grain cereal than the general cereal-consuming public. Such individualized discount may take the form of, for example, a redeemable discount such as a coupon or a discount code mailed or emailed to that individual.

Some companies may vary the approach by, for example, ascertaining the items purchased by the consumer at the point of sale terminal and offering a redeemable code on the purchase receipt. Irrespective of the approach taken, the utilization of non-aggregate sales data has typically resulted in individualized offers, and has not been processed or integrated in any meaningful sense into a promotion optimization effort to determine the most cost-efficient, highest-return manner to promote a particular CPG item to the general public.

Attempts have also been made to obtain from the consumers themselves indications of future buying behavior instead of relying on a backward-looking approach. For example, conjoint studies, one of the stated preference methods, have been attempted in which consumers are asked to state preferences. In an example conjoint study, a consumer may be approached at the store and asked a series of questions designed to uncover the consumer's future shopping behavior when presented with different promotions. Questions may be asked include, for example, "do you prefer Brand X or Brand Y" or "do you spend less than $100 or more than $100 weekly on grocery" or "do you prefer chocolate cookies or oatmeal cookies" or "do you prefer a 50-cent-off coupon or a 2-for-1 deal on cookies". The consumer may state his preference on each of the questions posed (thus making this study a conjoint study on stated preference).

However, such conjoint studies have proven to be an expensive way to obtain non-historical data. If the conjoint studies are presented via a computer, most users may ignore the questions and/or refuse to participate. If human field personnel are employed to talk to individual consumers to conduct the conjoint study, the cost of such studies tends to be quite high due to salary cost of the human field personnel and may make the extensive use of such conjoint studies impractical.

Further and more importantly, it has been known that conjoint studies are somewhat unreliable in gauging actual purchasing behavior by consumers in the future. An individual may state out of guilt and the knowledge that he needs to lose weight that he will not purchase any cookies in the next six months, irrespective of discounts. In actuality, that individual may pick up a package of cookies every week if such package is carried in a certain small size that is less guilt-inducing and/or if the package of cookies is prominently displayed next to the milk refrigerator and/or if a 10% off discount coupon is available. If a promotion effort is based on such flawed stated preference data, discounts may be inefficiently deployed in the future, costing the manufacturer more money than necessary for the promotion.

Finally, none of the approaches track the long-term impact of a promotion's effect on brand equity for an individual's buying behavior over time. Some promotions, even if deemed a success by traditional short-term measures, could have damaging long-term consequences. Increased price-based discounting, for example, can lead to consumers increasing the weight of price in determining their purchase decisions, making consumers more deal-prone and reluctant to buy at full price, leading to less loyalty to brands and retail outlets.

Previous disclosures by the applicants have focused upon the ability to generate and administer a plurality of test promotions across consumer segments in a rapid manner in order to overcome the foregoing issues in a manner that results in cost-effective, high-return, and timely promotions to the general public. However, these methods are entirely dependent upon on-line tools, social media websites, and/or webpages. They provide a very powerful tool in determining the most effective promotional values, but are not identical to in-person shopping behaviors in a physical retail space. This intrinsically leads to some degree of distortion in the data collected.

Further, advertising budgets are often spent reactively rather than proactively. For example, cookies have been used to track browsing history and generate ads for products that consumers have been searching for. Such reactive strategies have limited scope and ignore a substantial amount of unexploited promotional opportunities.

It is therefore apparent that an urgent need exists for systems and methods that allow for cost effective and accurate optimization of not only promotional activities within a physical retailer, but also the optimization of base prices. Such systems and methods should allow for the minimization of non-pricing related variables when calculating optimal base prices.

SUMMARY

To achieve the foregoing and in accordance with the present invention, systems and methods for the generation and testing of optimal base prices within brick and mortar retailers is provided.

In some embodiments, optimizing base pricing of products within a physical retailer includes first collecting transaction logs for products in a set of physical retail spaces. These logs are validated, adjusted and elasticities between the products are computed. The adjustment may be responsive to the day, by retailer and by a host of external factors (e.g., weather). The adjustment may also include a normalization and filtering out of inaccurate log data. Elasticity is calculated by generalized linear models. A set of constraints are then received and used, along with the elasticities, to generate the optimal price for each product by the maximization of the following:

$$e^T x_p$$

subject to:

$$A x_p \leq m \text{ and } x_p \geq c$$

Test values above and below the estimated optimal price for each product are then computed and subsequently evaluated in in three groups of retailers. The evaluating includes D-optimal designs via exchange algorithm and Box-Behnken design. Each of the retailers is randomly assigned to one of these three groups. The results of the evaluations are used to refine the elasticities that were calculated. The estimated optimal price may be subsequently updated using the refined elasticity. It can also be validated along with the test values and control price in four groups of retailers, each randomly assigned.

The transaction logs include information that allows the comparison of a set of pricing instructions provided to the retailers against the actual pricing that occurs to confirm compliance with instructions. Transaction logs may be aggregated by day and by each retailer.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 20 shows, in accordance with some embodiments, an illustration of an example rollout of a base price optimization test;

FIG. 23 shows, in accordance with some embodiments, an illustration of an example refinement of the base price optimization test;

DETAILED DESCRIPTION

Figure 1:
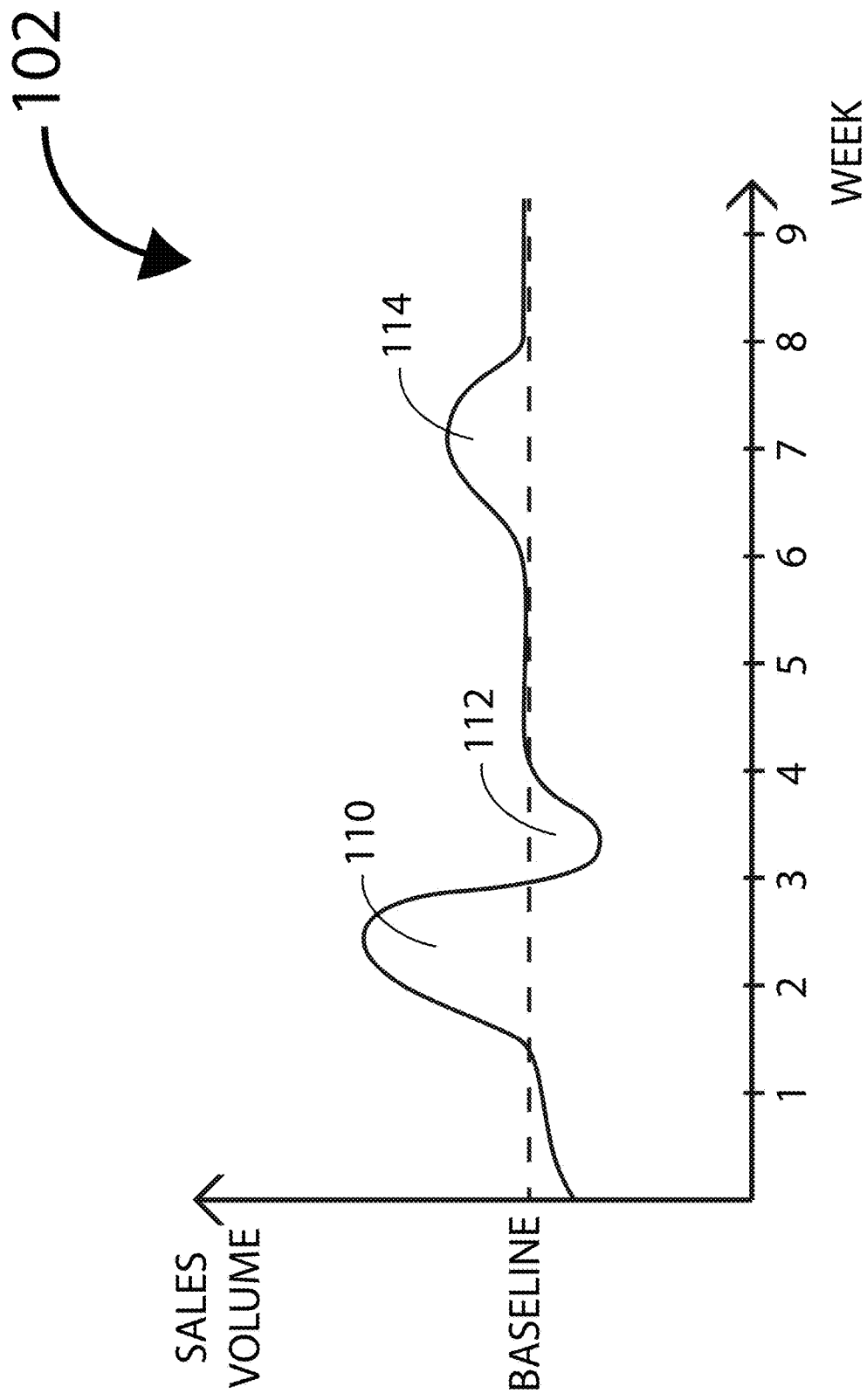
FIG. 1 shows an example demand curve 102 for Brand X cookies over some period of time.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to the generation of promotion activity and base price optimization for deployment in near real time within a brick and mortar retail space. The term "brick and mortar" includes any physical retail space, and is exemplified by general retailers, such as Target and Walmart, specialty boutique retailers, supermarkets, such as Safeway, or the like. The advantage of promotional and base price testing in physical retailer spaces has traditionally not been possible due to consumer expectations, as well as the unreasonable burden of physically updating pricing signage within the retailer in a manner that allows for effective promotional testing.

This testing activity may include intelligent test designs for most effective experimentation of promotions and base pricing to more efficiently identify a highly effective general promotion and/or base prices. Such systems and methods assist administrator users to generate and deploy advertising campaigns, and optimize prices throughout the retailer. While such systems and methods may be utilized with any promotional setting system, such intelligent promotional design systems particularly excel when coupled with systems for optimizing promotions by administering, in large numbers and iteratively, test promotions on purposefully segmented subpopulations in advance of a general public promotion roll-out. In one or more embodiments, the inventive forward-looking promotion optimization (FL-PO) involves obtaining actual revealed preferences from individual consumers of the segmented subpopulations being tested through deployment in physical retail spaces. As such the some of the following disclosure will focus upon mechanisms of forward looking promotional optimizations, in order to understand the context within which the intelligent promotional design system excels, particularly within physical retail spaces.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Forward Looking Promotion Optimization

Within the forward-looking promotion optimization, the revealed preferences are obtained when the individual consumers respond to specifically designed actual test promotions. The revealed preferences may be tracked in individual computer-implemented accounts (which may, for example, be implemented via a record in a centralized database and rendered accessible to the merchant or the consumer via a computer network such as the internet) associated with individual consumers, or may be collected at a physical retailer based upon transaction records. For example, when a consumer responds, using his smart phone, web browser, or in a physical store through completion of a transaction, to a test promotion that offers 20% off a particular consumer packaged goods (CPG) item, that response is tracked in his individual computer-implemented account, or in a transaction record. Such computer-implemented accounts may be implemented via, for example, a loyalty card program, apps on a smart phone, computerized records, social media news feed, etc.

In one or more embodiments, a plurality of test promotions may be designed and tested on a plurality of groups of consumers (the groups of consumers are referred to herein as "subpopulations"). The responses by the consumers are recorded and analyzed, with the analysis result employed to generate additional test promotions or to formulate the general population promotion. In the event of physical testing in a retailer space, it may be possible to segment the consumer base using loyalty program information, or the like. However, in alternate situations the individuals shopping in the retailer may be considered a 'subpopulation' as they are self-selecting by geography, which provides insights into demographics, socio-economic standing, etc.

As will be discussed later herein, if the consumer actually redeems the offer, one type of response is recorded and noted in the computer-implemented account of that consumer. Even if an action by the consumer does not involve actually redeeming or actually taking advantage of the promotional offer right away, an action by that consumer may, however, constitute a response that indicates a level of interest or lack of interest and may still be useful in revealing the consumer preference (or lack thereof). For example, if a consumer saves an electronic coupon (offered as part of a test promotion) in his electronic coupon folder or forwards that coupon to a friend via an email or a social website, that action may indicate a certain level of interest and may be useful in determining the effectiveness of a given test promotion. In the physical retailer space, if a consumer stops to look at a product, or even pick up the product but chooses not to purchase it at the register, such activity, to the extent it is reliably measured, may indicate interest in the promotion despite the lack of a transaction being completed. Different types of responses/actions by the consumers may be accorded different weights, in one or more embodiments.

The groups of consumers involved in promotion testing represent segments of the public that have been purposefully segmented in accordance with segmenting criteria specifically designed for the purpose of testing the test promotions. As the term is employed herein, a subpopulation is deemed purposefully segmented when its members are selected based on criteria other than merely to make up a given number of members in the subpopulation. Demographics, buying behavior, behavioral economics, geography (e.g., purchasing at a certain brick and mortar retailer) are example criteria that may be employed to purposefully segment a population into subpopulations for promotion testing. In an example, a segmented population may number in the tens or hundreds or even thousands of individuals. In contrast, the general public may involve tens of thousands, hundreds of thousands, or millions of potential customers.

By purposefully segmenting the public into small subpopulations for promotion testing, embodiments of the invention can exert control over variables such as demographics (e.g., age, income, sex, marriage status, address, etc.), buying behavior (e.g., regular purchaser of Brand X cookies, consumer of premium food, frequent traveler, etc.), weather, shopping habits, life style, and/or any other criteria suitable for use in creating the subpopulations. More importantly, the subpopulations are kept small such that multiple test promotions may be executed on different subpopulations, either simultaneously or at different times, without undue cost or delay in order to obtain data pertaining to the test promotion response behavior. The low cost/low delay aspect of creating and executing test promotions on purposefully segmented subpopulations permits, for example, what-if testing, testing in statistically significant numbers of tests, and/or iterative testing to isolate winning features in test promotions.

Generally speaking, each individual test promotion may be designed to test one or more test promotion variables. These test promotions variables may relate to, for example, the size, shape, color, manner of display, manner of discount, manner of publicizing, manner of dissemination pertaining to the goods/services being promoted.

As a very simple example, one test promotion may involve 12-oz packages of fancy-cut potato chips with medium salt and a discount of 30% off the regular price. This test promotion may be tested on a purposefully segmented subpopulation of 35-40 years old professionals in the $30,000-$50,000 annual income range. Another test promotion may involve the same 30% discount 12-oz packages of fancy-cut potato chips with medium salt on a different purposefully segmented subpopulation of 35-40 years old professionals in the higher $100,000-$150,000 annual income range. By controlling all variables except for income range, the responses of these two test promotions, if repeated in statistically significant numbers, would likely yield fairly accurate information regarding the relationship between income for 35-40 years old professionals and their actual preference for 12-oz packages of fancy cut potato chips with medium salt.

In designing different test promotions, one or more of the test promotions variables may vary or one or more of the segmenting criteria employed to create the purposefully segmented subpopulations may vary. The test promotion responses from individuals in the subpopulations are then collected and analyzed to ascertain which test promotion or test promotion variable(s) yields/yield the most desirable response (based on some predefined success criteria, for example).

Further, the test promotions can also reveal insights regarding which subpopulation performs the best, or well, with respect to test promotion responses. In this manner, test promotion response analysis provides insights not only regarding the relative performance of the test promotion and/or test promotion variable but also insights regarding population segmentation and/or segmentation criteria. In an embodiment, it is contemplated that the segments may be arbitrarily or randomly segmented into groups and test promotions may be executed against these arbitrarily segmented groups in order to obtain insights regarding personal characteristics that respond well to a particular type of promotion.

In an embodiment, the identified test promotion variable(s) that yield the most desirable responses may then be employed to formulate a general public promotion (GPP), which may then be offered to the larger public. A general public promotion is different from a test promotion in that a general public promotion is a promotion designed to be offered to members of the public to increase or maximize sales or profit whereas a test promotion is designed to be targeted to a small group of individuals fitting a specific segmentation criteria for the purpose of promotion testing. Examples of general public promotions include (but not limited to) advertisement printed in newspapers, release in public forums and websites, flyers for general distribution, announcement on radios or television, promotion broadly transmitted or made available to members of the public, and/or promotions that are rolled out to a wider set of physical retailer locations. The general public promotion may take the form of a paper or electronic circular that offers the same promotion to the larger public, for example.

Alternatively or additionally, promotion testing may be iterated over and over with different subpopulations (segmented using the same or different segmenting criteria) and different test promotions (devised using the same or different combinations of test promotion variables) in order to validate one or more the test promotion response analysis result(s) prior to the formation of the generalized public promotion. In this manner, "false positives" may be reduced.

Since a test promotion may involve many test promotion variables, iterative test promotion testing, as mentioned, may help pin-point a variable (e.g., promotion feature) that yields the most desirable test promotion response to a particular subpopulation or to the general public.

Suppose, for example, that a manufacturer wishes to find out the most effective test promotion for packaged potato chips. One test promotion may reveal that consumers tend to buy a greater quantity of potato chips when packaged in brown paper bags versus green paper bags. That "winning" test promotion variable value (e.g., brown paper bag packaging) may be retested in another set of test promotions using different combinations of test promotion variables (such as for example with different prices, different display options, etc.) on the same or different purposefully segmented subpopulations. The follow-up test promotions may be iterated multiple times in different test promotion variable combinations and/or with different test subpopulations to validate that there is, for example, a significant consumer preference for brown paper bag packaging over other types of packaging for potato chips.

Further, individual "winning" test promotion variable values from different test promotions may be combined to enhance the efficacy of the general public promotion to be created. For example, if a 2-for-1 discount is found to be another winning variable value (e.g., consumers tend to buy a greater quantity of potato chips when offered a 2-for-1 discount), that winning test promotion variable value (e.g., the aforementioned 2-for-1 discount) of the winning test promotion variable (e.g., discount depth) may be combined with the brown paper packaging winning variable value to yield a promotion that involves discounting 2-for-1 potato chips in brown paper bag packaging.

The promotion involving discounting 2-for-1 potato chips in brown paper bag packaging may be tested further to validate the hypothesis that such a combination elicits a more desirable response than the response from test promotions using only brown paper bag packaging or from test promotions using only 2-for-1 discounts. As many of the "winning" test promotion variable values may be identified and combined in a single promotion as desired. At some point, a combination of "winning" test promotion variables (involving one, two, three, or more "winning" test promotion variables) may be employed to create the general public promotion, in one or more embodiments.

In one or more embodiments, test promotions may be executed iteratively and/or in a continual fashion on different purposefully segmented subpopulations using different combinations of test promotion variables to continue to obtain insights into consumer actual revealed preferences, even as those preferences change over time. Note that the consumer responses that are obtained from the test promotions are actual revealed preferences instead of stated preferences. In other words, the data obtained from the test promotions administered in accordance with embodiments of the invention pertains to what individual consumers actually do when presented with the actual promotions. The data is tracked and available for analysis and/or verification in individual computer-implemented accounts of individual consumers involved in the test promotions. This revealed preference approach is opposed to a stated preference approach, which stated preference data is obtained when the consumer states what he would hypothetically do in response to, for example, a hypothetically posed conjoint test question.

As such, the actual preference test promotion response data obtained in accordance with embodiments of the present invention is a more reliable indicator of what a general population member may be expected to behave when presented with the same or a similar promotion in a general public promotion. Accordingly, there is a closer relationship between the test promotion response behavior (obtained in response to the test promotions) and the general public response behavior when a general public promotion is generated based on such test promotion response data.

Also, the lower face validity of a stated preference test, even if the insights have statistical relevance, poses a practical challenge; CPG manufacturers who conduct such tests have to then communicate the insights to a retailer in order to drive real-world behavior, and convincing retailers of the validity of these tests after the fact can lead to lower credibility and lower adoption, or "signal loss" as the top concepts from these tests get re-interpreted by a third party, the retailer, who wasn't involved in the original test design.

It should be pointed out that embodiments of the inventive test promotion optimization methods and apparatuses disclosed herein operate on a forward-looking basis in that the plurality of test promotions are generated and tested on segmented subpopulations in advance of the formulation of a general public promotion. In other words, the analysis results from executing the plurality of test promotions on different purposefully segmented subpopulations are employed to generate future general public promotions. In this manner, data regarding the "expected" efficacy of the proposed general public promotion is obtained even before the proposed general public promotion is released to the public. This is one key driver in obtaining highly effective general public promotions at low cost.

Furthermore, the subpopulations can be generated with highly granular segmenting criteria, allowing for control of data noise that may arise due to a number of factors, some of which may be out of the control of the manufacturer or the merchant. This is in contrast to the aggregated data approach of the prior art.

For example, if two different test promotions are executed on two subpopulations shopping at the same merchant on the same date, variations in the response behavior due to time of day or traffic condition are essentially eliminated or substantially minimized in the results (since the time or day or traffic condition would affect the two subpopulations being tested in substantially the same way).

The test promotions themselves may be formulated to isolate specific test promotion variables (such as the aforementioned potato chip brown paper packaging or the 16-oz size packaging). This is also in contrast to the aggregated data approach of the prior art.

Accordingly, individual winning promotion variables may be isolated and combined to result in a more effective promotion campaign in one or more embodiments. Further, the test promotion response data may be analyzed to answer questions related to specific subpopulation attribute(s) or specific test promotion variable(s). With embodiments of the invention, it is now possible to answer, from the test subpopulation response data, questions such as "How deep of a discount is required to increase by 10% the volume of potato chip purchased by buyers who are 18-25 year-old male shopping on a Monday?" or to generate test promotions specifically designed to answer such a question. Such data granularity and analysis result would have been impossible to achieve using the backward-looking, aggregate historical data approach of the prior art.

In one or more embodiments, there is provided a promotional idea module for generating ideas for promotional concepts to test. The promotional idea generation module relies on a series of pre-constructed sentence structures that outline typical promotional constructs. For example, Buy X, get Y for $Z price would be one sentence structure, whereas Get Y for $Z when you buy X would be a second. It's important to differentiate that the consumer call to action in those two examples is materially different, and one cannot assume the promotional response will be the same when using one sentence structure vs. another. The solution is flexible and dynamic, so once X, Y, and Z are identified, multiple valid sentence structures can be tested. Additionally, other variables in the sentence could be changed, such as replacing "buy" with "hurry up and buy" or "act now" or "rush to your local store to find". The solution delivers a platform where multiple products, offers, and different ways of articulating such offers can be easily generated by a lay user. The amount of combinations to test can be infinite. Further, the generation may be automated, saving time and effort in generating promotional concepts. In following sections one mechanism, the design matrix, for the automation of promotional generation will be provided in greater detail.

In one or more embodiments, once a set of concepts is developed, the technology advantageously a) will constrain offers to only test "viable promotions", e.g., those that don't violate local laws, conflict with branding guidelines, lead to unprofitable concepts that wouldn't be practically relevant, can be executed on a retailers' system, etc., and/or b) link to the design of experiments for micro-testing to determine which combinations of variables to test at any given time.

In one or more embodiments, there is provided an offer selection module for enabling a non-technical audience to select viable offers for the purpose of planning traditional promotions (such as general population promotion, for example) outside the test environment. By using filters and advanced consumer-quality graphics, the offer selection module will be constrained to only show top performing concepts from the tests, with production-ready artwork wherever possible. By doing so, the offer selection module renders irrelevant the traditional, Excel-based or heavily numbers-oriented performance reports from traditional analytic tools. The user can have "freedom within a framework" by selecting any of the pre-scanned promotions for inclusion in an offer to the general public, but value is delivered to the retailer or manufacturer because the offers are constrained to only include the best performing concepts. Deviation from the top concepts can be accomplished, but only once the specific changes are run through the testing process and emerge in the offer selection windows.

In an embodiment, it is expressly contemplated that the general population and/or subpopulations may be chosen from social media site (e.g., Facebook™, Twitter™, Google+™, etc.) participants. Social media offers a large population of active participants and often provide various communication tools (e.g., email, chat, conversation streams, running posts, etc.) which makes it efficient to offer promotions and to receive responses to the promotions. Various tools and data sources exist to uncover characteristics of social media site members, which characteristics (e.g., age, sex, preferences, attitude about a particular topic, etc.) may be employed as highly granular segmentation criteria, thereby simplifying segmentation planning.

Although grocery stores and other brick-and-mortar businesses are discussed in various examples herein, it is expressly contemplated that embodiments of the invention apply also to online shopping and online advertising/promotion and online members/customers.

These and other features and advantages of embodiments of the invention may be better understood with reference to the figures and discussions that follow.

Figure 2A:
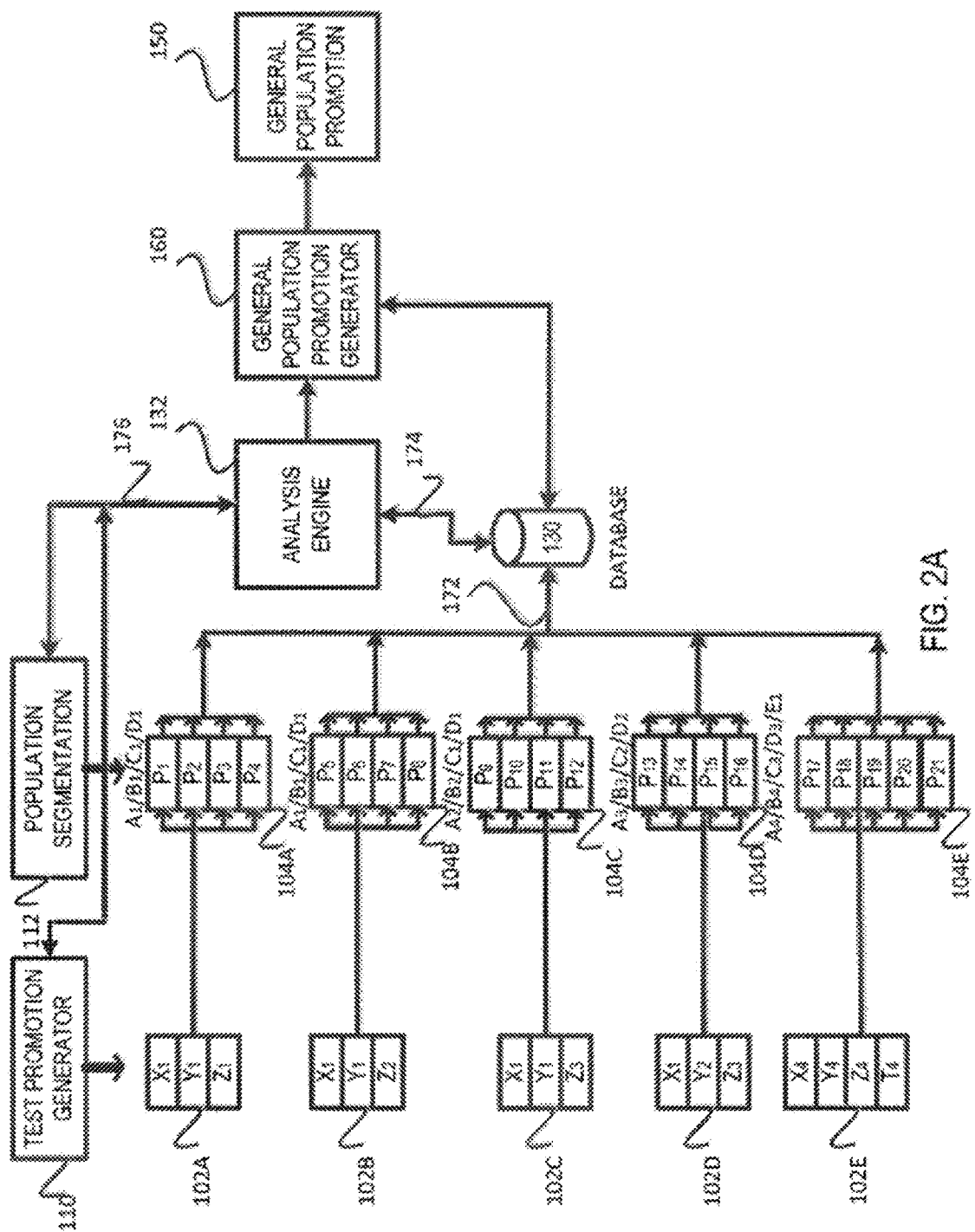
FIG. 2A shows, in accordance with an embodiment of the invention, a conceptual drawing of the forward-looking promotion optimization method.

FIG. 2A shows, in accordance with an embodiment of the invention, a conceptual drawing of the forward-looking promotion optimization method. As shown in FIG. 2A, a plurality of test promotions 102a, 102b, 102c, 102d, and 102e are administered to purposefully segmented subpopulations 104a, 104b, 104c, 104d, and 104e respectively. As mentioned, each of the test promotions (102a-102e) may be designed to test one or more test promotion variables.

In the example of FIG. 2A, test promotions 102a-102d are shown testing three test promotion variables X, Y, and Z, which may represent for example the size of the packaging (e.g., 12 oz. versus 16 oz.), the manner of display (e.g., at the end of the aisle versus on the shelf), and the discount (e.g., 10% off versus 2-for-1). These promotion variables are of course only illustrative and almost any variable involved in producing, packaging, displaying, promoting, discounting, etc. of the packaged product may be deemed a test promotion variable if there is an interest in determining how the consumer would respond to variations of one or more of the test promotion variables. Further, although only a few test promotion variables are shown in the example of FIG. 2A, a test promotion may involve as many or as few of the test promotion variables as desired. For example, test promotion 102e is shown testing four test promotion variables (X, Y, Z, and T).

One or more of the test promotion variables may vary from test promotion to test promotion. In the example of FIG. 2A, test promotion 102a involves test variable X1 (representing a given value or attribute for test variable X) while test promotion 102b involves test variable X2 (representing a different value or attribute for test variable X). A test promotion may vary, relative to another test promotion, one test promotion variable (as can be seen in the comparison between test promotions 102a and 102b) or many of the test promotion variables (as can be seen in the comparison between test promotions 102a and 102d). Also, there are no requirements that all test promotions must have the same number of test promotion variables (as can be seen in the comparison between test promotions 102a and 102e) although for the purpose of validating the effect of a single variable, it may be useful to keep the number and values of other variables (e.g., the control variables) relatively constant from test to test (as can be seen in the comparison between test promotions 102a and 102b).

Generally speaking, the test promotions may be generated using automated test promotion generation software 110, which varies for example the test promotion variables and/or the values of the test promotion variables and/or the number of the test promotion variables to come up with different test promotions.

In the example of FIG. 2A, purposefully segmented subpopulations 104a-104d are shown segmented using four segmentation criteria A, B, C, D, which may represent for example the age of the consumer, the household income, the zip code, group of consumers shopping at a particular physical retailer, and whether the person is known from past purchasing behavior to be a luxury item buyer or a value item buyer. These segmentation criteria are of course only illustrative and almost any demographics, behavioral, attitudinal, whether self-described, objective, interpolated from data sources (including past purchase or current purchase data), etc. may be used as segmentation criteria if there is an interest in determining how a particular subpopulation would likely respond to a test promotion. Further, although only a few segmentation criteria are shown in connection with subpopulations 104a-104d in the example of FIG. 2A, segmentation may involve as many or as few of the segmentation criteria as desired. For example, purposefully segmented subpopulation 104e is shown segmented using five segmentation criteria (A, B, C, D, and E).

In the present disclosure, a distinction is made between a purposefully segmented subpopulation and a randomly segmented subpopulation. The former denotes a conscious effort to group individuals based on one or more segmentation criteria or attributes. The latter denotes a random grouping for the purpose of forming a group irrespective of the attributes of the individuals. Randomly segmented subpopulations are useful in some cases; however they are distinguishable from purposefully segmented subpopulations when the differences are called out.

One or more of the segmentation criteria may vary from purposefully segmented subpopulation to purposefully segmented subpopulation. In the example of FIG. 2A, purposefully segmented subpopulation 104a involves segmentation criterion value A1 (representing a given attribute or range of attributes for segmentation criterion A) while purposefully segmented subpopulation 104c involves segmentation criterion value A2 (representing a different attribute or set of attributes for the same segmentation criterion A).

As can be seen, different purposefully segmented subpopulation may have different numbers of individuals. As an example, purposefully segmented subpopulation 104a has four individuals (P1-P4) whereas purposefully segmented subpopulation 104e has six individuals (P17-P22). A purposefully segmented subpopulation may differ from another purposefully segmented subpopulation in the value of a single segmentation criterion (as can be seen in the comparison between purposefully segmented subpopulation 104a and purposefully segmented subpopulation 104c wherein the attribute A changes from A1 to A2) or in the values of many segmentation criteria simultaneously (as can be seen in the comparison between purposefully segmented subpopulation 104a and purposefully segmented subpopulation 104d wherein the values for attributes A, B, C, and D are all different). Two purposefully segmented subpopulations may also be segmented identically (e.g., using the same segmentation criteria and the same values for those criteria) as can be seen in the comparison between purposefully segmented subpopulation 104a and purposefully segmented subpopulation 104b.

Also, there are no requirements that all purposefully segmented subpopulations must be segmented using the same number of segmentation criteria (as can be seen in the comparison between purposefully segmented subpopulation 104a and 104e wherein purposefully segmented subpopulation 104e is segmented using five criteria and purposefully segmented subpopulation 104a is segmented using only four criteria) although for the purpose of validating the effect of a single criterion, it may be useful to keep the number and values of other segmentation criteria (e.g., the control criteria) relatively constant from purposefully segmented subpopulation to purposefully segmented subpopulation.

Generally speaking, the purposefully segmented subpopulations may be generated using automated segmentation software 112, which varies for example the segmentation criteria and/or the values of the segmentation criteria and/or the number of the segmentation criteria to come up with different purposefully segmented subpopulations.

In one or more embodiments, the test promotions are administered to individual users in the purposefully segmented subpopulations in such a way that the responses of the individual users in that purposefully segmented subpopulation can be recorded for later analysis. As an example, an electronic coupon may be presented in an individual user's computer-implemented account (e.g., shopping account or loyalty account), or emailed or otherwise transmitted to the smart phone of the individual. In an example, the user may be provided with an electronic coupon on his smart phone that is redeemable at the merchant. In FIG. 2A, this administering is represented by the lines that extend from test promotion 102a to each of individuals P1-P4 in purposefully segmented subpopulation 104a. If the user (such as user P1) makes a promotion-significant response, the response is noted in database 130.

A promotion-significant response is defined as a response that is indicative of some level of interest or disinterest in the goods/service being promoted. In the aforementioned example, if the user P1 redeems the electronic coupon at the store, the redemption is strongly indicative of user P1's interest in the offered goods. However, responses falling short of actual redemption or actual purchase may still be significant for promotion analysis purposes. For example, if the user saves the electronic coupon in his electronic coupon folder on his smart phone, such action may be deemed to indicate a certain level of interest in the promoted goods. As another example, if the user forwards the electronic coupon to his friend or to a social network site, such forwarding may also be deemed to indicate another level of interest in the promoted goods. As another example, if the user quickly moves the coupon to trash, this action may also indicate a level of strong disinterest in the promoted goods. In one or more embodiments, weights may be accorded to various user responses to reflect the level of interest/disinterest associated with the user's responses to a test promotion. For example, actual redemption may be given a weight of 1, whereas saving to an electronic folder would be given a weight of only 0.6 and whereas an immediate deletion of the electronic coupon would be given a weight of −0.5.

Analysis engine 132 represents a software engine for analyzing the consumer responses to the test promotions. Response analysis may employ any analysis technique (including statistical analysis) that may reveal the type and degree of correlation between test promotion variables, subpopulation attributes, and promotion responses. Analysis engine 132 may, for example, ascertain that a certain test promotion variable value (such as 2-for-1 discount) may be more effective than another test promotion variable (such as 25% off) for 32-oz soft drinks if presented as an electronic coupon right before Monday Night Football. Such correlation may be employed to formulate a general population promotion (150) by a general promotion generator software (160). As can be appreciated from this discussion sequence, the optimization is a forward-looking optimization in that the results from test promotions administered in advance to purposefully segmented subpopulations are employed to generate a general promotion to be released to the public at a later date.

In one or more embodiments, the correlations ascertained by analysis engine 132 may be employed to generate additional test promotions (arrows 172, 174, and 176) to administer to the same or a different set of purposefully segmented subpopulations. The iterative testing may be employed to verify the consistency and/or strength of a correlation (by administering the same test promotion to a different purposefully segmented subpopulation or by combining the "winning" test promotion value with other test promotion variables and administering the re-formulated test promotion to the same or a different set of purposefully segmented subpopulations).

In one or more embodiments, a "winning" test promotion value (e.g., 20% off listed price) from one test promotion may be combined with another "winning" test promotion value (e.g., packaged in plain brown paper bags) from another test promotion to generate yet another test promotion. The test promotion that is formed from multiple "winning" test promotion values may be administered to different purposefully segmented subpopulations to ascertain if such combination would elicit even more desirable responses from the test subjects.

Since the purposefully segmented subpopulations are small and may be segmented with highly granular segmentation criteria, a large number of test promotions may be generated (also with highly granular test promotion variables) and a large number of combinations of test promotions/purposefully segmented subpopulations can be executed quickly and at a relatively low cost. The same number of promotions offered as general public promotions would have been prohibitively expensive to implement, and the large number of failed public promotions would have been costly for the manufacturers/retailers. In contrast, if a test promotion fails, the fact that the test promotion was offered to only a small number of consumers in one or more segmented subpopulations, or a limited number of physical locations for a limited time, would limit the cost of failure. Thus, even if a large number of these test promotions "fail" to elicit the desired responses, the cost of conducting these small test promotions would still be quite small.

In an embodiment, it is envisioned that dozens, hundreds, or even thousands of these test promotions may be administered concurrently or staggered in time to the dozens, hundreds or thousands of segmented subpopulations. Further, the large number of test promotions executed (or iteratively executed) improves the statistical validity of the correlations ascertained by analysis engine. This is because the number of variations in test promotion variable values, subpopulation attributes, etc. can be large, thus yielding rich and granulated result data. The data-rich results enable the analysis engine to generate highly granular correlations between test promotion variables, subpopulation attributes, and type/degree of responses, as well as track changes over time. In turn, these more accurate/granular correlations help improve the probability that a general public promotion created from these correlations would likely elicit the desired response from the general public. It would also, over, time, create promotional profiles for specific categories, brands, retailers, and individual shoppers where, e.g., shopper 1 prefers contests and shopper 2 prefers instant financial savings.

Figure 2B:
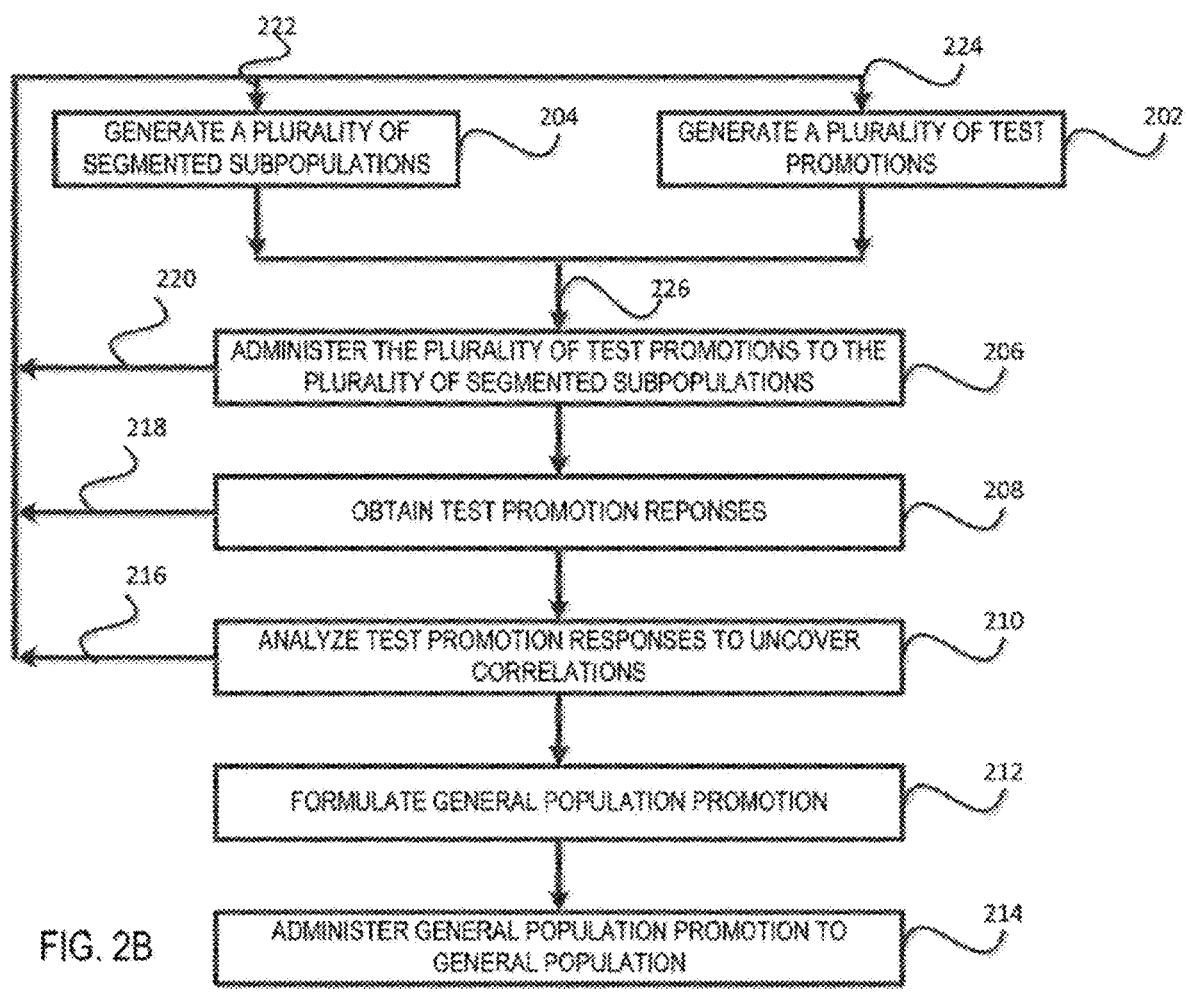
FIG. 2B shows, in accordance with an embodiment of the invention, the steps for generating a general public promotion.

FIG. 2B shows, in accordance with an embodiment of the invention, the steps for generating a general public promotion. In one or more embodiments, each, some, or all the steps of FIG. 2B may be automated via software to automate the forward-looking promotion optimization process. In step 202, the plurality of test promotions are generated. These test promotions have been discussed in connection with test promotions 102a-102e of FIG. 2A and represent the plurality of actual promotions administered to small purposefully segmented subpopulations to allow the analysis engine to uncover highly accurate/granular correlations between test promotion variables, subpopulation attributes, and type/degree of responses in an embodiment, these test promotions may be generated using automated test promotion generation software that varies one or more of the test promotion variables, either randomly, according to heuristics, and/or responsive to hypotheses regarding correlations from analysis engine 132 for example.

In step 204, the segmented subpopulations are generated. In an embodiment, the segmented subpopulations represent randomly segmented subpopulations. In another embodiment, the segmented subpopulations represent purposefully segmented subpopulations. In another embodiment, the segmented subpopulations may represent a combination of randomly segmented subpopulations and purposefully segmented subpopulations. In an embodiment, these segmented subpopulations may be generated using automated subpopulation segmentation software that varies one or more of the segmentation criteria, either randomly, according to heuristics, and/or responsive to hypotheses regarding correlations from analysis engine 132, for example.

In step 206, the plurality of test promotions generated in step 202 are administered to the plurality of segmented subpopulations generated in step 204. In an embodiment, the test promotions are administered to individuals within the segmented subpopulation and the individual responses are obtained and recorded in a database (step 208).

In an embodiment, automated test promotion software automatically administers the test promotions to the segmented subpopulations using electronic contact data that may be obtained in advance from, for example, social media sites, a loyalty card program, previous contact with individual consumers, or potential consumer data purchased from a third party, etc. In some alternate embodiments, as will be discussed in greater detail below, the test promotions may be administered via electronic pricing tags displayed within a physical retail location. Such physical test promotions may be constricted by deployment time due to logistic considerations. The responses may be obtained at the point of sale terminal, or via a website or program, via social media, or via an app implemented on smart phones used by the individuals, for example.

In step 210, the responses are analyzed to uncover correlations between test promotion variables, subpopulation attributes, and type/degree of responses.

In step 212, the general public promotion is formulated from the correlation data, which is uncovered by the analysis engine from data obtained via subpopulation test promotions. In an embodiment, the general public promotion may be generated automatically using public promotion generation software which utilizes at least the test promotion variables and/or subpopulation segmentation criteria and/or test subject responses and/or the analysis provided by analysis engine 132.

In step 214, the general public promotion is released to the general public to promote the goods/services.

In one or more embodiments, promotion testing using the test promotions on the segmented subpopulations occurs in parallel to the release of a general public promotion and may continue in a continual fashion to validate correlation hypotheses and/or to derive new general public promotions based on the same or different analysis results. If iterative promotion testing involving correlation hypotheses uncovered by analysis engine 132 is desired, the same test promotions or new test promotions may be generated and executed against the same segmented subpopulations or different segmented subpopulations as needed (paths 216/222/226 or 216/224/226 or 216/222/224/226). As mentioned, iterative promotion testing may validate the correlation hypotheses, serve to eliminate "false positives" and/or uncover combinations of test promotion variables that may elicit even more favorable or different responses from the test subjects.

Promotion testing may be performed on an on-going basis using the same or different sets of test promotions on the same or different sets of segmented subpopulations as mentioned (paths 218/222/226 or 218/224/226 or 218/222/224/226 or 220/222/226 or 220/224/226 or 220/222/224/226).

Figure 3A:
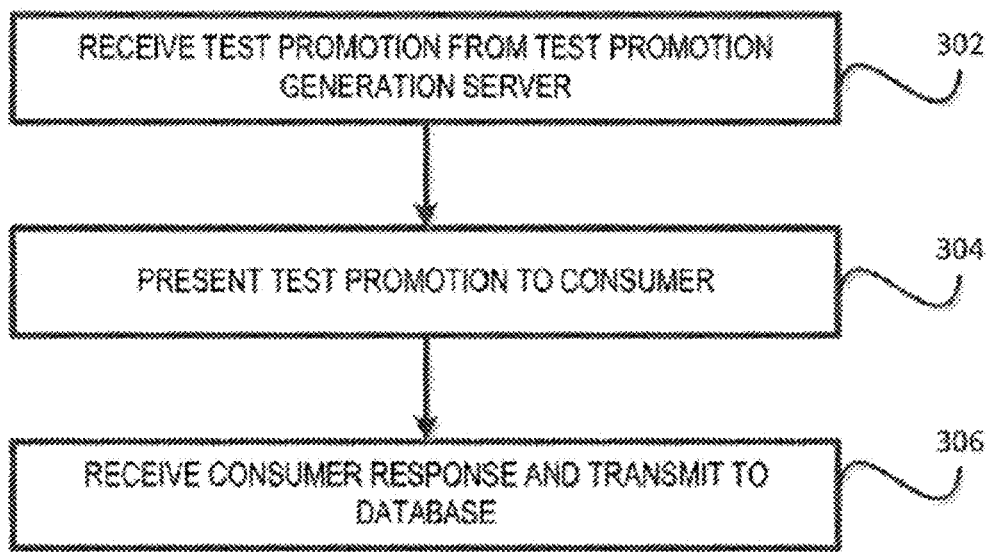
FIG. 3A shows in greater detail, in accordance with an embodiment of the invention, the administering step 206 of FIG. 2 from the user's perspective.

FIG. 3A shows in greater detail, in accordance with an embodiment of the invention, the administering step 206 of FIG. 2 from the user's perspective. In step 302, the test promotion is received from the test promotion generation server (which executes the software employed to generate the test promotion). As examples, the test promotion may be received at a user's smart phone or tablet (such as in the case of an electronic coupon or a discount code, along with the associated promotional information pertaining to the product, place of sale, time of sale, etc.), in a computer-implemented account (such as a loyalty program account) associated with the user that is a member of the segmented subpopulation to be tested, via one or more social media sites, or displayed on electronic pricing tags within a retailer's physical store. In step 304, the test promotion is presented to the user. In step 306, the user's response to the test promotion is obtained and transmitted to a database for analysis.

Figure 3B:
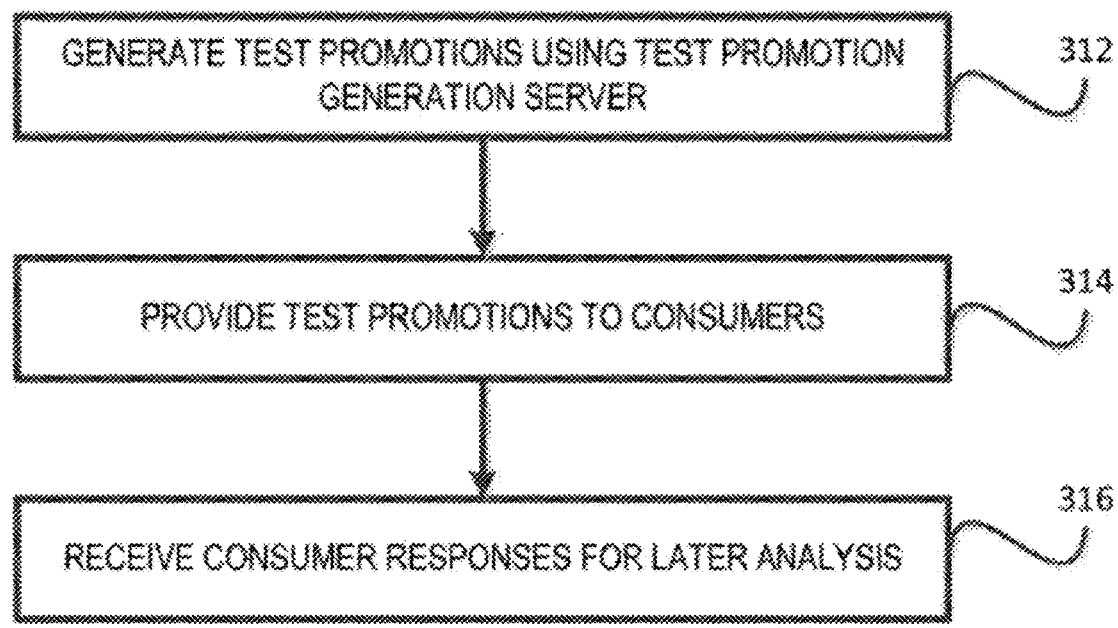
FIG. 3B shows in greater detail, in accordance with an embodiment of the invention, the administering step 206 of FIG. 2 from the forward-looking promotion optimization system perspective.

FIG. 3B shows in greater detail, in accordance with an embodiment of the invention, the administering step 206 of FIG. 2 from the forward-looking promotion optimization system perspective. In step 312, the test promotions are generated using the test promotion generation server (which executes the software employed to generate the test promotion). In step 314, the test promotions are provided to the users (e.g., transmitted or emailed to the user's smart phone or tablet or computer, shared with the user using the user's loyalty account, displayed in the physical retailer). In step 316, the system receives the user's responses and stores the user's responses in the database for later analysis.

Figure 4:
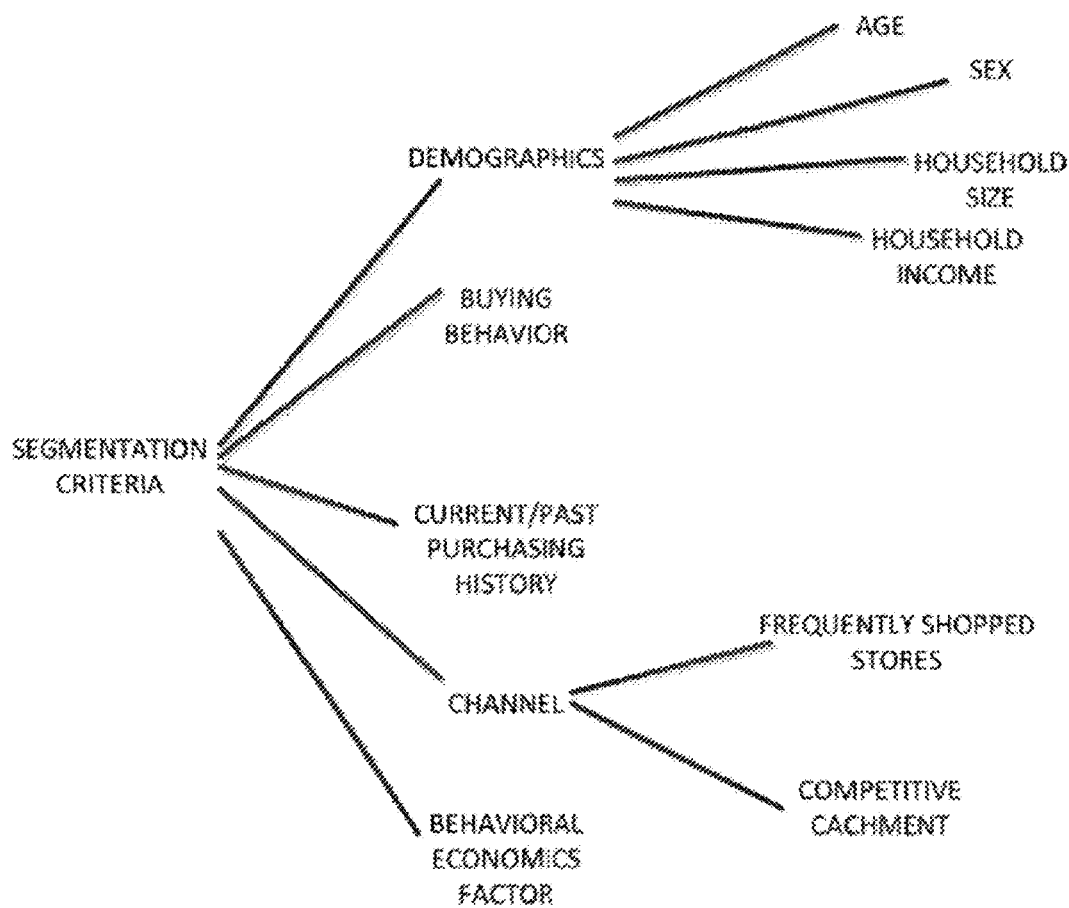
FIG. 4 shows various example segmentation criteria that may be employed to generate the purposefully segmented subpopulations.

FIG. 4 shows various example segmentation criteria that may be employed to generate the purposefully segmented subpopulations. As show in FIG. 4, demographics criteria (e.g., sex, location, household size, household income, etc.), buying behavior (category purchase index, most frequent shopping hours, value versus premium shopper, etc.), past/current purchase history, channel (e.g., stores frequently shopped at, competitive catchment of stores within driving distance), behavioral economics factors, etc. can all be used to generate with a high degree of granularity the segmented subpopulations. The examples of FIG. 4 are meant to be illustrative and not meant to be exhaustive or limiting. As mentioned, one or more embodiments of the invention generate the segmented subpopulations automatically using automated population segmentation software that generates the segmented subpopulations based on values of segmentation criteria.

Figure 5:
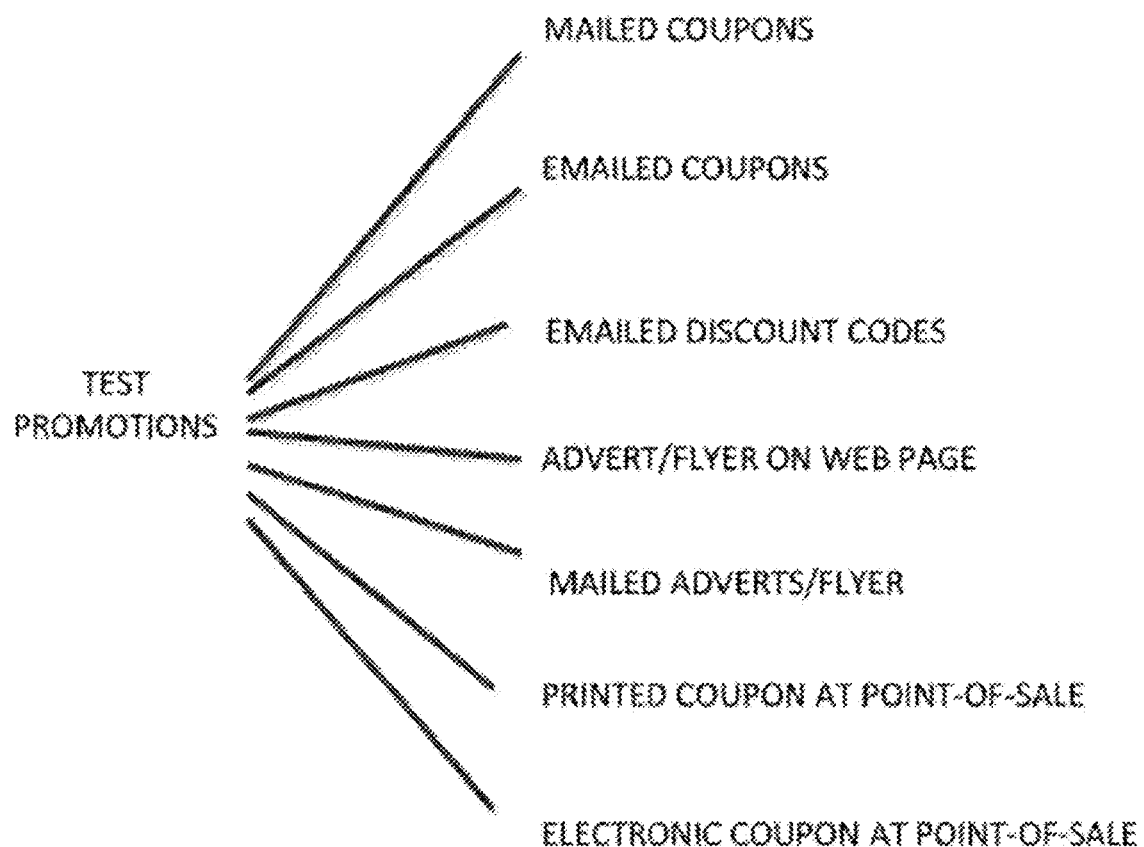
FIG. 5 shows various example methods for communicating the test promotions to individuals of the segmented subpopulations being tested.

FIG. 5 shows various example methods for communicating the test promotions to individuals of the segmented subpopulations being tested. As shown in FIG. 5, the test promotions may be mailed to the individuals, emailed in the form of text or electronic flyer or coupon or discount code, displayed on a webpage when the individual accesses his shopping or loyalty account via a computer or smart phone or tablet, and lastly display on an electronic pricing tag within a retailer's store. Redemption may take place using, for example, a printed coupon (which may be mailed or may be printed from an electronic version of the coupon) at the point of sale terminal, an electronic version of the coupon (e.g., a screen image or QR code), the verbal providing or manual entry of a discount code into a terminal at the store or at the point of sale, or purchase of an item in a physical location that has the promotion displayed. The examples of FIG. 5 are meant to be illustrative and not meant to be exhaustive or limiting. One or more embodiments of the invention automatically communicate the test promotions to individuals in the segmented subpopulations using software that communicates/email/mail/administer the test promotions automatically. In this manner, subpopulation test promotions may be administered automatically, which gives manufacturers and retailers the ability to generate and administer a large number of test promotions with low cost/delay.

Figure 6:
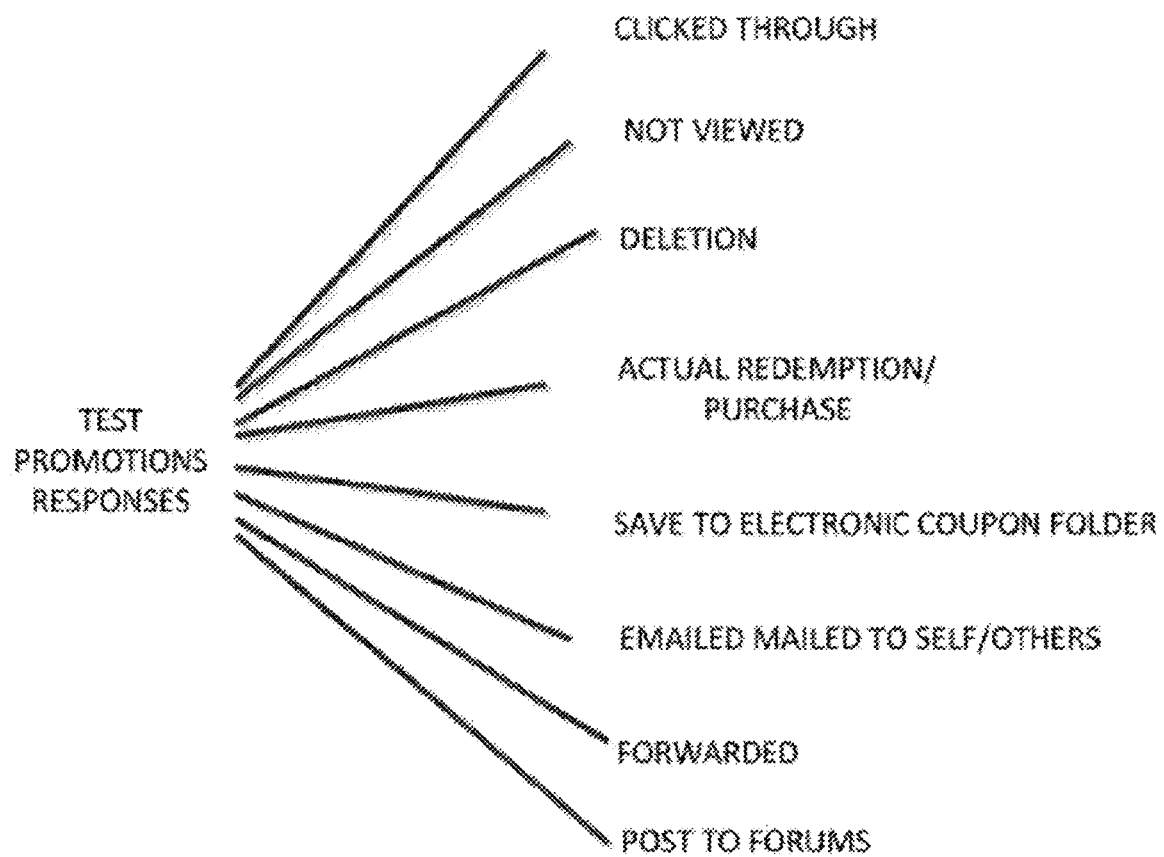
FIG. 6 shows, in accordance with some embodiments, various example promotion-significant responses.

FIG. 6 shows, in accordance with an embodiment, various example promotion-significant responses. As mentioned, redemption of the test offer is one strong indication of interest in the promotion. However, other consumer actions responsive to the receipt of a promotion may also reveal the level of interest/disinterest and may be employed by the analysis engine to ascertain which test promotion variable is likely or unlikely to elicit the desired response. Examples shown in FIG. 6 include redemption (strong interest), deletion of the promotion offer (low interest), save to electronic coupon folder (mild to strong interest), clicked to read further (mild interest), forwarding to self or others or social media sites (mild to strong interest), stopping to look at an item within the store (mild interest), and picking up the item in a physical store but ultimately not purchasing the item (strong interest). As mentioned, weights may be accorded to various consumer responses to allow the analysis engine to assign scores and provide user-interest data for use in formulating follow-up test promotions and/or in formulating the general public promotion. For example, low interest may be afforded a score of −0.75 to −0.25, mild interest could be afforded a score weight of 0.1-0.5, strong interest may be afforded a score of 0.5-0.8, and purchase of the product may be afforded a score of 1. The examples of FIG. 6 are meant to be illustrative and not meant to be exhaustive or limiting.

Figure 7:
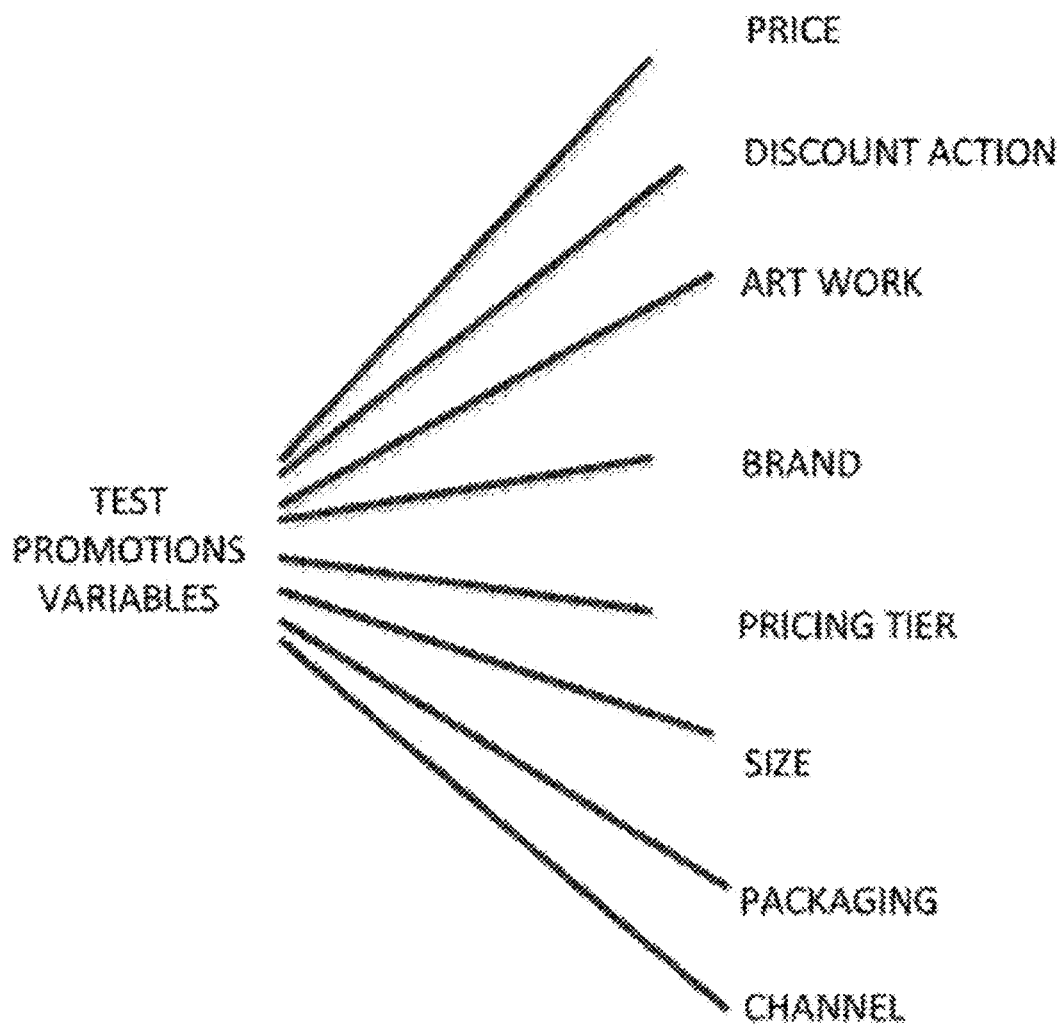
FIG. 7 shows, in accordance with some embodiments, various example test promotion variables affecting various aspects of a typical test promotion.

FIG. 7 shows, in accordance with an embodiment of the invention, various example test promotion variables affecting various aspects of a typical test promotion. As shown in FIG. 7, example test promotion variables include price, discount action (e.g., save 10%, save $1, 2-for-1 offer, etc.), artwork (e.g., the images used in the test promotion to draw interest), brand (e.g., brand X potato chips versus brand Y potato chips), pricing tier (e.g., premium, value, economy), size (e.g., 32 oz., 16 oz., 8 oz.), packaging (e.g., single, 6-pack, 12-pack, paper, can, etc.), channel (e.g., email versus paper coupon versus notification in loyalty account). The examples of FIG. 7 are meant to be illustrative and not meant to be exhaustive or limiting. As mentioned, one or more embodiments of the invention involve generating the test promotions automatically using automated test promotion generation software by varying one or more of the test promotion variables, either randomly or based on feedback from the analysis of other test promotions or from the analysis of the general public promotion.

Figure 8:
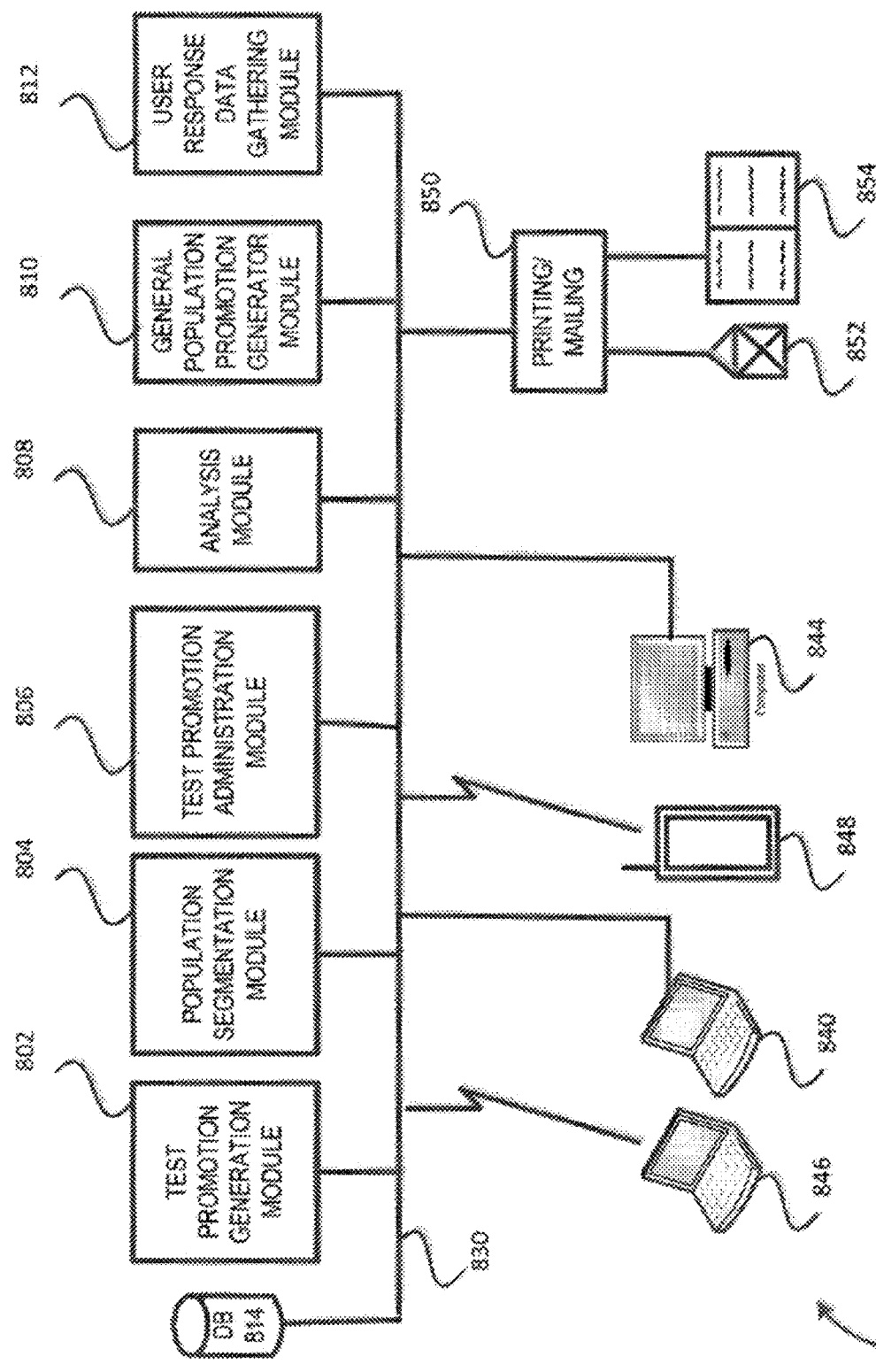
FIG. 8 shows, in accordance with some embodiments, a general hardware/network view of a forward-looking promotion optimization system.

FIG. 8 shows, in accordance with an embodiment of the invention, a general hardware/network view of the forward-looking promotion optimization system 800. In general, the various functions discussed may be implemented as software modules, which may be implemented in one or more servers (including actual and/or virtual servers). In FIG. 8, there is shown a test promotion generation module 802 for generating the test promotions in accordance with test promotion variables. There is also shown a population segmentation module 804 for generating the segmented subpopulations in accordance with segmentation criteria. There is also shown a test promotion administration module 806 for administering the plurality of test promotions to the plurality of segmented subpopulations. There is also shown an analysis module 808 for analyzing the responses to the test promotions as discussed earlier. There is also shown a general population promotion generation module 810 for generating the general population promotion using the analysis result of the data from the test promotions. There is also shown a module 812, representing the software/hardware module for receiving the responses. Module 812 may represent, for example, the point of sale terminal in a store, a shopping basket on an online shopping website, an app on a smart phone, a webpage displayed on a computer, a social media news feed, etc. where user responses can be received.

One or more of modules 802-812 may be implemented on one or more servers, as mentioned. A database 814 is shown, representing the data store for user data and/or test promotion and/or general public promotion data and/or response data. Database 814 may be implemented by a single database or by multiple databases. The servers and database(s) may be coupled together using a local area network, an intranet, the internet, or any combination thereof (shown by reference number 830).

User interaction for test promotion administration and/or acquiring user responses may take place via one or more of user interaction devices. Examples of such user interaction devices are wired laptop 840, wired computer 844, wireless laptop 846, wireless smart phone or tablet 848. Test promotions may also be administered via printing/mailing module 850, which communicates the test promotions to the users via mailings 852 or printed circular 854. The example components of FIG. 8 are only illustrative and are not meant to be limiting of the scope of the invention. The general public promotion, once generated, may also be communicated to the public using some or all of the user interaction devices/methods discussed herein.

As can be appreciated by those skilled in the art, providing a result-effective set of recommendations for a generalized public promotion is one of the more important tasks in test promotion optimization.

In one or more embodiments, there are provided adaptive experimentation and optimization processes for automated promotion testing. Testing is said to be automated when the test promotions are generated in the manner that is likely produce the desired response consistent with the goal of the generalized public promotion.

For example, if the goal is to maximize profit for the sale of a certain newly created brand of potato chips, embodiments of the invention optimally and adaptively, without using required human intervention, plan the test promotions, iterate through the test promotions to test the test promotion variables in the most optimal way, learn and validate such that the most result-effective set of test promotions can be derived, and provide such result-effective set of test promotions as recommendations for generalized public promotion to achieve the goal of maximizing profit for the sale of the newly created brand of potato chips.

The term "without required human intervention" does not denote zero human intervention. The term however denotes that the adaptive experimentation and optimization processes for automated promotion testing can be executed without human intervention if desired. However, embodiments of the invention do not exclude the optional participation of humans, especially experts, in various phases of the adaptive experimentation and optimization processes for automated promotion testing if such participation is desired at various points to inject human intelligence or experience or timing or judgment in the adaptive experimentation and optimization processes for automated promotion testing process. Further, the term does not exclude the optional nonessential ancillary human activities that can otherwise also be automated (such as issuing the "run" command to begin generating test promotions or issuing the "send" command to send recommendations obtained).

II. Near Real-Time Testing within A Physical Retail Space

Historically, effective and statistically valid price testing has been limited within the physical retail space. Consumers have traditionally been sensitive to changes in price for common goods, and the logistic hurdles of updating pricing signage is prohibitive to rigorous testing. In order to test prices within a physical space effectively, a large number of prices (and other variables) must be regularly and continually updated. The speed and frequency of variable changes should be high to minimize external factors, such as weather dependent factors, macroeconomic influences, and seasonality issues.

Competing with the need for regular, frequent and ongoing updates within the store to promotional variables is the need to physically update the store accordingly. At a minimum, this includes near constant replacement of pricing signage. For a grocery store with thousands of items that has a 24 hour operation (or near 24 hours) this activity is problematic at best to complete, and likely impossible to complete for most retailers, regardless of staffing levels. At a weekly cadence, paper pricing signage replacements is achievable and majority of retailers currently have existing weekly processes to update paper price tags. The price optimization approach for existing paper tags can be done and follows the same optimization framework as that of electronic store labels but the cycle of price changes is limited to weekly moves or to the current retailer price tag change cadence. By leveraging electronic tags (E-tags) this process may be made nearly instantaneous, allowing for real-time variable changes. Even in 24 hour retail spaces, this can allow for effective promotional or base price testing, which was not previously possible.

Figure 9:
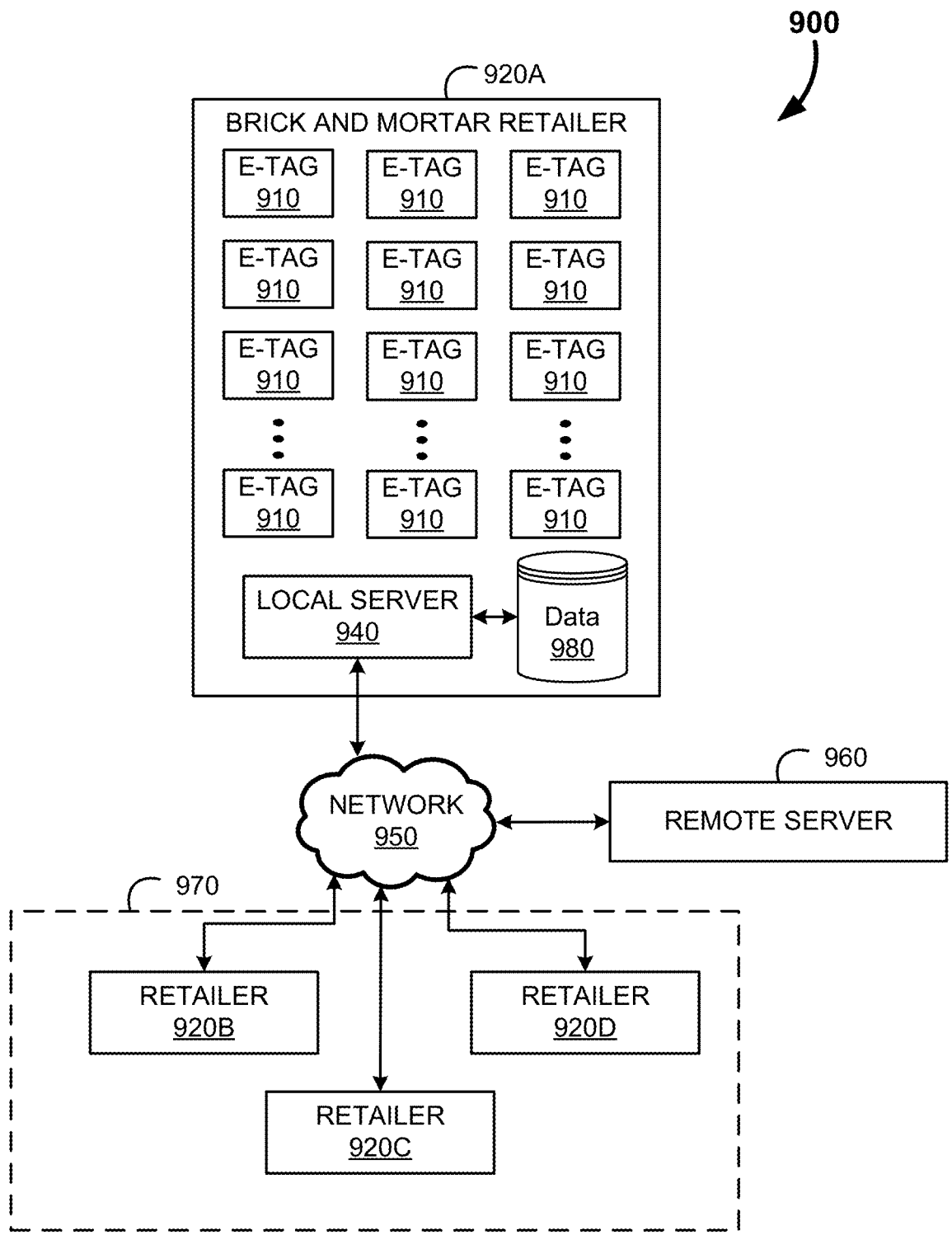
FIG. 9 shows, in accordance with some embodiments, a block diagram of a brick and mortar retailer that employs electronic tags to provide near real time promotional testing.

FIG. 9 shows, in accordance with some embodiments, a block diagram 900 of a brick and mortar retailer 920A-D that employs electronic tags 910 to provide near real time promotional testing. The E-tags may include simple low power "electronic paper" displays large enough to display pricing of the product. The E-tags also include receivers that allow for updating the displays remotely. Typically, a server 940 located within the retailer, and coupled to the Wi-Fi within the store, is used to control the prices shown on the E-tags. A database 980 provides the server information regarding promotional variables that are to be altered to effectively test promotions within the retailer.

While the simplest E-tags may include a monochromatic display large enough for merely displaying product price, more advanced E-tags may enable more dynamic display properties and additional display real estate. This allows for images and other promotional variables contemplated in the above discussion of promotional testing (e.g., images, various more complex promotional structures, etc.). It should be understood that much of the following discussion shall focus on price as the primary promotional variable, and on E-tags that are limited to displaying minimal information. This is done for clarity purposes, and is not intended to be limiting. The systems and methods discussed herein are equally applicable to more dynamic displays and incorporating a wide array of promotional variables. As E-tags become more readily adopted, and economical for deployment, testing of a wider range of promotional variables will become advantageous and are contemplated by this disclosure. Examples of E-tag manufacturers include, but are not limited to: Altierre, Displaydata, Pricer, SES-imagotag, and Teraoka Seiko.

For example, current E-tags, even advanced models, are generally limited to a color display of a given size. As holographic displays become practical, such technologies may be employed within E-tags and be tested as a promotional variable. Likewise, E-tags with non-visual outputs, such as audio cues, smells, etc. could be employed. One could envision, for example, that in the potato chip isle that a display could emit the smell of BBQ potato chips when a consumer is in proximity. The exact scent, and intensity, could constitute two additional promotional variables that are subject to testing.

In some embodiments, the local server 940 may perform the processing required to determine promotional variable for testing, and plan the administration of the testing. However, it is usually more beneficial, and resource efficient, to have a remote server 960 that connects to various retailers 920A-D via a network 950. The network 950 may include a private corporate network, or other local area network. The network could alternatively include a wide area network, such as the Internet or cellular network, or some combination thereof. By having a centralized server 960 performing the promotional testing, the results of testing in a single retailer may be applied to other retailers, effectively allowing for greater testing throughput and validation. Additionally, since the processing requirements on the server can be large, due to the large quantities of data being analyzed, a remote server comprising multiple parallel processing units may be better suited for generating the promotional testing plans than local servers that may be more limited in their processing capabilities.

Lastly, a centralized server is capable of coordinating activity among the various retailers 920A-D. For example, some retailers 920B-D, may be located within a similar geographic region 970. Traditionally, chain retailers have already identified regional clusters of stores. These stores are typically treated in a similar manner, and employ joint advertisements, common pricing and often joint management. This allows for a more consistent user experience, regardless of which store the user chooses to patronage. The present system may likewise allow for common testing among regional store clusters. In alternate embodiments, certain variables may wish to be varied between the regionally clustered stores in order to specifically test specific variable values. Specific variable testing may be helpful when fine tuning pricing or promotions after bulk variable value decisions have been already made. The ability to test variables, in a limited manner, between retailers in a single geographic region 970 is particularly helpful since the consumers to these retailers are presumably the same customer segment. Even when variables are altered between retailers in a single geographic region, it is important that the vast majority (95% or more) of the pricing and other variables remain consistent between the stores. If there are larger inconsistencies between the stores, the ability to compare a variable values across the retailers may be limited.

Figure 10:
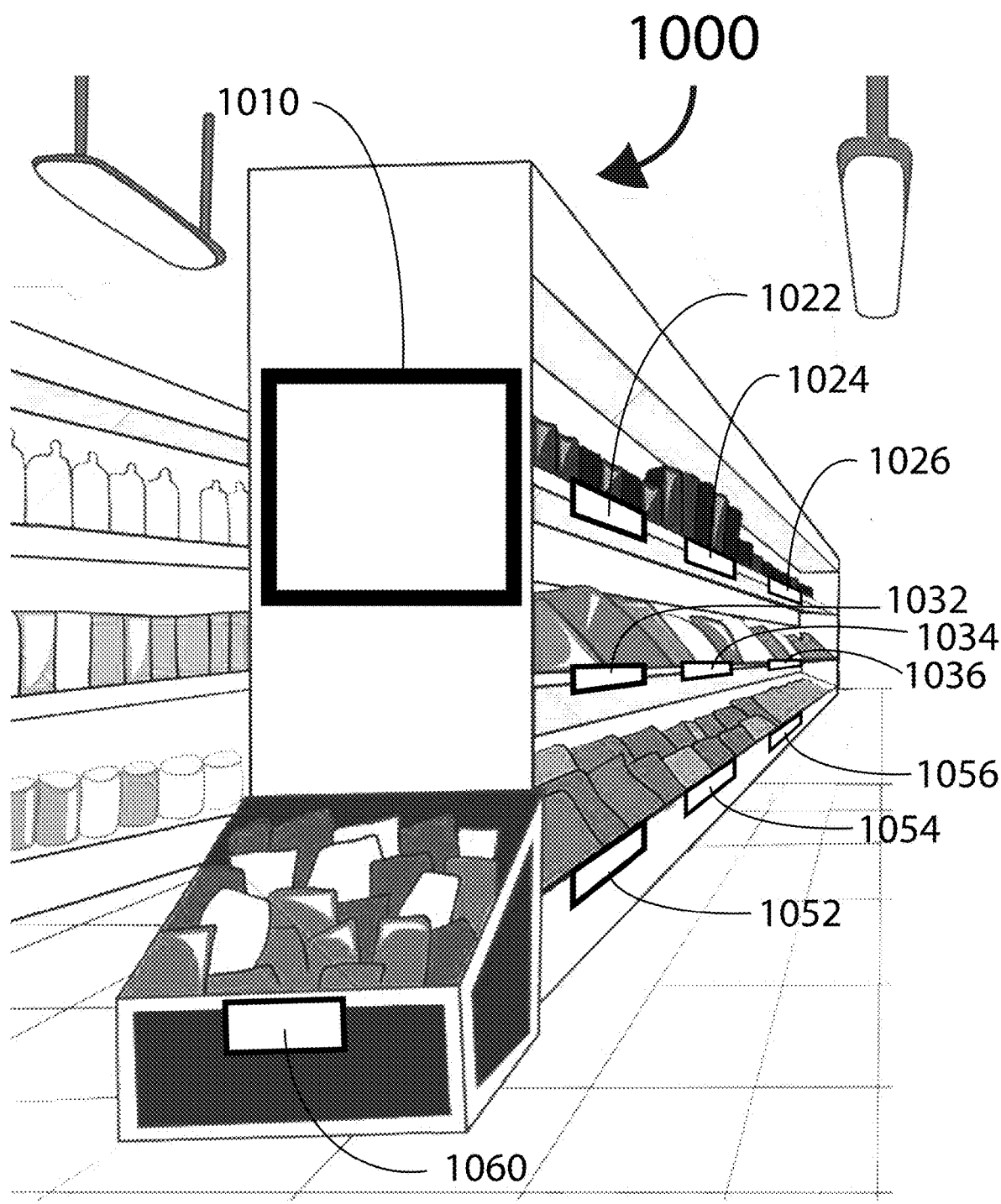
FIG. 10 shows, in accordance with some embodiments, an example illustration of an electronic tag system deployed within a retailer space.

Within the retailer location the electronic signage used for testing the promotions may be uniform, or varied, based upon retailer preference. FIG. 10 shows one such example illustration 1000 of electronic tag deployment within a supermarket style retailer. This may include item specific tags 1022-1052, large signage displays 1010, medium end-cap style promotional placards 1060, small-to-medium signage at checkout or self-checkout kiosks.

Figure 11A:
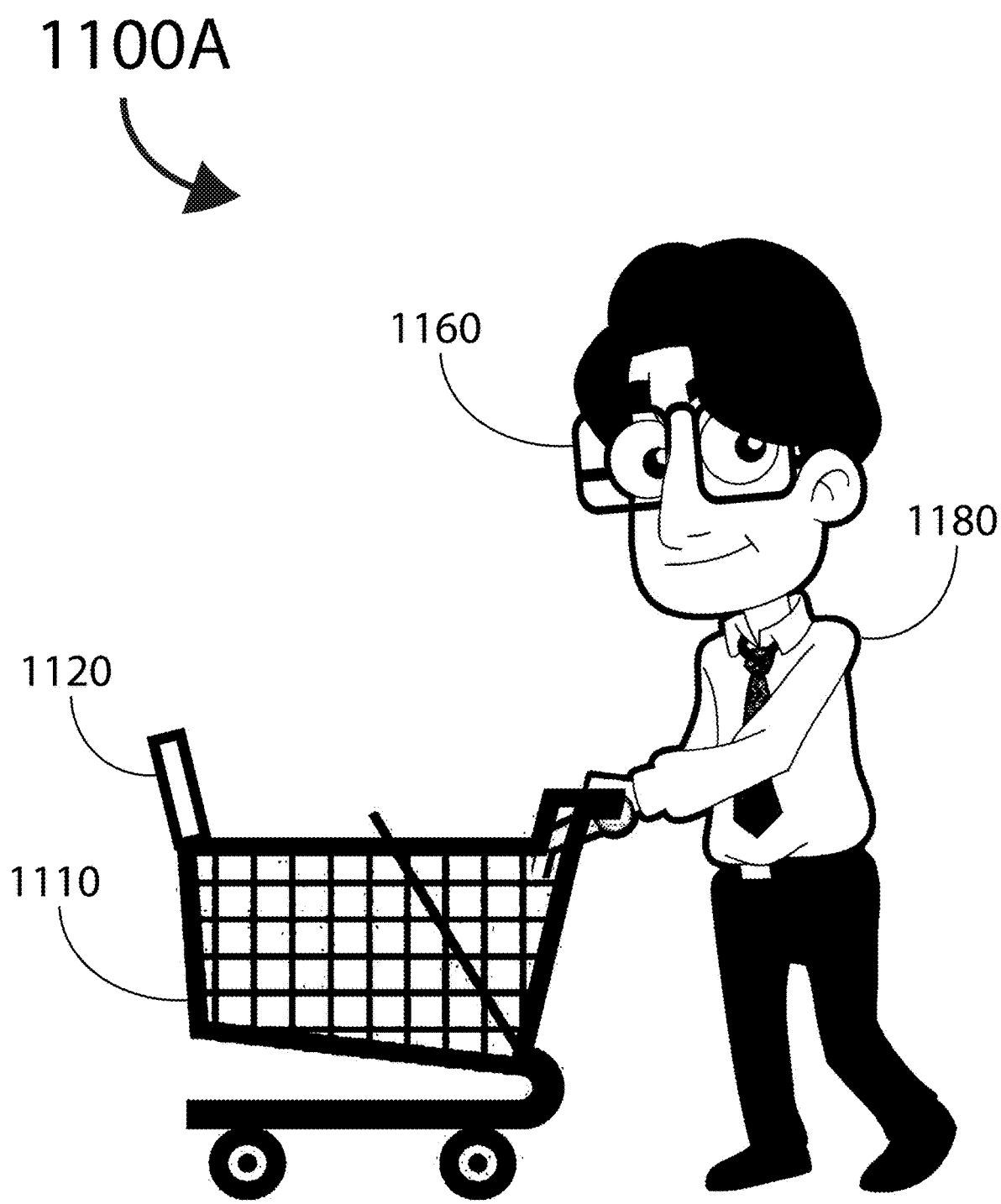
FIGS. 11A-C show, in accordance with some embodiments, an example illustration of user specific electronic displays for use in a retailer.
Figure 11B:
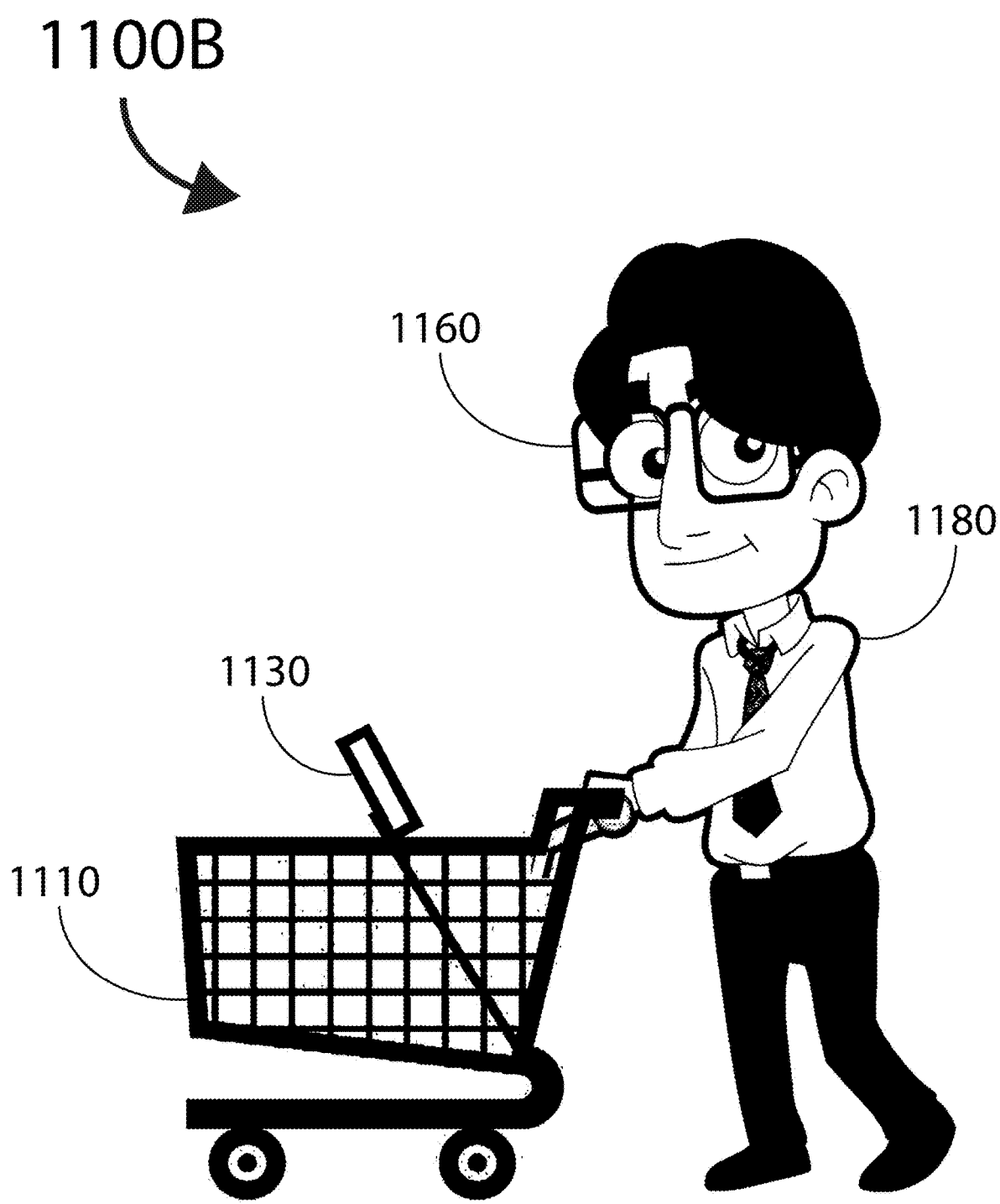
Figure 11C:
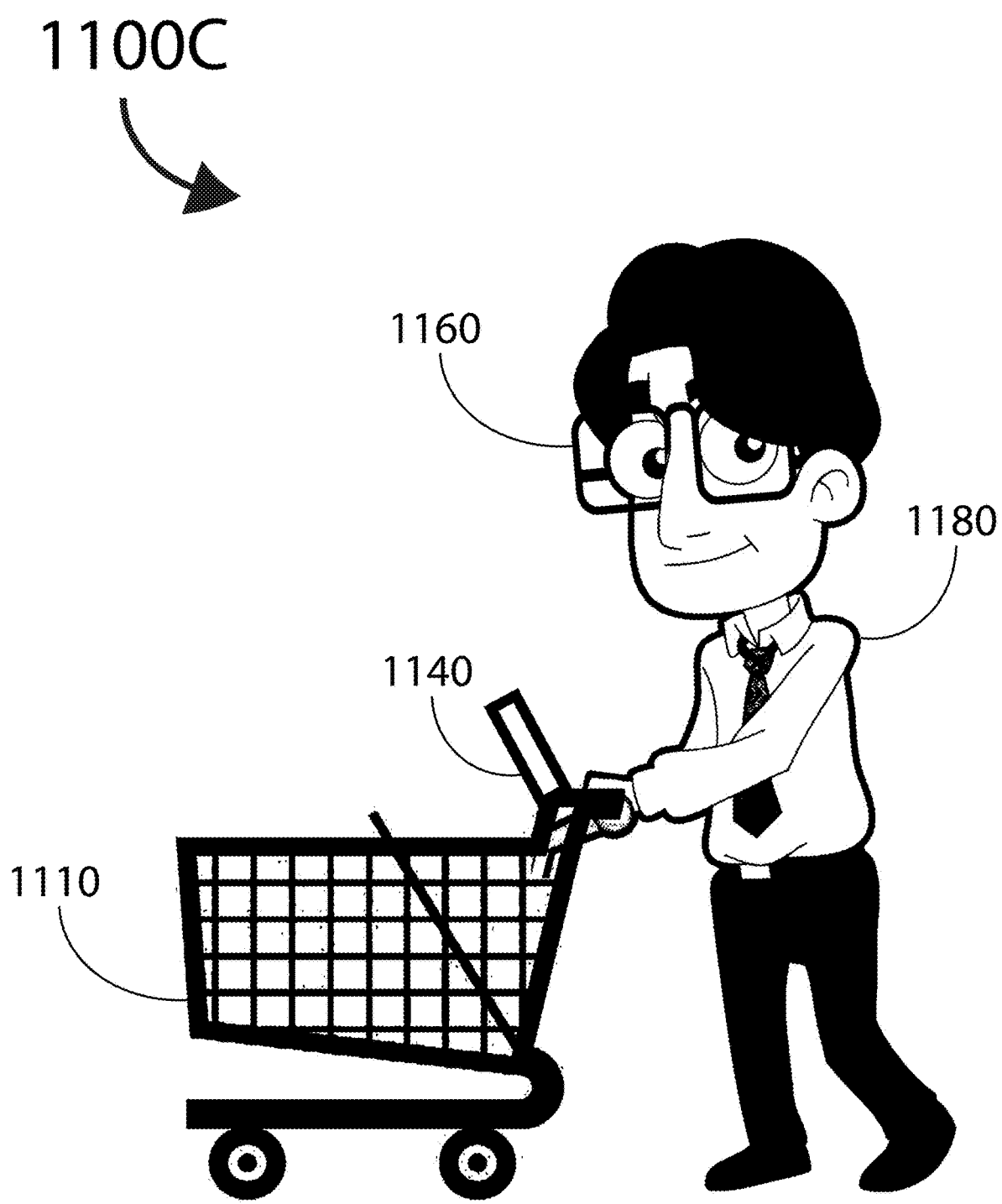

In addition to (or in lieu of) static electronic tags, it may be desirable to have mobile electronic display(s) located with the user. For example, FIG. 11A shows a possible use case where the electronic display follows the user 1180, by coupling directly with the shopping cart 1110 as a heads up display, mobile display monitor, tablet style device, projector, 3D display or even holographic projector (collectively referred to as a display) 1120, or even as a worn accoutrement 1160, such as google glasses or the like. Similarly, in FIGS. 11B and 11C the displays 1130 and 1140, respectively, are illustrated as being mounted in different places on the shopping cart 1110.

In some embodiments, the digital display may be permanently fastened to the shopping cart. In alternate situations, the display is dock-able, allowing the user to affix the display on the cart when they enter the retailer, and remove it for charging and safe keeping before leaving the store. The removal of the display could be completed by the cashier upon checkout, or may be the responsibility of the user in some cases. When left to the user to remove, the display may incorporate an radio frequency identification (RFID) chip that triggers the theft prevention system to reduce the chance that the device is inadvertently removed from the retailer/left on the cart.

Such an RFID can also be used to track the user around the retailer. In this manner, as the retailer determines that a user is in a specific location, prices and promotions relevant to the products nearby may be transmitted to the device for display (from a local server). This may be accomplished via a Wi-Fi signal or other wireless transmission media. In this manner the mobile digital display can have reduced processing and storage capabilities since it is merely displaying what it is told to by the server.

Alternatively, RFID or other proximity transmitters may be located throughout the retailer, allowing the mobile display to be location aware. In the case of google glasses or other display owned by the user, it may be desirable that the display is controlled by the device rather than by an external server system. The device would require an executable program for querying a database on what promotions to display based upon its perceived location within the store.

In the context of the static (non-mobile) electronic tags, it is not necessary to know the location of a user to be effective. However, by knowing the user's current and past location, certain personalization of promotions may be possible. Thus it is likewise contemplated that each shopping cart includes an RFID in order to track user movements throughout the store, even if they do not have an attached mobile digital display. Alternatively, cameras or other optical tracking could be utilized to monitor user movements. Lastly, by tracking cellular phone pings, a user's location can be tracked with a fairly high degree of success (via amplitude and triangulation from sensors located throughout the store).

III. Promotion Testing within A Physical Retailer

Figure 12:
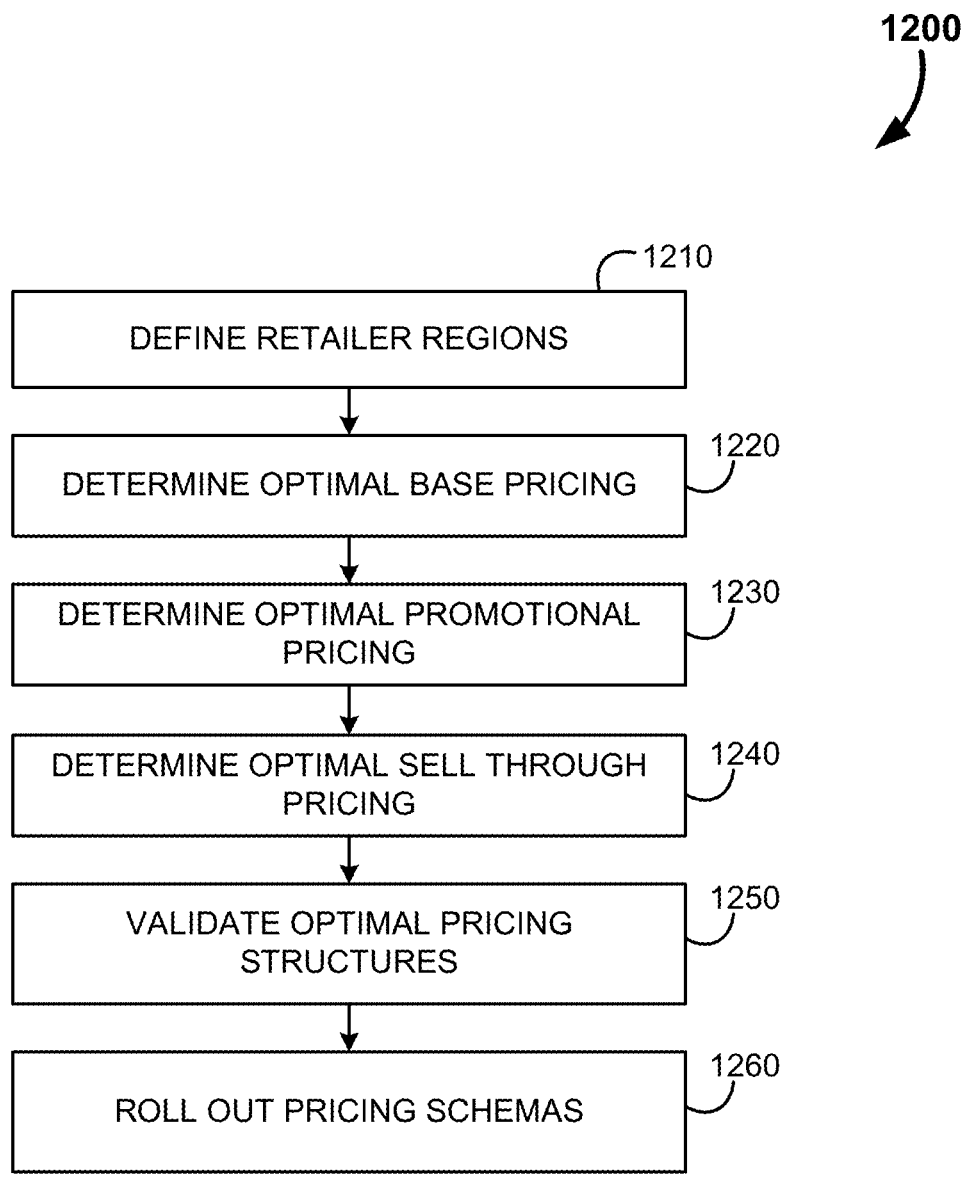
FIG. 12 shows, in accordance with some embodiments, a flowchart of an example method for the generation and testing of promotions within a brick and mortar retailer space.
Figure 13:
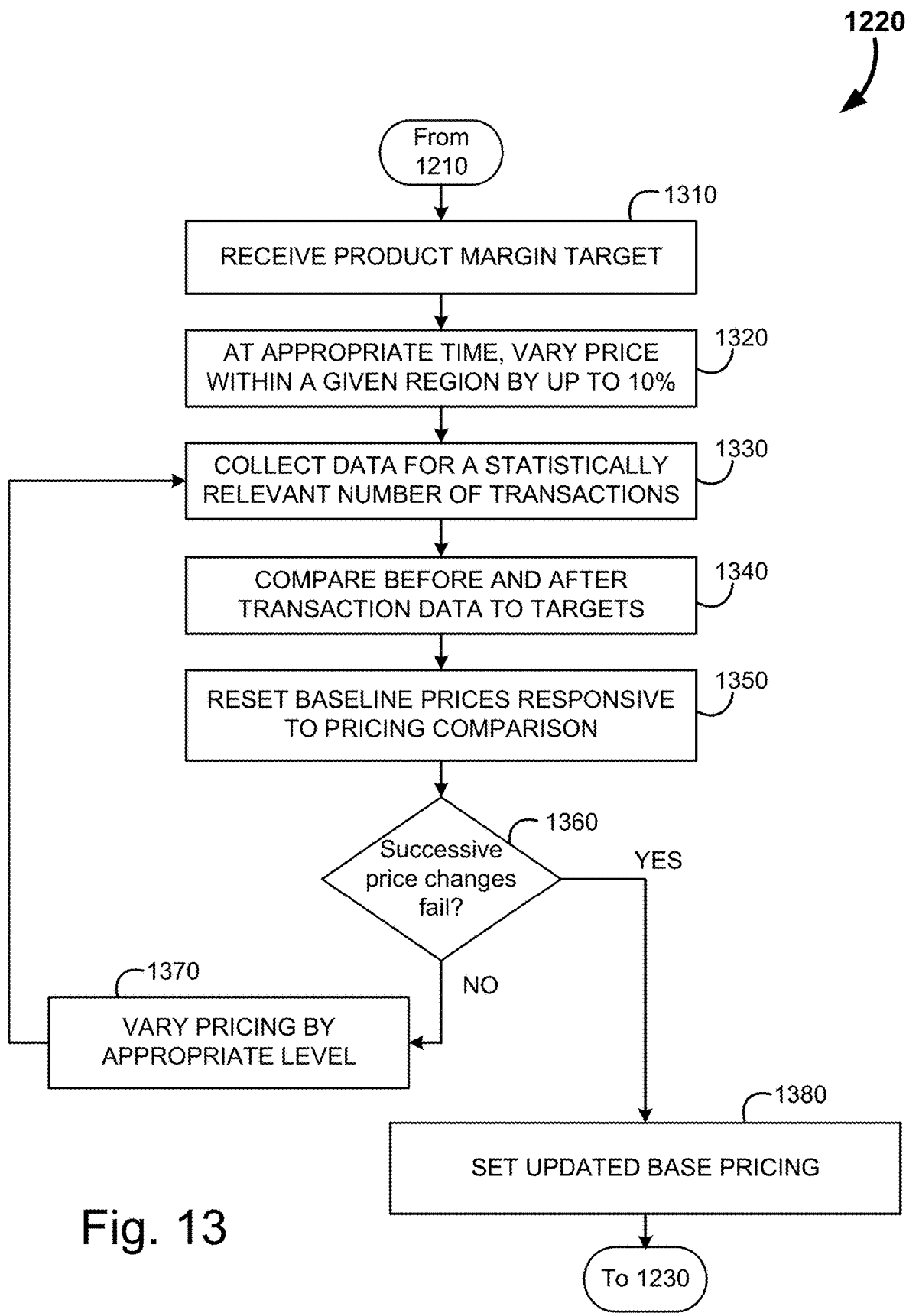
FIG. 13 shows, in accordance with some embodiments, a flowchart of an example method for the determination of optimal base pricing in a brick and mortar setting.

Moving on, FIG. 12 shows a flowchart 1200 of an example method for the generation and testing of promotions within a brick and mortar retailer space using the systems described in FIGS. 9-11D. This process starts with the definition of retailer geographic clusters (at 1210) which, as previously discussed, are typically predefined by the retailer chain. The base pricing of goods are then optimized for within this region (at 1220). FIG. 13 provides a more detailed flow diagram of this process of defining optimal base prices.

Promotions, as one would expect, are designed typically to make the most profit possible. While overall profitability is advantageous, it does not necessarily equate to the best long term strategy for a product. For example, many times profitability maximization squeezes margins in an unsustainable manner. Small disruptions in supply or demand can result in catastrophic losses, and it can be a risky operating condition. Thus, most retailers wish to set their products' base price according to a desired margin rather than to optimize profit (or other metric). For the process of setting the base price, the retailer must first provide this target margin (at 1310) to the system. The system then sets a deviation from the current price (typically up to a maximum of a 10% swing) to ascertain the impact on profitability (at 1320). Since a fixed margin equates to a set price of the goods, varying the price too much is determined disadvantageous. Modulating prices around a margin goal however, may identify local profitability maxima that may be fine-tuned.

The price changes, preferably, are updated over night when the store is closed. For 24 hour retailers, this may be set to a low volume period, and all prices in the store may be updated at the same time. In some cases, a grace period of an hour (or other acceptable timeframe) may be provided by the 24 hour retailer after a price update. Consumers who complete their purchase within this grace period will be afforded the lower of any price that was displayed for the item. For example is ice cream was offered at $3.99 and frozen pizza at $9.99 at 11:59 pm, and the price changed to $4.99 and $9.50 for the ice cream and pizza, respectively, at 12:01 am, if the consumer purchases the items before 1:00 am the prices charged would be $3.99 and $9.50 respectively. Few consumers will bother altering their shopping behavior to go at very late hours for such a benefit, thereby limiting losses to the retailer. However, the goodwill gained by employing such a grace period is advantageous for most retailers.

After the prices are updated, the transaction data for the items is collected (at 1330). This includes sales volumes over time, changes in basket composition, etc. This data may be collected for a set period (such as one or two days for large volume items) or may be tied to a transaction number. For example, some items are deemed very low volume, such as shoe polish in the grocery store. Under normal circumstances, volumes for such a product are measured in the single digits per week. The item itself costs the retailer money to stock (given the loss of shelf space) but may be deemed valuable to the retailer by providing a "one stop shop" for consumers. For such an item, modifying the price for a few days (or even weeks) may be insufficient to gain statistically useful information regarding the promotional variable change. Thus, for lower volume products, it may be more advantageous to set a statistically meaningful number of transactions (say 400 for example) and only modify the price once this this number of transactions has been met. Additionally, for long lasting products, it may be advantageous to also have prolonged testing periods (commiserate with the lifetime of the product) in order to ascertain demand. For example, a Glade Plug In cartridge is intended to last 30 days. If promoted on one day, and most consumers are not in need of the item since their last cartridge is still operating, the short promotional testing may not adequately capture the impact of the promotion.

After the data has all been captured from the registers, the transaction volume, margin and profit from the testing period may be compared against the baseline price (at 1340). If the margin is still within an acceptable range of the target margin, and there is a statistically significant increase in volume and/or profit, then the baseline may be adjusted to the tested price (at 1350). The method then considers whether to continue testing for different base prices (at 1360). Only after a number of unsuccessful testing periods (ones where the base price remains the same after analysis) is the system sure the "best" base price has been reached. At this point the base pricing may be rolled out to a wider set of retailer settings (at 1380). Of course ongoing testing may always be undertaken, especially as underlying costs or the competitive landscape evolve.

If, however, the process is not yet complete, the pricing may again be adjusted by a smaller degree (at 1370) and retested in the store from the last 'best' price. For example, assume the price of apples is currently $1.49 each, and the price is adjusted to $1.35. There is a margin drop, but it is still within a range that is deemed acceptable by the retailer. Volumes during the testing period don't change much, however, so overall profit actually reduces. The base price thus remains at $1.49, but is now retested at $1.65 each. Again, this is an acceptable margin, and cases a minor reduction in volume. However the profit is higher by a statistically relevant amount (over 95% confidence), so the updated base price is now $1.65. The price is then adjusted to $1.69 by the system and analysis repeated. The profit now drops due to price elasticity causing a reduced volume. The base remains at $1.65 and is then tested at $1.59. In this example, sales recover sufficiently to make this preferred (statistically significant profit increase and still within margin range) over the previous price. After a number of such iterations, it may be found that the ideal base price is $1.62. Any more or less of a price change results in a lower profitability in this example. This base price may then be disseminated to a wider set of stores within the retailer's chain, particularly to stores serving similar consumer types. Overall sales of this item may be monitored, and should indicate an increase in overall profitability for the base priced item. If no increase is detected, additional testing (possibly in a different set of test stores) may be warranted. The preceding examples illustrates the testing process per product but keep in mind the system is optimizing categories or groups of products with a similar sales-margin objective simultaneously. The optimal price point for every product within a category is set by maximizing the overall objective function of that category which will include product self elasticities and cross-product elasticities influencing the demand of one product in that category versus another. For example, as the system tests prices for shredded cheese, maybe moving price up on Sargento shredded cheese, the substitutability of this category may see shoppers buy more of Kraft shredded cheese. As a result the cross-elastic effect is taken into account and both Sargento and Kraft's prices will be tested and an optimum will be determined for both brands and that optimum will be tested as well to validate the projection. All price changes will be guided by the objective function which in this case would be to grow volume in the shredded cheese category while maintaining a certain level of margin.

Figure 14:
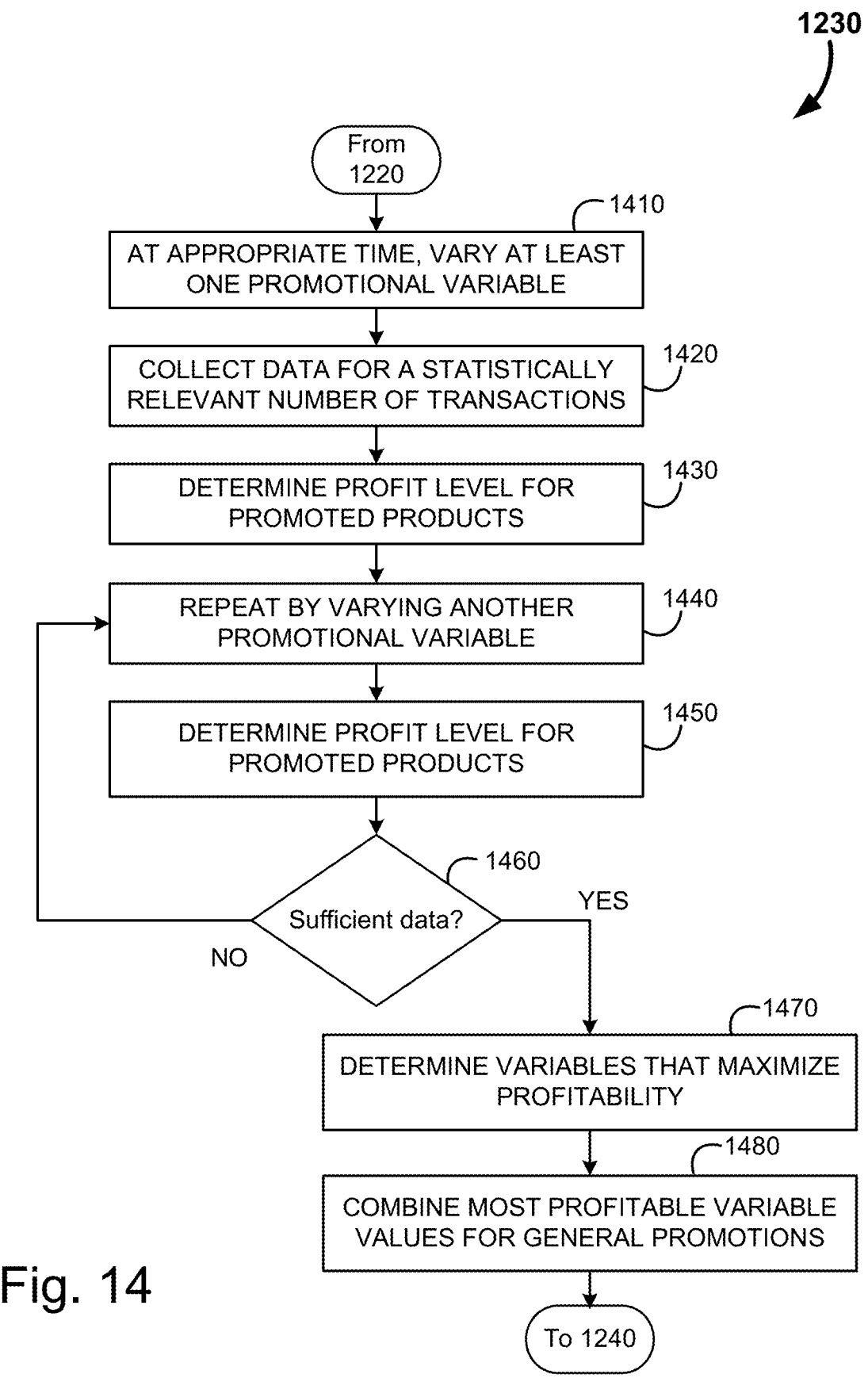
FIG. 14 shows, in accordance with some embodiments, a flowchart of an example method for the determination of optimal promotion pricing in a brick and mortar setting.

Returning to FIG. 12, after base price is optimized for, the method may optimize for the ideal promotion conditions (at 1230). FIG. 14 shows a flowchart of such a process. Much of the procedure and methodologies described previously may likewise be employed for in-store promotional testing. Where available, different promotion types (e.g., percent off, buy-one-get-one, reduced price, etc.) may be employed. Where the electronic tags allow, the testing of different images, color schemes, sounds, smells, and videos may all be tested for impact. Again, the altering of any promotional variable is typically updated (at 1410) when the store is closed, or during the lowest traffic period of time for 24 hour retailers. Unlike base price optimization, however, the variation of a promotional variable is not necessarily beholden to a particular margin requirement, or limited to a specific percentage change.

As with the base price optimization, the data for this change is collected (at 1420) for a statistically relevant period of time (either set time or by transaction count). Profit levels for the promoted item are computed (at 1430), and the process repeats for a different variable (at 1440). In some cases there may be a retailer requirement that an item is promoted only a certain percentage of the time and/or there is a 'cool down' period between promotions. Any such constraints will be taken into consideration between subsequent promotions.

Again, the profit for the new promotion is calculated (at 1450) and a determination is made if additional promotions are desired (at 1460). For many items, dozens or even hundreds of promotion variations are desirable to fully explore the test space of the promotion variables. The 'winning' promotion variable values may be collected and employed together from one promotion to the next to determine the 'best' set of promotional conditions. Only after exhausting much of the promotional space can the 'best' promotion values are fully identified. The usage of electronic tag signage allows such activity that would be cost prohibitive and unable to be completed (regardless of staffing levels) in real-time otherwise.

Once these variable values that maximize profitability have been all identified (at 1470) they are combined with other winning variable values for general promotions across all retailers in a geographic area or even across all retailers in the chain (at 1480). Returning to FIG. 12, after the preferred promotional variable values have all be identified, the process may continue by determining optimal sell through pricing (at 1240).

Figure 15:
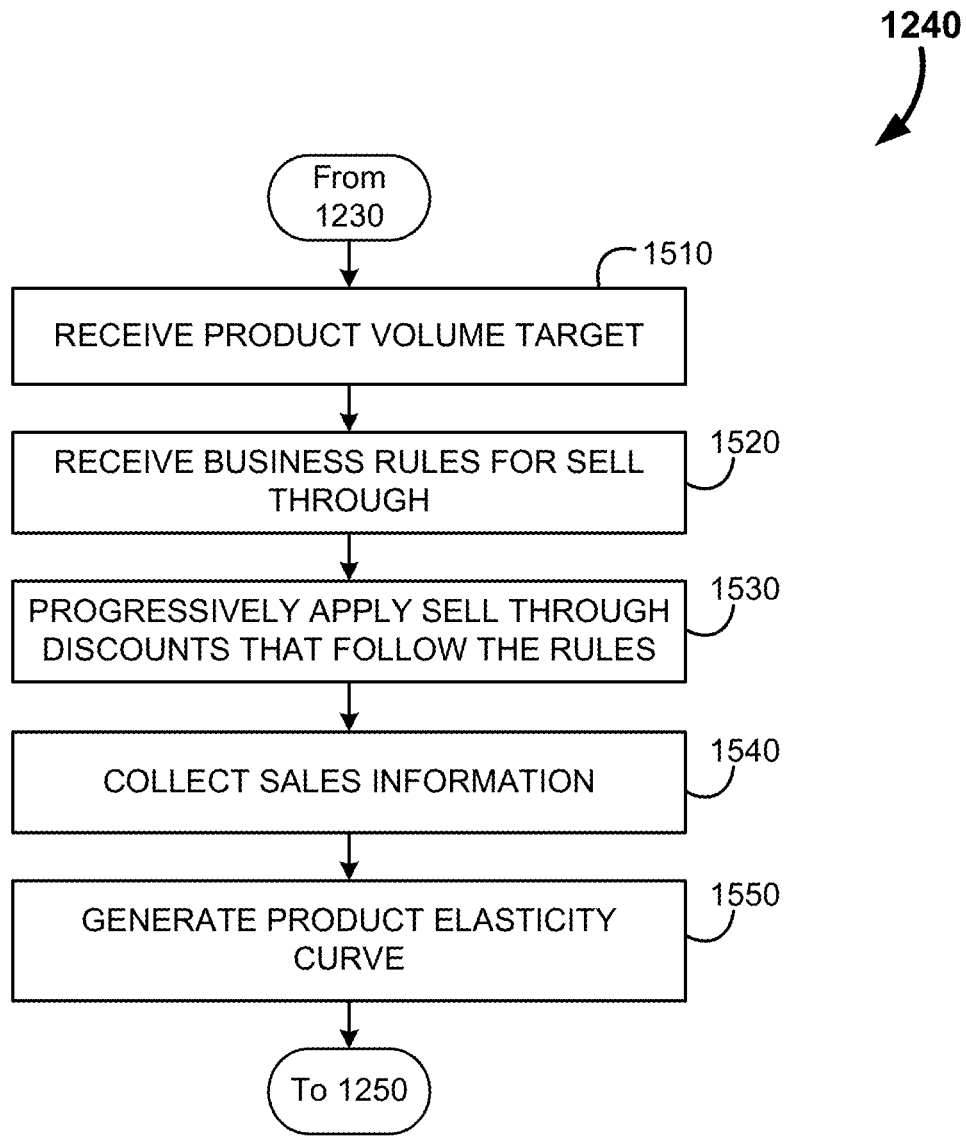
FIG. 15 shows, in accordance with some embodiments, a flowchart of an example method for the determination of optimal sell-through pricing in a brick and mortar setting.

FIG. 15 shows a more detailed flowchart of this process for determination of optimal sell-through pricing in a brick and mortar setting. It should be noted that unless sell through activity is anticipated for a product, this process may be skipped or deferred until a sell through event is necessitated. The reason for this is sell through policies, including typically progressive and deep discounting, may accomplish a volume goal, but usually underperforms on other metrics like profitability. When there is a supply glut, a need to clear out inventory to make room for additional product, or possible expiration of product, then such sell through activity may be desired. But routinely, sell through activity is not necessarily desirable for durable year-round goods.

When sell through activity is expected, however, it may be beneficial to perform testing to characterize how a particular product responds to promotional variables to meet sell through goals. The basis of any sell through activity is, of course, knowledge of the volume of product that the retailer wishes to dispose of, and the time frame to accomplish said goals. These are received from the retailer (at 1510), along with business rules (at 1520) that place additional restrictions on the sell through activity. These restrictions may include a bottom limit for price or margin, limits to the percent or dollar value of a change in price, limitations on frequency of price changes, etc. Although not illustrated, information gained from the promotion optimization may also be leveraged in order to assist in sell through activities. For example, if the promotional testing showed that a particular display color (in instances where the electronic tags are color capable) results in larger sales levels, then this variable value may be incorporated into the sell through activity. Additionally, the promotional variables already tested provides at least a baseline idea of volume lifts associated with various pricing points (and other promotional variables). In the ideal situation, sell through goals may be met using variable values similar to the optimized promotion variables. In such situations the profit may be maximized (or close to maximized) while meeting the sell through volume goals. Realistically however, often the sell through volumes are larger than what is achievable using values for the promotional variables that are at, or near, the optimized values for promotion optimization.

Figure 27A:
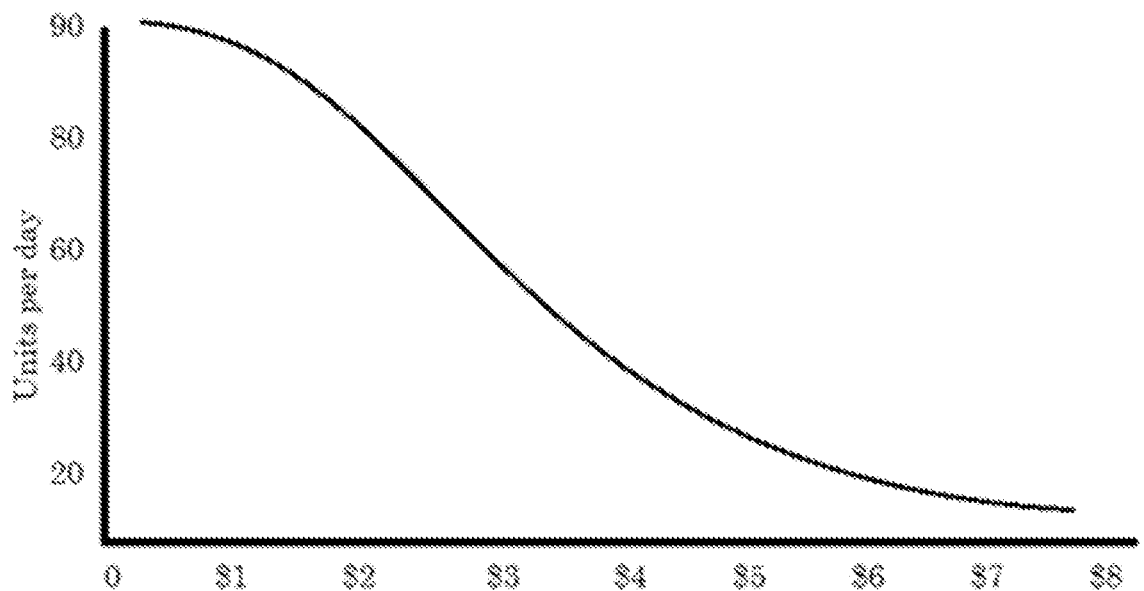
FIGS. 27A and 27B are example elasticity and profitability graphs.

The testing of sell through proceeds by making progressively deeper pricing discounts to the item's price (at 1530), and collecting sales information for the items (at 1540). Using this data, a complete price elasticity curve for the item can be generated (at 1550). This can be used in the future to estimate and plan for future sell through events. For example assume the price elasticity curve is provided in FIG. 27A.

Figure 27B:
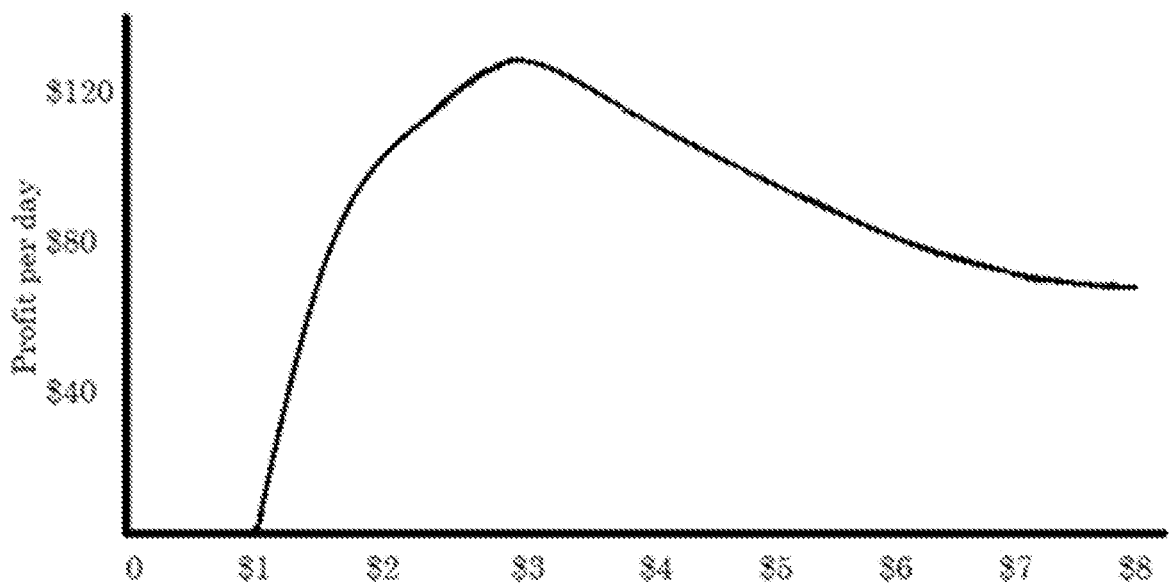

In FIG. 27B, the price of a product is shown on the x-axis, and sales volume is on the y-axis. For this product, the cost per item for the retailer is approximately $1, resulting in the following profitability curve, as shown at FIG. 27B.

In FIG. 27B, again the item price is shown on the x-axis. The profitability per day is determined by the volume times the profit per item, and is illustrated on the y-axis. For this example suppose that baseline pricing has been optimized for $5.00 (since a 400% baseline margin is desired), and promotional optimization price is at $3.00 (profit maximized). For this example, additional promotional variables will be ignored for the sake of simplicity, understanding of course that additional variables may be optimized for in real-world conditions.

If the retailer indicates that a total of 500 units need to be sold within a one week period, the system may design a pricing schedule over this period that achieves this goal, while maximizing overall profit. This scheduling generates an equation for the profit, and measure the area under the curve for differing prices over the sell through period. In this example, assume the price can be altered only every 2 days (as dictated by a business rule of the retailer). This means that there are a maximum of 4 different prices over the sell through period. The process would conclude setting the price at $3 for the initial 5 days, followed by a price of $2 for the final two days. This would result in a sell through of the 500 units over the seven day period, while maximizing profit at $760 over this promotion period.

It should be readily understood that this example price elasticity curve and corresponding profit curve is overly simplified for illustration purposes. Actual elasticity curves are often more complicated and nuanced, and profitability is further muddled based upon differing costs associated with volumes of products being sold, storage and inventory costs, lost retail space, stocking costs and the like. As such, actual sell through schedules tend to be far more complicated, often with a number of price changes that may be updated periodically throughout the sell through period as the actual sales of the items are compared against the expected sell through volumes.

Returning to FIG. 12, after all variable values have been optimized for the different use cases (base price, general optimizations and sell-through), the final step is the rolling out of pricing policies to a larger set of retailer establishments (at 1260). This may include merely rolling out these pricing and promotion findings to other retail stores that are similar (historical transaction trends are similar), or may be rolled out to a wider segment of brick-and-mortar retail locations. When determining how similar two stores are, there are a few options available for the system. The first is to compare transaction histories of the retailers and use clustering algorithms (such as least mean squares or distance algorithms) to determine retail locations that have similar historical sales patterns. The degree of similarity between "close" stores and "different" stores may be an adjustable threshold set by the retailer. Otherwise, the retailer may indicate that all stores should be clustered into a certain number of groups, and the most similar stores are clustered accordingly.

Alternatively, the clustering may be based upon reaction to varying promotion variables. Two stores, for example, may have very different historical transaction records, but may have similar volume lifts based upon the altering of particular promotional variables for items. While baseline preferences of the consumers of these stores are very different, how the consumers behaviors alter in response to promotional activity may be similar. These stores are thus very similar, from the perspective of reaction to price/promotion activity, than stores that may have more similar historical transactions. Again, clustering algorithms, already known in the art, may be employed to determine which stores have similar reactions to changes in promotional variable values.

Obviously, using the reactions of stores is a preferable method of clustering store locations by 'similarity' but this requires substantial data collected for each store regarding the impact a change to a particular promotional variable has. In many cases such data is simply unavailable or incomplete, and in these situations the historical transactions may be relied upon instead.

While the above process has been illustrated as linear, in application these steps may be taken in any order. For example, a retailer may wish to exhaustively test promotion optimizations and then rapidly roll these out to various other stores. Such a retailer may not be concerned with altering base pricing as the consumer base is used to a particular 'regular' price. Additionally, even after roll out, the determinations made during optimization of any variables are routinely and continually reexamined, retested and validated. This ensures that any errors in the testing are corrected for, and accounts for the fact that consumers are not static: their preferences, purchasing behaviors and reactions evolve over time.

Figure 16:
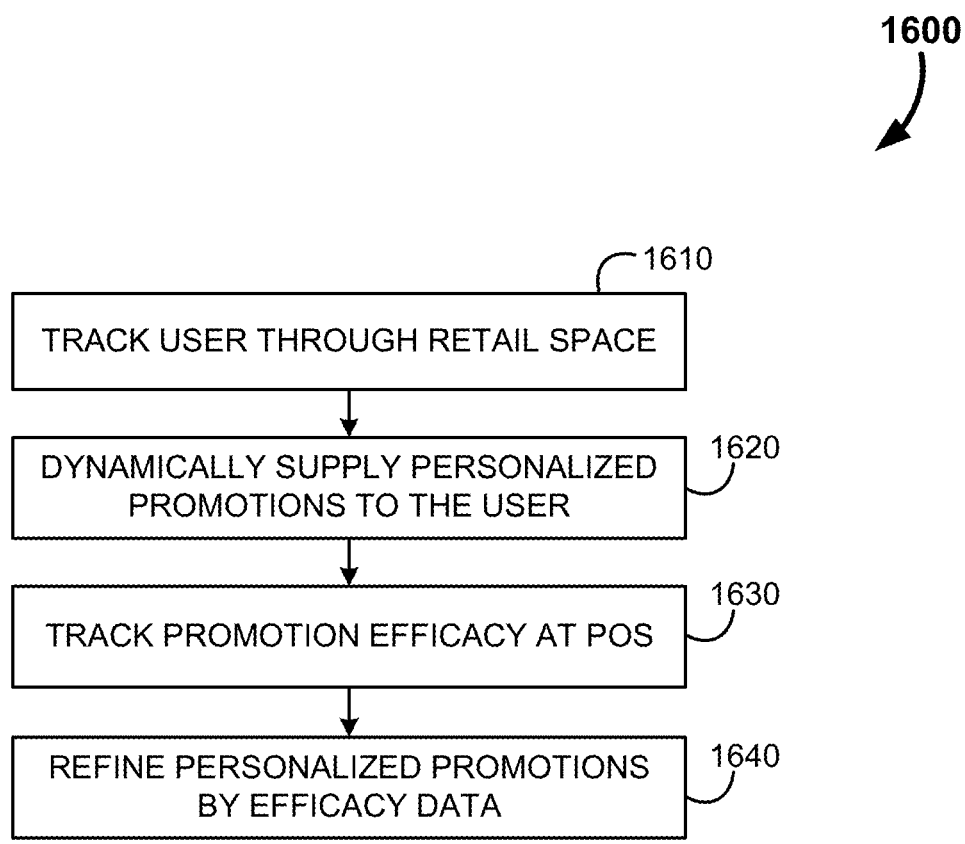
FIG. 16 shows, in accordance with some embodiments, a flowchart of an example method for the personalized promotion in a brick and mortar setting.

In addition to the above described store-wide testing that has been discussed in considerable detail, the usage of electronic tags within a brick and mortar retailer enables additional functionality not previously possible with non-electronic tags. For example, personalization of displays and promotions may be possible for each consumer as they peruse the retail space. FIG. 16 shows one flowchart 1600 of an example method for such personalized promotion in a brick and mortar setting. This process is dependent upon tracking the user/consumer through the retail space (at 1610). As previously discussed, such tracking may be done by a shopping cart sensing signals throughout the retail space or, more commonly, through an array of sensors within the retail space. These sensory can track a signal (e.g., RFID, Bluetooth, wireless ISM band radio signal, etc.) being emitted from a shopping cart, or a device commonly carried by virtually every consumer (e.g., a cell phone). Alternatively, image recognition, or other biometric data may be leveraged to track the consumers throughout the retail space.

Figure 17:
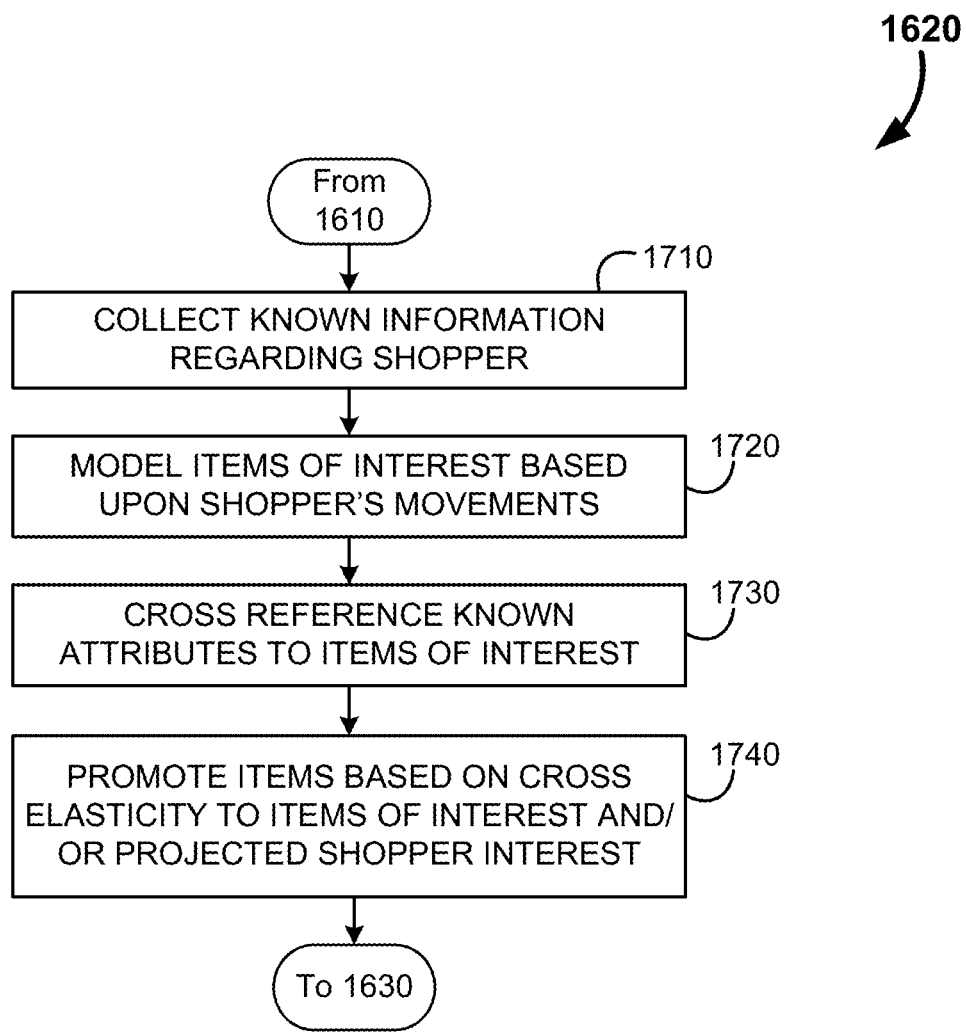
FIG. 17 shows, in accordance with some embodiments, a flowchart of an example method for the dynamic supply of the personalized promotion in a brick and mortar setting.

The location data may be combined with data known about the user, in-store behaviors, and the like, to present the user with personalized promotions as they move through the store (at 1620). FIG. 17 provides a more detailed view of this sub process, where the known data regarding the shopper is initially collected (at 1710). In some cases the consumer/user is a blank slate, with no known information regarding this individual. Other times the user may be connected to a larger retailer infrastructure, with a loyalty application loaded on their phone, or other mechanism for identifying the individual. Such applications may be programmed to ping the retailer when entering the location with an identified for the user. Users are likely to opt in for such services due to the monetary savings, and more personalized shopping experience, they realize as a result.

The user's identity information may be matched with prior purchases, selections on the retailer's loyalty application, and other publically available information to determine what products the user typically purchases. Promotional variable values that have worked particularly well for the user may also be identified.

The user's movements through the store may also be used to track if the user has interest in particular items (at 1720). For example, if the user enters an aisle with cereal, and pauses for a moment at a particular location, the user can be assumed to be looking at, or even grabbing one of a limited number of items from the shelf. The user's known attributes and movement data may then be combined (at 1730) to generate the best possible personalized promotions for this particular user (at 1740). For example, if a user is known to purchase milk and cereal in the same shopping trip, and sometimes purchases milk and a high margin cookie on selective trips, the system may determine in real-time that after stopping near the cereal the user will be present in the milk aisle in the future. When in this aisle, the electronic tag may then present the user with a deal related to savings on the cookie brand of preference for the user, when purchased with milk. The user likely was not considering purchasing the cookies when entering the retailer, but may be persuaded to increase their overall spend within the store, on higher margin items, based upon this electronic tag display.

Returning to FIG. 16, the efficacy of these personalized promotions may be tracked at the point of sale (at 1630). This data may be appended to the user's account/profile, when available. Even for user's who do not have such a persistent identity, the promotions that are more effective may be retained and reused for shoppers with similar movements throughout the retail space. In such a manner the personalized promotions may be refined over time (at 1640) such that only the more effective promotions are displayed to a given user. For example, in aggregate, it may be determined that discounting cookies at the milk aisle is not particularly effective, but displaying a sale on buns when the user is in front of hotdogs and hamburger patties is effective, raising the sales of both the buns and meat products. This efficacy tracking may be made even more powerful by being able to personalize the promotions down to the individual. For example, assume our user is influenced by buy-one-get-one-free sales at a disproportionate rate. Such promotions may be displayed to this user more often than other consumers in order to increase sales at the individual consumer level.

IV. Base-Price Optimization within A Physical Retailer

In addition to the above disclosed promotional testing methodologies, and particular promotion optimization within brick and mortar retailers, this disclosure will additionally focus on the optimization of base prices of products within a retailer. As noted previously, "normal" pricing of a good or service in a retailer is typically determined based upon a manufacturer's recommendation (the MSRP), pricing policies compared to a competitor, or some sort of internal metric for the retailer (e.g., particular margin or volume goals). These base prices are usually very static due to the expectation of the consumers that certain products have a certain base price, the cost and difficulty of updating signage and point of sales systems, the reliance on historical business practices, and the general ineffective nature of trying to update base prices. For most retailers the traditional methods of setting the base price are "good enough" and the cost and effort to refine these base prices may be perceived as being too large for what may amount to a minimal benefit.

However, as online retailers become the norm, there is a newfound interest in addressing base pricing within the physical retail space. First of all, the retail sector is more competitive than ever due to the flourishing of online shopping. Even small improvements in pricing are valued in such a competitive market. Additionally, online retailers routinely perform testing on base prices—there is very little cost to updating a webpage (unlike physical signage), and these companies tend to be less static and more innovative, leading to less hesitancy to alter prices. In turn, consumers have become more open to the concept of a fluctuating base price.

However, physical retailers still suffer from a set of maladies that an online retailer may not need to contend with. There is still a larger cost to perform price testing in a physical retail space. Additionally, online retailers may be able to test pricing models on individual consumers and across the entire platform, allowing for modern sampling and test models to be employed. This removes many, if not all, of the risk of unrelated variables contaminating the results of such testing. In contrast, physical retailers still must contend with a greater number of extraneous variables that may influence the sales results. For example, since the consumers for a store are all similarly geographically located, local events, weather, traffic, etc. may influence any testing. While an online retailer may configure their website in a myriad of ways, a physical retailer is locked into a particular building, staffing level, and other factors that may influence the accuracy of any base price testing. As such, not only is it more costly for a physical retailer to test base pricing, but the results are often not as accurate, leading to minimal base price testing in most physical retailers.

The disclosed systems and methods address these concerns by ensuring the fidelity of testing data, enhanced testing deployment across many retailers in a retail chain, and advanced analytics to minimize the chance that external factors unduly impact the base price testing results. Pricing is tested incrementally, and optimizations adopted while continued verification occurs. As such, the results of the disclosed testing are far more accurate than prior methods of base price optimization techniques. The incremental changes in tested price (and the conditioning imposed by online retailers) minimizes consumer aversion to such testing. Lastly, the efficient test design and early adoption of optimized results reduces costs to a retailer significantly. In fact, when paired with the electronic signage disclosed previously, the cost may be negligible even at the testing outset, and will result in a net gain before the testing is even completed (before any global adoption). This allows physical retailers to more effectively compete in the marketplace in a manner that has never before been possible.

Figure 18:
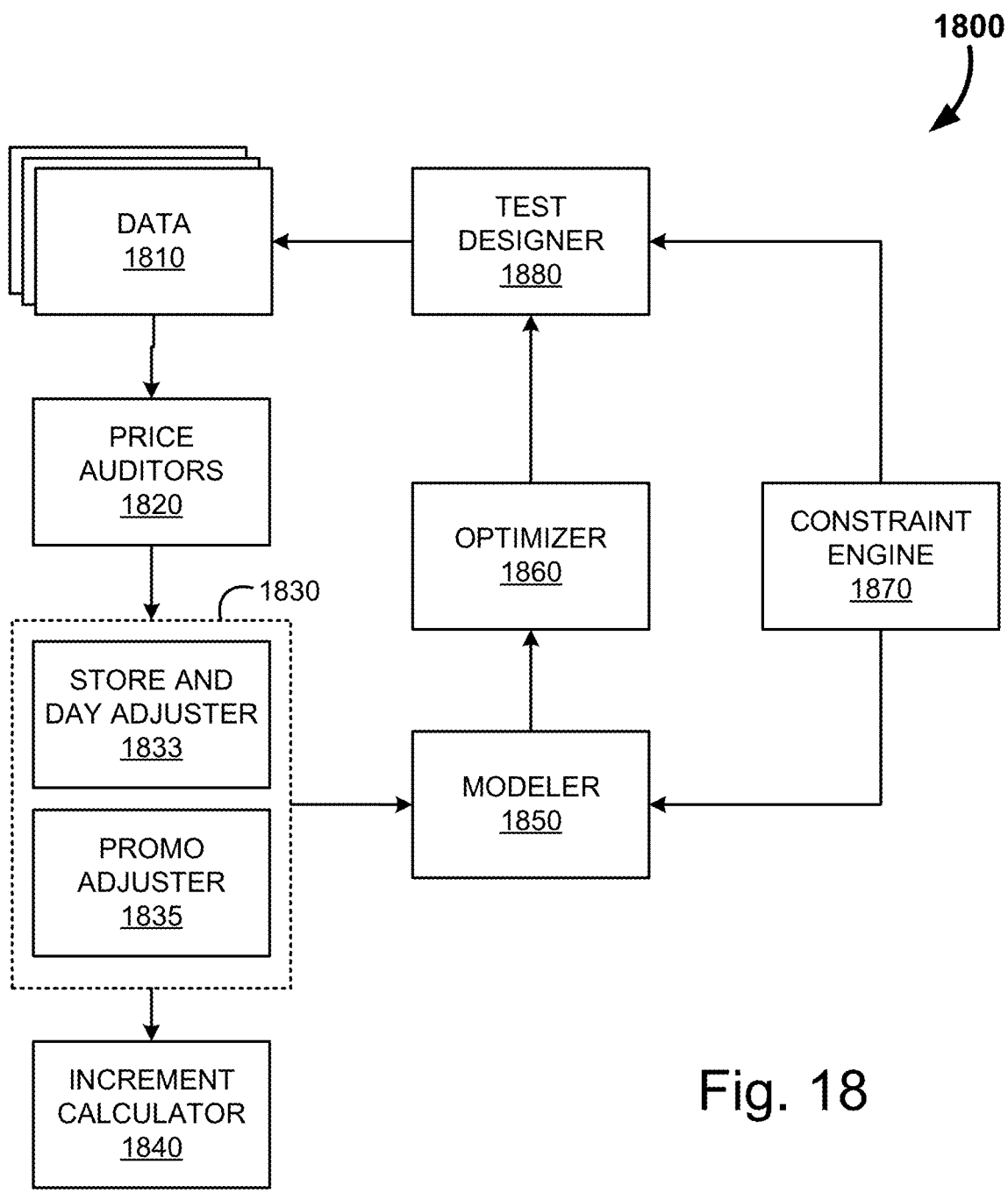
FIG. 18 shows, in accordance with some embodiments, a block diagram illustrating the system for base price optimization.

FIG. 18 provides a block diagram illustrating the system 1800 for base price optimization, in accordance with some embodiments. In this example block diagram data 1810 is employed for analysis. This data 1810 is typically a collection of historical transaction information (t-logs). These transaction data sets may be aggregated by individual stores within the retailer chain, and by day. In some advanced embodiments, t-log data may even be aggregated on a more granular level, say on an hourly basis, to provide for more detailed analysis of purchasing habits. Generally, however, a physical retailer will not wish to alter pricing in the store more than once a day (even though such capability may be possible using electronic tags) due to the confusion it may cause the customers in the store. As such, while more granular aggregation may provide interesting insights into price impacts on behaviors, this degree of analysis may be merely academic as it will be impractical to take action based on such specific analysis.

Retailers, even when fitted with electronic tags and automated pricing rollout software, are notoriously inconsistent in making pricing changes with fidelity. This is particularly true when the price change decision is made by a third party rather than a corporate headquarters. This is particularly pertinent in that the disclosed systems and methods for price testing and base price optimization may be employed by a retailer as an in-house pricing solution, or may alternatively be provided by a consultant company to maximize the retailer's profits. Most retailers are not data analytics companies, and lack the infrastructure, IT expertise and knowhow to deploy this kind of testing internally. As such, for most retailers, it may be more efficient and economical to have this process performed by a third party. However, when a third party provides stores instructions on prices that should be implemented, the store manager, or other controlling employee, may not honor the price change, or the start and end date of the price change. This may corrupt the t-log data and should be identified and corrected for in the modeling process in order to ensure the accuracy of any optimizations. The price auditors 1820 may make the comparisons between the rollout plan for price testing, by store and day, against the actual data collected in the transaction logs.

After data verification by the price auditors 1820 a series of adjusters 1830 may modify the data to reduce the impact of external variables, and normalize the data. A store and day adjuster 1833 may modify data by day and store. For example, in many places lift is much higher generally on weekend days as opposed to weekdays. The day adjuster may globally modify the t-log data to account for such day-to-day variations. Additionally, certain days tend to generate greater lift for particular goods or classes of goods. For example, eggs may sell at much higher rates before Easter, and grilled foods on Saturdays during the summer and especially before the $4^{th}$ of July.

The day adjustments may code each day of the year numerically, and have an associated set of adjustments that apply to that day. By applying a separate set of adjustments that are tied to each day, the impacts of seasonality and the like are accounted for. Additionally, known events that occur on different days each year, such as Chanukah or the Chinese New Year, may likewise be accounted for and the adjustments for these events may be applied to the correct numerical day.

In addition to adjusting volumes for trends on a given day, the system may also consume external data feeds that may be correlated to sales volume shifts, and these may be used to adjust the t-log data accordingly. One obvious example of such external information may include weather feeds. On very hot periods the sales of frozen confections may experience an unusual volume lift, and hot beverages like coffee may experience a depression of sales, for example. Other factors that may be considered include major sporting or entertainment events (e.g., the Super Bowl, World Cup, major concerts, etc.), political events such as elections, civil disruptions, natural disasters, unusual traffic congestion in urban communities, macroeconomic factors (e.g., consumer sentiment index, employment rates, inflation rates, etc.), major domestic or world events (e.g., wars, terrorist attacks, trade conflicts, etc.), and price changes at competitor retailers. This listing of possible external feeds, and making adjustments accordingly, is not exhaustive, and as more granular and historical data may be collected, the value of incorporating additional external feeds and adjustments may increase.

Such adjustments to account for volume variations that are entirely independent from the price may be applied by the store and day adjuster. Likewise, each store may cater to different customer segments, and this may influence the volumes of products sold. From t-log data, if it is seen that a particular store always sells more widgets than another store, the impact of price should be tempered by this innate lift advantage of the store.

After day and store adjustments (and external factor adjustments, if desired) are applied, the t-log data may be normalized by store level attributes. For example, category sales by store maybe a function of percent category sales of the store, average basket size of the store, total store transactions, etc. These performance store attributes can be directly applied to category sales as coefficient adjustments or by normalizing the sales by a modeled value dependent on these attributes via GLM or OLS methods. Lastly promotional adjustment methods may be employed by the promo adjuster 1835. These promotional adjustment methods may include, for example, regressive methods or relative pair-wise methods. Accounting for promotional activity within a category is important given how products interact relative to one another from a consumer's buying preference. Given the time, store and specific product line groups on promotion, price elasticity measurement for non-promoted products are estimated by ensuring that promotional factors or variables are considered in, for example, a regression based model that looks to extract such elasticity coefficients while also accounting for promotional effects. Another approach looks to estimate these elasticity coefficients only when promotional activity on promoted line groups within a category is homogeneous across stores that have different test price points for non-promoted product line groups. Pair-wise comparisons of these particular types of stores will ensure that the cross-elastic promotional effect is experienced equally for the non-promoted tested product line groups.

After all the adjustments have been applied, an increment calculator 1840 may undergo ongoing pricing calculations for the sales prices from the control price determined by degree of price change magnitude and statistical differentiation, as well as historically tested prices. For example, magnitude changes may be limited to a 10% change, and the system may have determined that there is no statistically measurable differentiation between prices that are less than three cents different from one another. If the control price is $1.99, the initial test prices may be $1.79 and $2.19 (within the 10% change limit). It may be determined that volume and margin results in larger profits at $1.79 versus the control price. Next iteration the test prices may be $1.65 and $1.89 due to the percent change limitation, and the fact that $1.99 has already been tested. In this cycle it may be determined that profitability (and any other metric used to determine success of the price structure) is improved at the $1.89 level. Next iteration the prices may be set at $1.85 and $1.95. After this cycle $1.85 is determined to be the preferred price, and further testing (outside of periodic validation) may not be warranted, because any price change will be within the statistically undifferentiated three cent value of a previously tested price.

The modeler 1850 consumes the adjusted t-log data and calculates elasticity between the estimations between the various products found within the retailer. In addition to the adjusted data, the modeler 1850 may also consume constraints from the rule engine 1870, which will be discussed in greater detail below. Elasticity calculations are known in the art, and any suitable techniques or calculations for elasticity may employed. Additionally, the modeler may calculate an objective function. In some embodiments, a general linear model may be constructed for estimating product self-elasticity and cross-product elasticities. Spurious elastic effects may be filtered out, and overfitting to errors may by avoided by reducing the number of individually estimated elasticities by simple aggregation techniques, by also adjusting the statistical level of significance for assessing statistical effects (e.g., Bonferroni adjustment, etc.) and finally by cross-validating models and their elasticity estimates through sampling techniques. The objective model may be built in a manner that is easily consumed by a variety of solvers.

Output from the modeler 1850 may be utilized by the optimizer 1860 to solve the objective function, under the constraints from the constraint engine 1870 and elasticity estimations. The category objective function may be solved for a generalized maximization of the following function:

$$e^T \Delta x_p$$

Where e is a matrix of price elasticities, T is the transposition of the elasticity matrix and $\Delta x_p$ is a vector of product line group price changes (or deltas) within a given category where x is a price and p is a product line group number. The multidimensional representation of elasticity multiplied by price change will yield change in quantity (or sales). The general maximization of this function is subject to:

$$A x_p \geq m \text{ and } x_p \leq c$$

Where A is a matrix of margin percentages constraining product line group prices, $x_p$, to be above or equal to a cumulative vector margin, m, set by the category manager and c is a vector of price constraints by which product line group prices must remain under. Price constraint definitions or rules maybe more complex than simple price thresholds but also encompass price relationships amongst other product line groups (i.e. $x_1 - 0.5 x_2 \leq 0$ or $x_1 \leq 0.5 x_2$). Methods that may be employed in this general maximization may include linear programming solvers (Simplex and Interior Point), sequential least squares programming, gradient ascent for analytic solve, generalized linear model solvers (such as Gauss-Newton method) and generalized linear model with recommendations.

After the optimal prices are solved for using the above methods, the nearest neighbor of test price point may be selected using algorithmic methods, such as maximum objective value. The best of the three test price points, the optimal price, and a new test price within the price movement constraints are then recommended. These recommendations are used by the test designer 1880, again subject to the constraints from the constraint engine 1870, to generate a test design within the available physical retailer stores. The constraint engine 1870 may include rules associated with brands, pack sizes, maximum and minimum allowed prices, ending digit of the price, competitive gap between a price and another retailer, store execution rules, and store to store maximum price changes. This listing of rules is intended to be merely illustrative, and additional rules may be employed based upon retailer demands, or manufacture requirements. A rule conversion occurs to change these rules into a canonical set of constraints that is, as discussed previously, consumed by the modeler 1850 and test designer 1880.

The test designer 1880 employs algorithms for experimental designs for concurrent multiple price changes for multiple products under constraints. Below a series of examples are provided that will more fully explain the methods employed for test design. Generally, however, the test design will include randomized store allocation for price deployment, D-optimal designs via exchange algorithm, and Box-Behnken design. The results of any tests are then recorded in the transaction logs, which become part of the ever expanding data 1810 corpus.

Figure 19A:
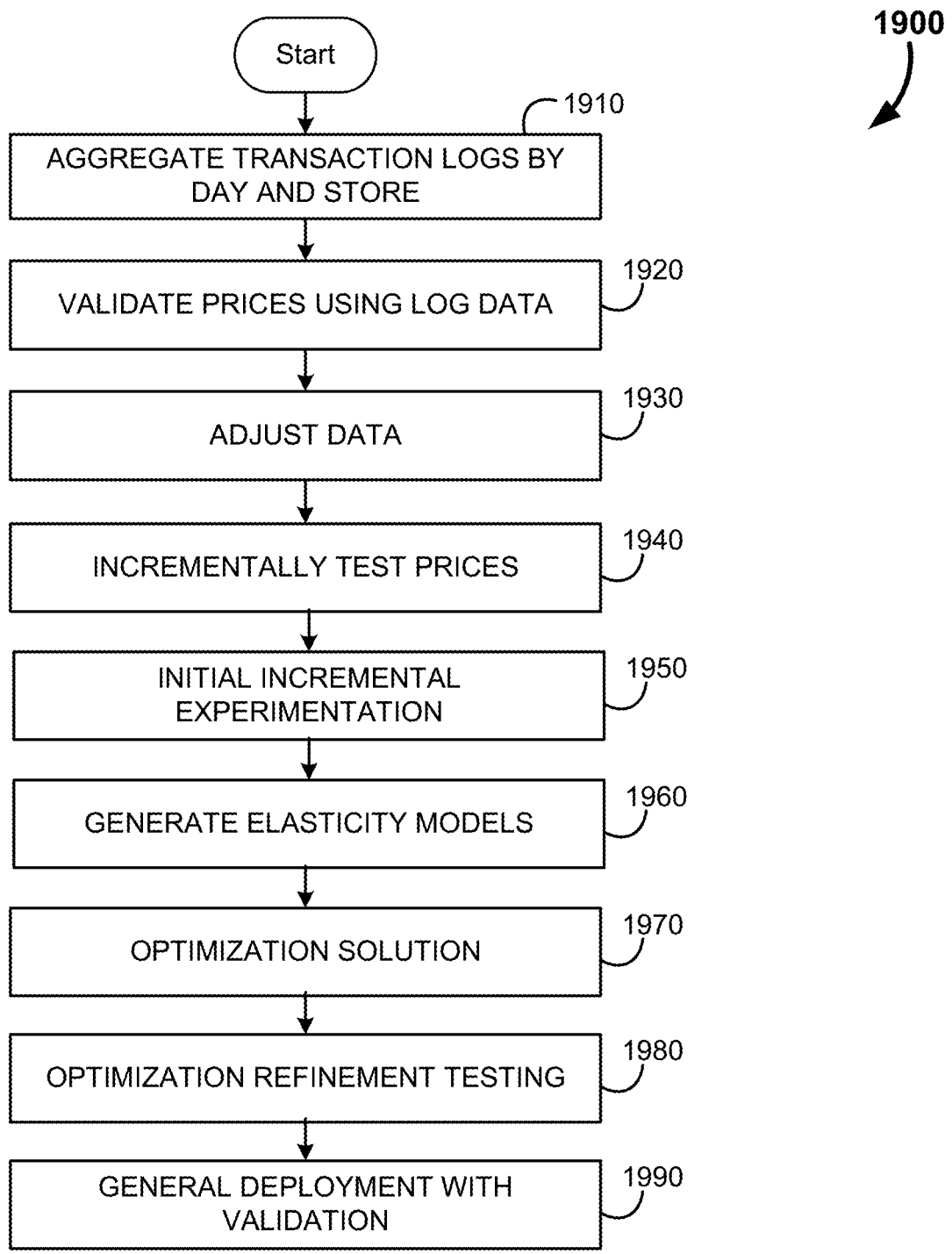
FIGS. 19A and 19B show, in accordance with some embodiments, flow diagrams illustrating the method for base pricing optimization.
Figure 19B:
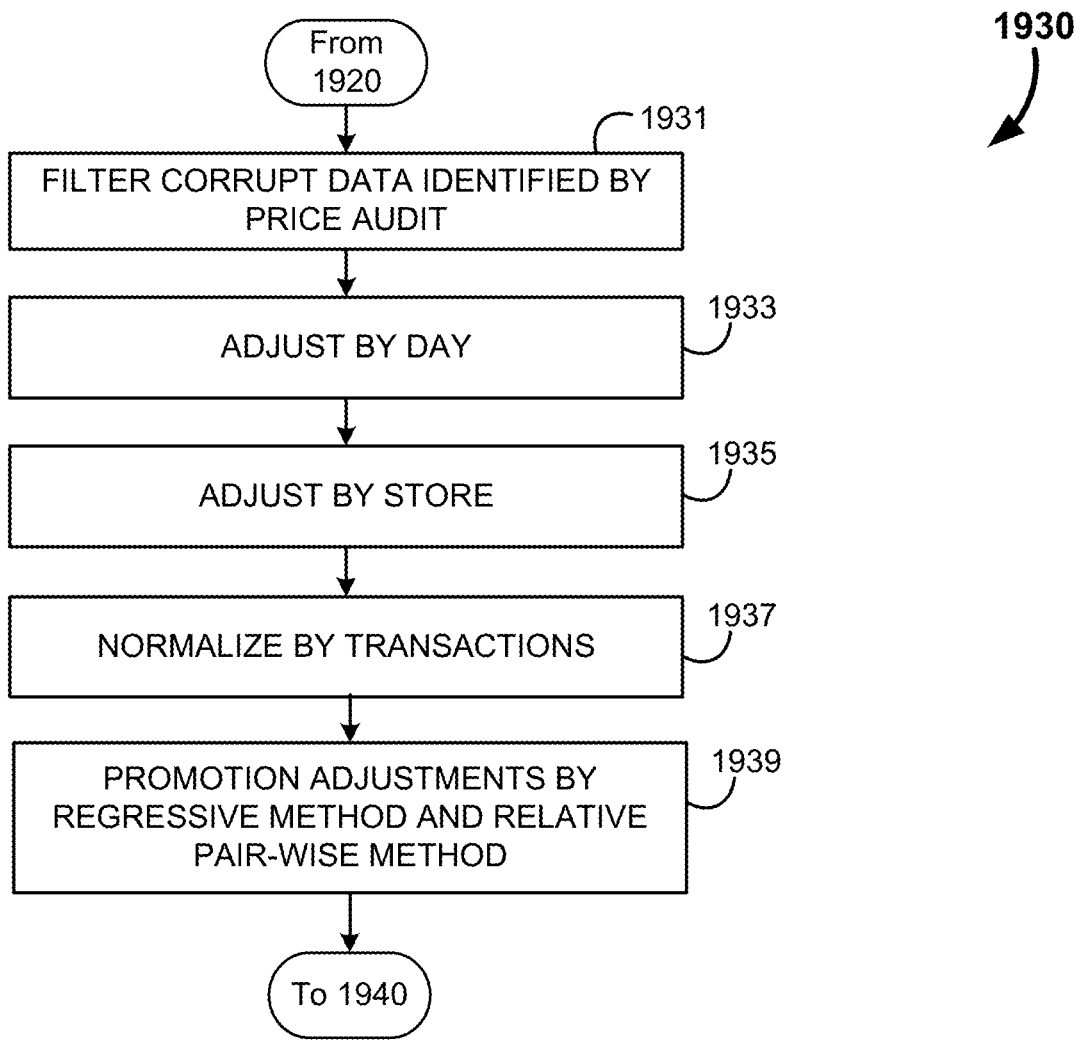

FIGS. 19A and 19B show, in accordance with some embodiments, flow diagrams illustrating the method for base pricing optimization. In FIG. 19A this example process 1900 is shown with the initial aggregation of transaction data by day and store (at 1910) as discussed previously. This may include aggregation of many years of historical pricing and transaction data, when available, and the collection of all future transactions that provide results of the price testing. The data may be validated (at 1920) for accuracy against the assigned price testing since, as discussed, retailers often are not good at deploying the prices as directed. The t-log data is then adjusted (at 1930). This adjustment process is shown in greater detail at FIG. 19B, where corrupt data that has been identified by the price auditors is filtered out (at 1931). The prices may be adjusted by day (at 1933), by store (at 1935) and by any external factors as described previously in considerable detail. The transactions may be normalized (at 1937) and the promotions adjusted by regression method and relative pair-wise method (at 1939).

Returning to FIG. 19A, after data has been adjusted the test prices are incrementally calculated (at 1940) by solving for an objective function and using what known elasticity between products that is known, subject to constraints. These test prices are experimented (at 1950), and the results are collected. This allows for better elasticity models to be generated (at 1960). Again the optimization is solved for (at 1970) and this refined set of test prices may be tested (at 1970). This allows for a repetitive set of transaction data to be collected, verified, adjusted and used to update the elasticity models. Each testing iteration allows for prices to be tested that are closer to the optimal price point for each product. Once the optimal price has been identified, it may be deployed to the majority of retailers with minimal ongoing validation occurring (at 1990).

Now that the systems and methods for base price optimization through pricing testing have been disclosed in considerable detail, attention will be directed to a series of examples to facilitate the discussion of test design and rollout to a series of retailers within a retail chain. For these examples the focus will center on a retailer chain with 66 stores attempting to determine the base pricing of a class of goods, here butter and margarine spreads. The number of stores and good type are entirely illustrative, and the present systems and methods could be applied to any type of retailer with virtually any number of physical locations. However, it should be noted that for efficiency of testing and minimization of external variable impacts, a minimum number of test stores may be desirable. For example, in fewer than 10 test stores, the number of price changes and redundant testing may need to be increased to get accurate results for the optimal prices. This may increase the per store cost of testing, and as such may be less appealing for a retail chain.

Figure 21:
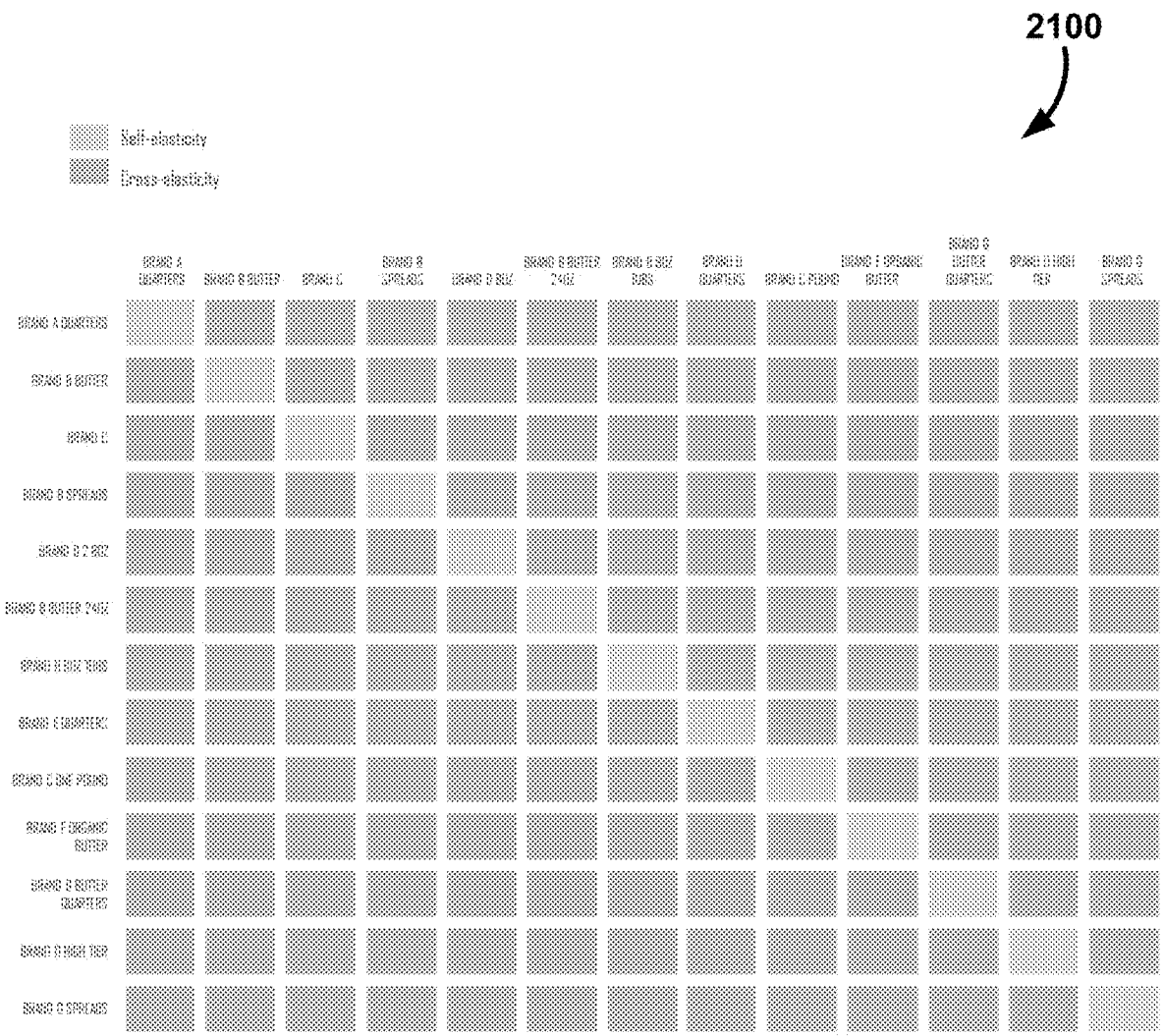
FIG. 21 shows, in accordance with some embodiments, an illustration of an example elasticity matrix for the base price optimization test.

For example, FIG. 20 shows an illustration of an example rollout of a base price optimization test, shown generally at 2000. In this example, the 66 stores are divided evenly into a three groups. Each group is assigned either a current (historical) price for each stock keeping unit (SKU) of butter (shown in light grey), a lower test price (shown in a medium grey), and a higher test price (shown in the darkest grey). In this example, the lower test price has been incremented ten cents lower than the current price, and the higher price is incremented ten cents above the current price. Which store group receives the lower, current or higher price may be randomized, as may which of the stores are placed into each group of stores. In this example, the prices are then rotated on a weekly basis between the groups of stores. Transaction data from each store is collected from this rollout enabling an elasticity matrix 2100 to be generated, as seen in FIG. 21. In this matrix, each product is listed on the column and row header. The diagonal intersection is thus the self-elasticity of the product (light grey), and the cross elasticity between each given product will be found for each other portion of the matrix (darker grey). As the prices are tested in the various stores and transactions are collected, the degree of elasticity for each of these product pairs may be calculated. In some embodiments all products in the store may be included in this cross elasticity matrix, but due to the low degree of cross elasticity between entirely disparate items, this may not be desirable, particularly give the rather significant processing demands in calculating cross elasticities for such a large group of items. For example, the price of and given brand of butter likely has nearly no impact on the sales of cereal. Calculating a cross elasticity between these items would be basically valueless, but consumes considerable processing resources. As such, it may be desirable to calculate cross elasticities only between products in the same category, and some well-established associated products (such as gram crackers, large marshmallows and Hershey's chocolate bars). Likewise, the costs of testing and large degree of data processing needed may make the analysis of all products within a product category unnecessary and undesirable. For example in some cases only the top 80% of sales volume (by revenue) of products may be tested for in a given category. This helps to focus the analysis only on products that will deliver the greatest benefit to the retailer. As noted previously, the unique challenges of pricing testing in a physical retailer means there is an outsized cost to any testing activity. This testing needs to be made as efficient as possible in order to be advantageous to the retailer. Rule based pricing policies may then be employed on the bottom 20% of products within the category. While not as good as the optimal pricing determined through testing, this rule based pricing may be "good enough" given the relatively low volume sold.

Rules and constraints may be applied in the setting of the prices, in these example the constraints may include that the final digit must be a "9" or a "4", and there may be a maximum price restriction. Likewise, the objectives may be set for the optimization. Generally, the objective for base pricing is the maximized profitability subject to constraints, but other objectives may include margin or volume growth goals.

Figure 22:
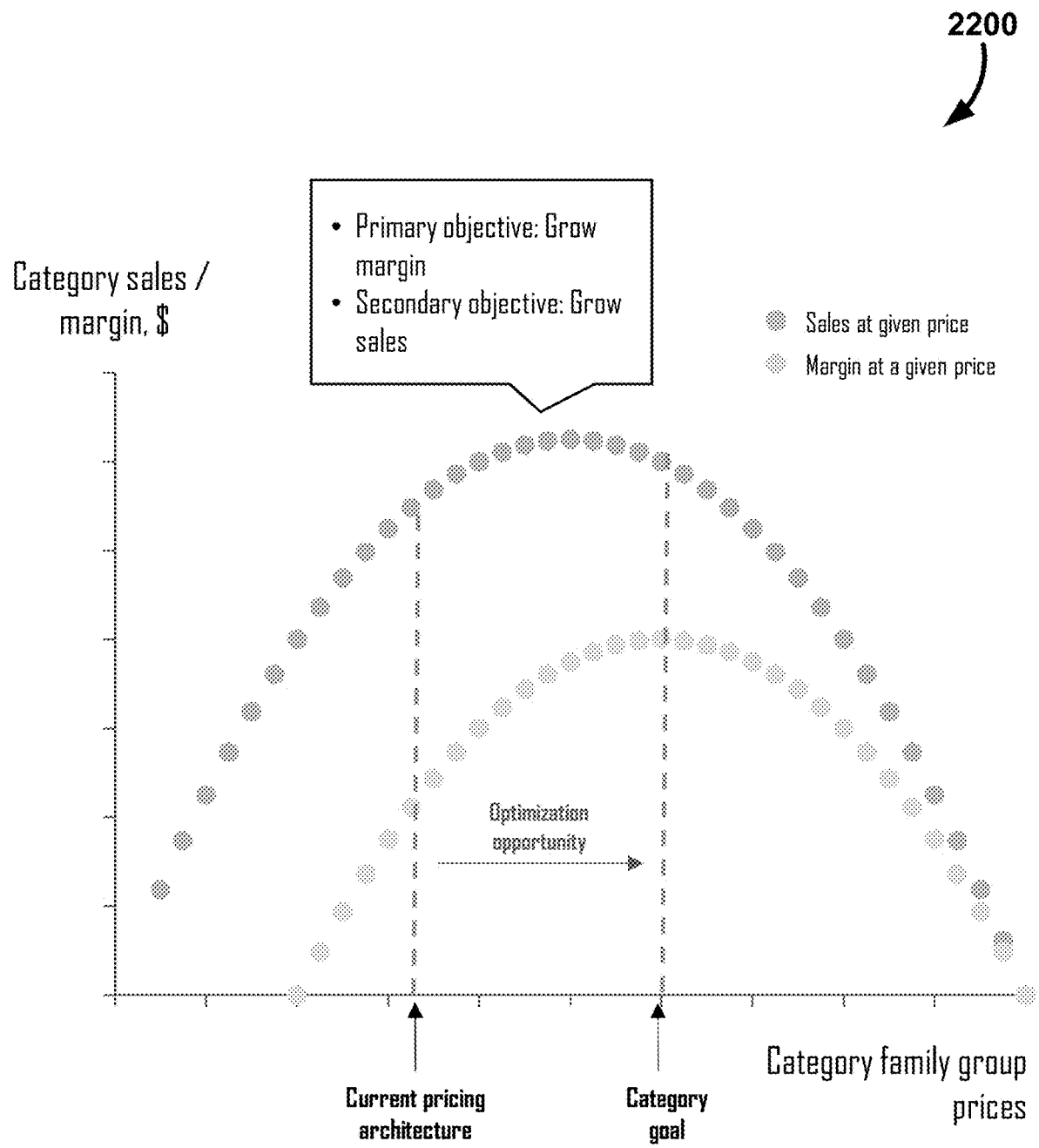
FIG. 22 shows, in accordance with some embodiments, an illustration of a sales graph for the example rollout of the base price optimization test.

FIG. 22 shows an illustration of a sales graph 2200 for the example rollout of the base price optimization test. This graph is an elasticity curve for the entire category of the tested items where the sales (darker grey) and margin (lighter grey) are plotted versus the category group prices. The maxima of these two metrics (margin and sales) are not in alignment, and one of the objectives needs to designated as a primary objective (here margin growth). A category goal is then determined based upon a weighted average of the maxima for the primary goal versus the secondary goal. In this example illustration, the primary objective is being very heavily weighted, so the category goal is near the maxima for this curve. However, based upon weighting, the category goal may exist anywhere between the two curve maximum values.

The current pricing structure may also be plotted on the graph, and the difference between the current pricing architecture and the goal is the optimization opportunity for this category of products. These curves are dependent upon accurate elasticity measures, which relies upon thorough testing of prices.

Figure 24:
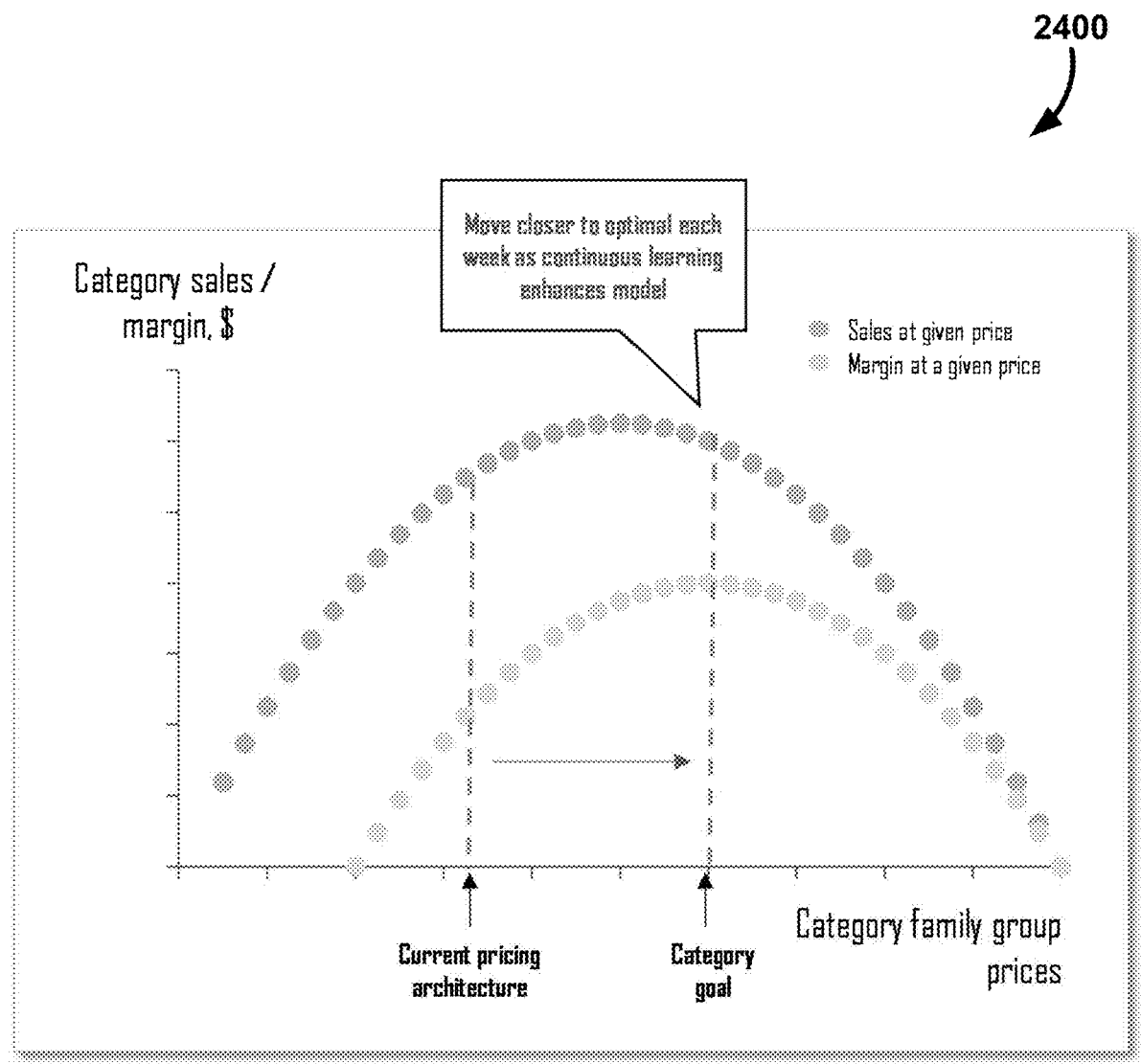
FIG. 24 shows, in accordance with some embodiments, an illustration of a sales graph for the example refinement of the base price optimization test.

After the initial set of testing, the process may begin honing in on an optimal price structure. At this stage the store groups are reshuffled into four store groupings. FIG. 23 shows an illustration of an example refinement of the base price optimization test, shown generally at 2300. Here a control group of stores is defined which is smaller in size than the three test scores. Store assignment to any of these groups is done through randomization. The control group of stores is maintained at the original "control" price (lightest grey). The remaining stores are assigned what is estimated as being the optimal price (light-medium grey), a lower than optimal test price (dark-medium grey), and higher than optimal test price (dark grey). As results are collected the optimal price estimate may be continually refined, and new lower and higher prices may be generated, all subject to the constraints. This results over time to a refinement of the elasticity curve, as seen at FIG. 24 at plot 2400. The pricing structure also moves closer over time to the optimal category goal.

Figure 25:
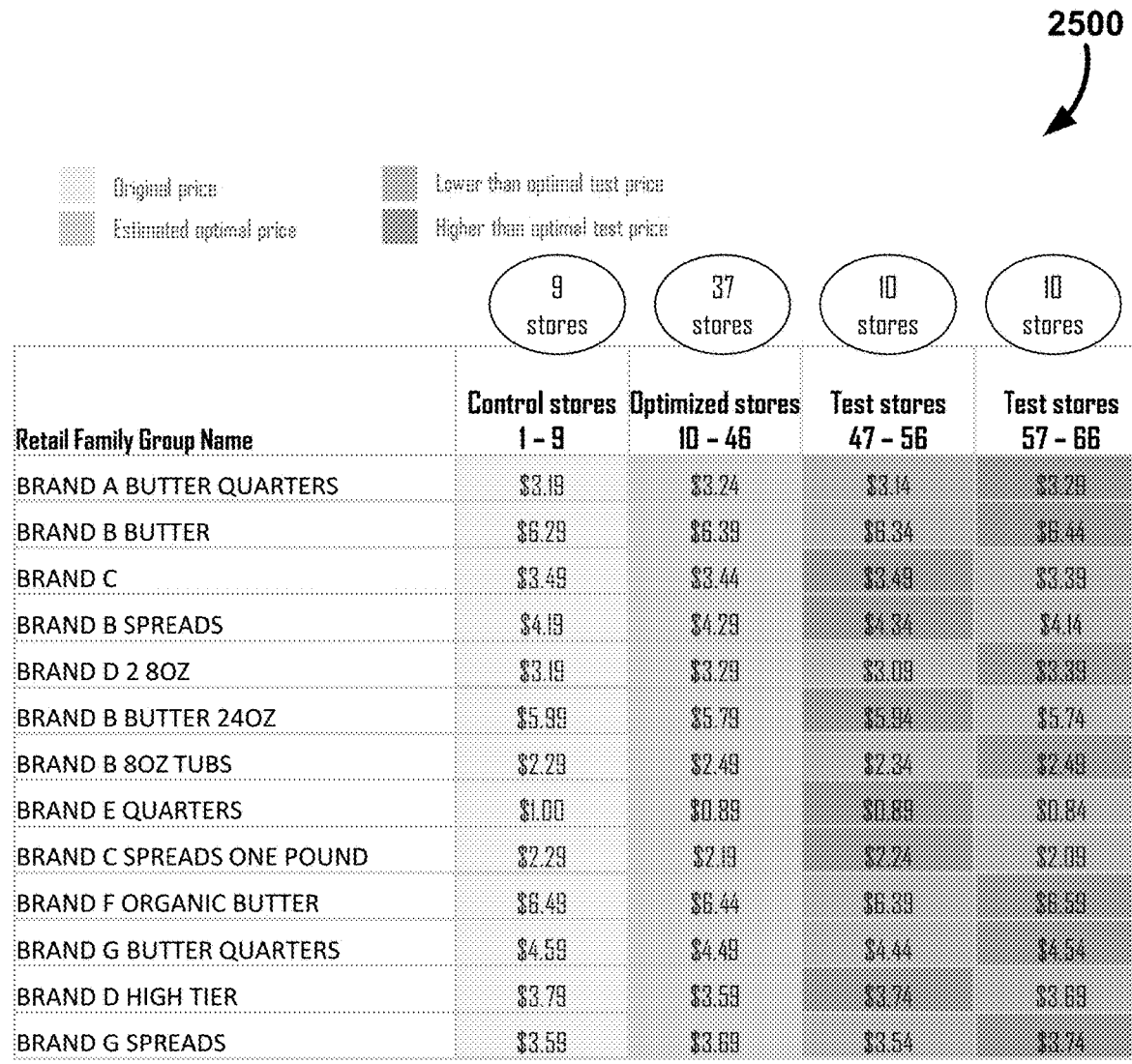
FIG. 25 shows, in accordance with some embodiments, an illustration of an example of the completed base price optimization test.

Once the optimal price has been determined with a degree of confidence, the system enters a validation stage. FIG. 25 shows an illustration of an example of the completed base price optimization test that has entered this validation, as seen at 2500. In this example, there still is four categories of stores, but now nearly half the stores are assigned the optimal price (light-medium grey). The remaining stores are then split nearly equally between the control price stores (light grey), and two test store groups that receive either a lower than optimal test price (dark-medium grey) or higher than medium price (dark grey). The system may operate in this mode in perpetuity, or upon reaching some second, higher level of confidence that the optimal price is correct switch again to the deployment of the optimal price to more, or even all, the retailers. In such cases, the system may periodically reenter a testing phase to ensure the optimal price has not migrated over time.

V. System Embodiments

Figure 26A:
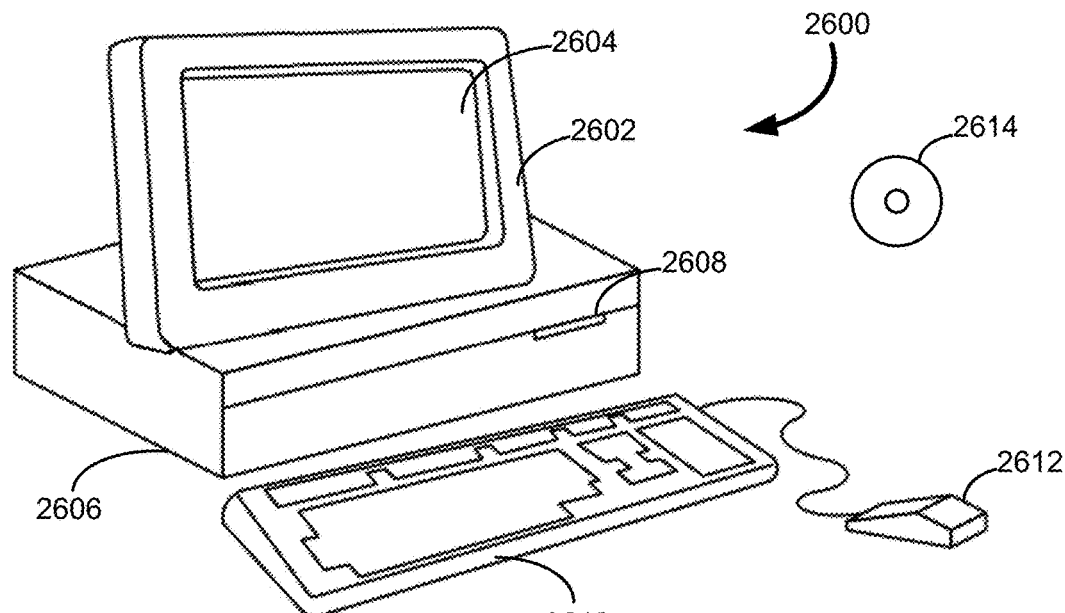
FIGS. 26A and 26B are example computer systems capable of implementing the system for design matrix generation and recommendation overlay.
Figure 26B:
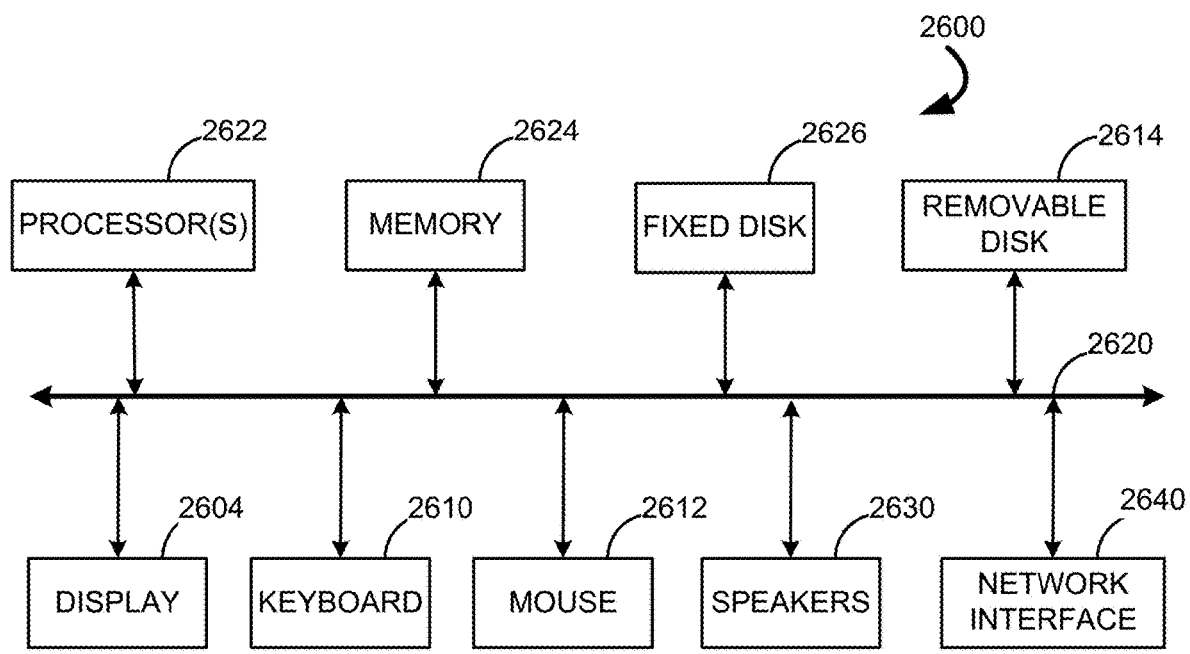

Now that the systems and methods for the optimization of promotional variables and base prices in a physical retail setting have been described, attention shall now be focused upon apparatuses capable of executing the above functions in real-time. To facilitate this discussion, FIGS. 26A and 26B illustrate a Computer System 2600, which is suitable for implementing embodiments of the present invention. FIG. 26A shows one possible physical form of the Computer System 2600. Of course, the Computer System 2600 may have many physical forms ranging from a printed circuit board, an integrated circuit, and a small handheld device up to a huge super computer. Computer system 2600 may include a Monitor 2602, a Display 2604, a Housing 2606, a Disk Drive 2608, a Keyboard 2610, and a Mouse 2612. Disk 2614 is a computer-readable medium used to transfer data to and from Computer System 2600.

FIG. 26B is an example of a block diagram for Computer System 2600. Attached to System Bus 2620 are a wide variety of subsystems. Processor(s) 2622 (also referred to as central processing units, or CPUs) are coupled to storage devices, including Memory 2624. Memory 2624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 2626 may also be coupled bi-directionally to the Processor 2622; it provides additional data storage capacity and may also include any of the computer-readable media described below. Fixed Disk 2626 may be used to store programs, data, and the like and is typically a secondary storage medium (such as a hard disk) that is slower than primary storage. It will be appreciated that the information retained within Fixed Disk 2626 may, in appropriate cases, be incorporated in standard fashion as virtual memory in Memory 2624. Removable Disk 2614 may take the form of any of the computer-readable media described below.

Processor 2622 is also coupled to a variety of input/output devices, such as Display 2604, Keyboard 2610, Mouse 2612 and Speakers 2630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2622 optionally may be coupled to another computer or telecommunications network using Network Interface 2640. With such a Network Interface 2640, it is contemplated that the Processor 2622 might receive information from the network, or might output information to the network in the course of performing the above-described promotion optimizations and administration within physical stores. Furthermore, method embodiments of the present invention may execute solely upon Processor 2622 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for updating an elasticity curve executed on a computer system including non-transitory storage medium, the method comprising:
   collecting transaction logs for products in a plurality of physical retail spaces;
   validating the transaction logs by comparing a set of pricing instructions provided to the plurality of physical retail spaces against the transaction logs;
   discarding any transaction log that is found in validation to have a mismatch between the instructions and the transaction logs;
   adjusting the transaction logs based on day, retailer and weather;
   computing elasticity for the products using the transaction logs;
   receiving constraints, wherein the constraints include a minimum margin value, a statistically insignificant price adjustment, and a maximum percentage price adjustment;
   computing an estimated optimal price for profitability for each product responsive to the elasticity and above the minimum margin constraints;
   computing test values above and below the estimated optimal price for each product less than the maximum percentage and above the statistically insignificant price adjustment, and which has not been previously tested for;
   evaluating the estimated optimal price and test values in three groups of retailers, wherein each of the plurality of physical retail spaces is randomly assigned to one of the three groups; and
   refining the elasticity responsive to the evaluation by modeling for the test value that is determined to be an actual optimal price.

2. The method of claim 1, wherein the collecting the transaction logs includes aggregating the transaction logs by day and by each physical retail space.

3. The method of claim 1, wherein the adjusting includes adjusting by day, each physical retail space and by an external factor.

4. The method of claim 1, wherein the adjusting includes normalizing the transaction logs.

5. The method of claim 1, wherein the adjusting includes filtering the transaction logs for data deemed inaccurate during the validating.

6. The method of claim 1, wherein the computing the elasticity includes generalized linear models.

7. The method of claim 1, wherein the evaluating includes D-optimal designs via exchange algorithm and Box-Behnken design.

8. The method of claim 1, further comprising updating the estimated optimal price using the refined elasticity and testing the updated estimated optimal price, test values and control price in four groups of retailers, wherein each of the plurality of physical retail spaces is randomly assigned to one of the four groups.

9. A system for updating an elasticity curve comprising:
a database containing a collection of transaction logs for products in a plurality of physical retail spaces;
a server including non-transitory memory for executing the steps of:
validating the transaction logs by comparing a set of pricing instructions provided to the plurality of physical retail spaces against the transaction logs;
discarding any transaction log that is found in validation to have a mismatch between the instructions and the transaction logs;
adjusting the transaction logs based on day, retailer and weather;
computing elasticity for the products using the transaction logs;
receiving constraints, wherein the constraints include a minimum margin value, a statistically insignificant price adjustment and a maximum percentage price adjustment;
computing an estimated optimal price for profitability for each product responsive to the elasticity and the above the minimum margin constraints;
computing test values above and below the estimated optimal price for each product less than the maximum percentage and above the statistically insignificant price adjustment, and which has not been previously tested for;
a test designer, embodied in a computer system, for evaluating the estimated optimal price and test values in three groups of retailers, wherein each of the plurality of physical retail spaces is randomly assigned to one of the three groups; and
the server further executing the step of refining the elasticity responsive to the evaluation by modeling for the test value that is determined to be an actual optimal price.

10. The system of claim 9, wherein the collecting the transaction logs includes aggregating the transaction logs by day and by each physical retail space.

11. The system of claim 9, wherein the adjusting includes adjusting by day, each physical retail space and by an external factor.

12. The system of claim 9, wherein the adjusting includes normalizing the transaction logs.

13. The system of claim 9, wherein the adjusting includes filtering the transaction logs for data deemed inaccurate during the validating.

14. The system of claim 9, wherein the computing the elasticity includes generalized linear models.

15. The system of claim 9, wherein the evaluating includes D-optimal designs via exchange algorithm and Box-Behnken design.

16. The system of claim 9, wherein the optimizer refines the estimated optimal price using the refined elasticity, and the test designer tests the updated estimated optimal price, test values and control price in four groups of retailers, wherein each of the plurality of physical retail spaces is randomly assigned to one of the four groups.

* * * * *